(12) United States Patent
He et al.

(10) Patent No.: US 11,649,977 B2
(45) Date of Patent: May 16, 2023

(54) SYSTEMS AND METHODS FOR AIR REMEDIATION

(71) Applicant: Delos Living LLC, New York, NY (US)

(72) Inventors: Chuan He, New York, NY (US); Yiwen Di, New York, NY (US); Cong Wang, Charleston, SC (US)

(73) Assignee: DELOS LIVING LLC, New York, NY (US)

( * ) Notice: Subject to any disclaimer, the term of this patent is extended or adjusted under 35 U.S.C. 154(b) by 10 days.

(21) Appl. No.: 17/276,097

(22) PCT Filed: Sep. 10, 2019

(86) PCT No.: PCT/US2019/050416
§ 371 (c)(1),
(2) Date: Mar. 12, 2021

(87) PCT Pub. No.: WO2020/055872
PCT Pub. Date: Mar. 19, 2020

(65) Prior Publication Data
US 2022/0042694 A1 Feb. 10, 2022

Related U.S. Application Data

(63) Continuation-in-part of application No. PCT/US2019/050339, filed on Sep. 10, 2019.
(Continued)

(51) Int. Cl.
*F24F 11/30* (2018.01)
*F24F 11/63* (2018.01)
(Continued)

(52) U.S. Cl.
CPC .............. *F24F 11/30* (2018.01); *F24F 11/63* (2018.01); *F24F 11/88* (2018.01); *F24F 11/89* (2018.01);
(Continued)

(58) Field of Classification Search
CPC .. F24F 11/30; F24F 11/63; F24F 11/88; F24F 11/89; F24F 2110/20; F24F 2120/10;
(Continued)

(56) References Cited

U.S. PATENT DOCUMENTS

| 628,351 A | 7/1899 | O'Neill |
| 828,733 A | 8/1906 | Fuller |

(Continued)

FOREIGN PATENT DOCUMENTS

| CA | 2307458 | 11/2001 |
| CA | 2740939 | 3/2010 |

(Continued)

OTHER PUBLICATIONS

Dong, B., Prakash, V., Feng, F. and O'Neill, Z., 2019. A review of smart building sensing system for better indoor environment control. Energy and Buildings, 199, pp. 29-46. (Year: 2019).*

(Continued)

*Primary Examiner* — Alicia M. Choi
(74) *Attorney, Agent, or Firm* — Fitch, Even, Tabin & Flannery, LLP

(57) ABSTRACT

Systems, methods, and apparatus are provided for monitoring and improving air quality in single- and multi-zone indoor spaces. The system for monitoring and improving air quality includes a built structure that includes an indoor space with environmentally-controllable zones, an environmental control system, sensor arrays positioned within the environmentally-controllable zones, and a control circuit configured to monitor air and remediate air within the indoor (Continued)

space. Multiple zones in the indoor space may be bundled together in multiple remediation bundled-areas for remediation by separate air handling systems and/or processes. Additionally, multiple zones may be delineated within the indoor space for sensor installation processes.

25 Claims, 22 Drawing Sheets

Related U.S. Application Data

(60) Provisional application No. 62/783,718, filed on Dec. 21, 2018, provisional application No. 62/756,913, filed on Nov. 7, 2018, provisional application No. 62/731,535, filed on Sep. 14, 2018.

(51) Int. Cl.
*F24F 11/88* (2018.01)
*F24F 11/89* (2018.01)
*F24F 110/20* (2018.01)
*F24F 120/10* (2018.01)
*F24F 110/50* (2018.01)
*F24F 110/10* (2018.01)

(52) U.S. Cl.
CPC ....... *F24F 2110/10* (2018.01); *F24F 2110/20* (2018.01); *F24F 2110/50* (2018.01); *F24F 2120/10* (2018.01)

(58) Field of Classification Search
CPC .... F24F 2110/50; F24F 2110/10; F24F 11/46; F24F 11/0001
See application file for complete search history.

(56) References Cited

U.S. PATENT DOCUMENTS

| | | |
|---|---|---|
| 853,033 A | 5/1907 | Roberts |
| 1,648,277 A | 11/1927 | Korb |
| 1,856,969 A | 5/1932 | Reiter |
| 2,184,644 A | 12/1939 | Homberger |
| 3,483,302 A | 12/1969 | Ashkenas |
| RE27,027 E | 1/1971 | Cristofv |
| 3,621,838 A | 11/1971 | Harding et al. |
| 3,678,337 A | 7/1972 | Grauvogel |
| 3,782,006 A | 1/1974 | Symmes |
| 3,901,215 A | 8/1975 | Erwin |
| 3,910,701 A | 10/1975 | Henderson |
| 4,074,124 A | 2/1978 | Maute |
| 4,122,334 A | 10/1978 | Owens |
| 4,135,116 A | 1/1979 | Smith |
| 4,233,545 A | 11/1980 | Webster |
| 4,236,101 A | 11/1980 | Luchaco |
| 4,247,766 A | 1/1981 | Warren |
| 4,273,999 A | 6/1981 | Pierpoint |
| 4,308,911 A | 1/1982 | Mandl |
| 4,587,459 A | 5/1986 | Blake |
| 4,638,853 A | 1/1987 | Papak |
| 4,701,669 A | 10/1987 | Head |
| 4,717,343 A | 1/1988 | Densky |
| D295,934 S | 5/1988 | Dyrhood |
| 4,755,140 A | 7/1988 | Rimland |
| 4,770,636 A | 9/1988 | Buschke |
| 4,803,625 A | 2/1989 | Fu |
| 4,828,609 A | 5/1989 | Anderson |
| 4,853,854 A | 8/1989 | Behar |
| 4,858,609 A | 8/1989 | Cole |
| 4,882,166 A | 11/1989 | Graham |
| 4,893,291 A | 1/1990 | Bick |
| 4,911,166 A | 3/1990 | Leighton |
| 4,911,737 A | 3/1990 | Yehl |
| 4,916,642 A | 4/1990 | Kaiser |
| 4,930,505 A | 6/1990 | Hatje |
| 4,938,582 A | 7/1990 | Leslie |
| 4,947,928 A | 8/1990 | Parker |
| 4,953,784 A | 9/1990 | Yasufuku |
| 4,962,687 A | 10/1990 | Belliveau |
| D312,018 S | 11/1990 | Giesy |
| 5,006,985 A | 4/1991 | Ehret |
| 5,010,777 A | 4/1991 | Yehl |
| 5,017,142 A | 5/1991 | Bemis |
| 5,043,840 A | 8/1991 | Yehl |
| 5,079,682 A | 1/1992 | Roberts |
| 5,079,726 A | 1/1992 | Keller |
| 5,082,173 A | 1/1992 | Poehlman |
| 5,086,385 A | 2/1992 | Launey |
| 5,092,669 A | 3/1992 | Anderson |
| 5,103,391 A | 4/1992 | Barrett |
| 5,103,408 A | 4/1992 | Greenberg |
| 5,121,030 A | 6/1992 | Schott |
| 5,176,133 A | 1/1993 | Czeisler |
| 5,193,900 A | 3/1993 | Yano |
| 5,197,941 A | 3/1993 | Whitaker |
| 5,207,580 A | 5/1993 | Strecher |
| 5,214,736 A | 5/1993 | Uemiya |
| D335,978 S | 6/1993 | Grahn |
| 5,230,629 A | 7/1993 | Buschke |
| 5,250,799 A | 10/1993 | Werner |
| 5,259,553 A | 11/1993 | Shyu |
| 5,285,356 A | 2/1994 | Skene |
| 5,285,430 A | 2/1994 | Decker |
| D345,071 S | 3/1994 | Gould |
| 5,290,200 A * | 3/1994 | Kiser .............. F24F 11/81 454/238 |
| 5,292,345 A | 3/1994 | Gerardo |
| 5,295,491 A | 3/1994 | Gevins |
| 5,304,212 A | 4/1994 | Czeisler |
| 5,343,121 A | 8/1994 | Terman |
| 5,344,068 A | 9/1994 | Haessig |
| 5,344,324 A | 9/1994 | O'Donnell |
| 5,350,977 A | 9/1994 | Hamamoto |
| 5,357,170 A | 10/1994 | Luchaco |
| 5,374,876 A | 12/1994 | Horibata |
| 5,377,258 A | 12/1994 | Bro |
| 5,395,042 A | 3/1995 | Riley |
| 5,433,923 A | 7/1995 | Wolverton |
| 5,436,535 A | 7/1995 | Yang |
| 5,462,485 A | 10/1995 | Kinkead |
| D364,762 S | 12/1995 | Compton |
| D365,484 S | 12/1995 | Trattner, Jr. |
| 5,473,537 A | 12/1995 | Glazer |
| 5,503,637 A | 4/1996 | Kyricos |
| 5,545,192 A | 8/1996 | Czeisler |
| 5,589,741 A | 12/1996 | Terman |
| 5,596,994 A | 1/1997 | Bro |
| 5,648,656 A | 7/1997 | Begemann |
| 5,692,501 A | 12/1997 | Minturn |
| 5,721,471 A | 2/1998 | Begemann |
| 5,722,418 A | 3/1998 | Bro |
| 5,724,987 A | 3/1998 | Gevins |
| 5,742,516 A | 4/1998 | Olcerst |
| 5,749,365 A | 5/1998 | Magill |
| D396,581 S | 8/1998 | Schubert |
| 5,791,982 A | 8/1998 | Curry |
| 5,805,267 A | 9/1998 | Goldman |
| 5,813,863 A | 9/1998 | Sloane |
| D401,085 S | 11/1998 | Grant |
| 5,833,466 A | 11/1998 | Borg |
| 5,861,717 A | 1/1999 | Begemann |
| 5,892,690 A | 4/1999 | Boatman |
| 5,908,301 A | 6/1999 | Lutz |
| 5,911,581 A | 6/1999 | Reynolds |
| 5,919,217 A | 7/1999 | Hughes |
| 5,937,387 A | 8/1999 | Summerell |
| 5,954,510 A | 9/1999 | Merrill |
| 5,963,294 A | 10/1999 | Schiffer |
| 5,967,789 A | 10/1999 | Segel |
| 5,976,010 A | 11/1999 | Reese |
| 6,053,936 A | 4/2000 | Koyama |
| 6,055,480 A | 4/2000 | Nevo |
| D424,356 S | 5/2000 | Hahn |

(56) References Cited

U.S. PATENT DOCUMENTS

| | | |
|---|---|---|
| 6,118,230 A | 9/2000 | Fleischmann |
| 6,135,970 A | 10/2000 | Kadhiresan |
| 6,166,496 A | 12/2000 | Lys |
| 6,170,318 B1 | 1/2001 | Lewis |
| 6,197,094 B1 | 3/2001 | Thofelt |
| 6,208,905 B1 | 3/2001 | Giddings |
| 6,235,046 B1 | 5/2001 | Gerdt |
| 6,238,337 B1 | 5/2001 | Kambhatla |
| 6,269,339 B1 | 7/2001 | Silver |
| 6,280,198 B1 | 8/2001 | Calhoun |
| 6,290,140 B1 | 9/2001 | Pesko |
| 6,331,160 B1 | 12/2001 | Bardy |
| 6,340,864 B1 | 1/2002 | Wacyk |
| 6,340,868 B1 | 1/2002 | Lys |
| 6,344,641 B1 | 2/2002 | Blalock |
| 6,348,867 B1 | 2/2002 | Myllymaki |
| 6,350,275 B1 | 2/2002 | Vreman |
| 6,369,716 B1 | 4/2002 | Abbas |
| 6,387,844 B1 | 5/2002 | Fujishima |
| 6,411,046 B1 | 6/2002 | Muthu |
| 6,416,472 B1 | 7/2002 | Cady |
| 6,417,019 B1 | 7/2002 | Mueller |
| 6,419,629 B1 | 7/2002 | Balkin |
| 6,435,878 B1 | 8/2002 | Reynolds |
| 6,439,893 B1 | 8/2002 | Byrd |
| 6,441,558 B1 | 8/2002 | Muthu |
| 6,448,550 B1 | 9/2002 | Nishimura |
| 6,448,978 B1 | 9/2002 | Salvador |
| 6,459,919 B1 | 10/2002 | Lys |
| 6,488,698 B1 | 12/2002 | Hyman |
| 6,498,440 B2 | 12/2002 | Stam |
| 6,503,462 B1 | 1/2003 | Michalakos |
| 6,507,159 B2 | 1/2003 | Muthu |
| 6,507,709 B2 | 1/2003 | Hirai |
| 6,525,658 B2 | 2/2003 | Streetman |
| 6,535,190 B2 | 3/2003 | Evanicky |
| 6,553,252 B2 | 4/2003 | Balkin |
| 6,554,439 B1 | 4/2003 | Teicher |
| 6,565,359 B2 | 5/2003 | Calhoun |
| 6,567,009 B2 | 5/2003 | Ohishi |
| 6,582,380 B2 | 6/2003 | Kazlausky |
| 6,583,573 B2 | 6/2003 | Bierman |
| 6,583,720 B1 | 6/2003 | Quigley |
| D477,158 S | 7/2003 | Calcerano |
| 6,589,912 B2 | 7/2003 | Kawai |
| 6,607,484 B2 | 8/2003 | Suzuki |
| 6,608,453 B2 | 8/2003 | Morgan |
| 6,610,127 B2 | 8/2003 | Lu |
| 6,614,013 B2 | 9/2003 | Pitigoi-Aron |
| 6,618,723 B1 | 9/2003 | Smith |
| 6,623,512 B1 | 9/2003 | Heller |
| 6,632,174 B1 | 10/2003 | Breznitz |
| 6,661,798 B2 | 12/2003 | Sano |
| 6,666,567 B1 | 12/2003 | Feldman |
| 6,669,481 B2 | 12/2003 | Winter |
| 6,683,419 B2 | 1/2004 | Kriparos |
| 6,691,070 B1 | 2/2004 | Williams |
| 6,711,470 B1 | 3/2004 | Hartenstein |
| 6,712,615 B2 | 3/2004 | Martin |
| 6,720,745 B2 | 4/2004 | Lys |
| 6,727,091 B2 | 4/2004 | Darlington |
| 6,738,551 B2 | 5/2004 | Noda |
| 6,743,171 B1 | 6/2004 | Bowles |
| 6,755,783 B2 | 6/2004 | Cosentino |
| 6,756,998 B1 | 6/2004 | Bilger |
| 6,757,710 B2 | 6/2004 | Reed |
| 6,769,915 B2 | 8/2004 | Murgia |
| 6,772,016 B1 | 8/2004 | Oern |
| 6,774,802 B2 | 8/2004 | Bachinski |
| 6,782,351 B2 | 8/2004 | Reichel |
| 6,806,659 B1 | 10/2004 | Mueller |
| 6,834,208 B2 | 12/2004 | Gonzales |
| 6,862,529 B2 | 3/2005 | Brown |
| 6,865,428 B2 | 3/2005 | Gonzales |
| 6,872,221 B2 | 3/2005 | Lytle |
| 6,878,191 B2 | 4/2005 | Escaffre |
| 6,879,451 B1 | 4/2005 | Hewlett |
| 6,884,078 B2 | 4/2005 | Wiig |
| 6,888,453 B2 | 5/2005 | Lutz |
| 6,888,779 B2 | 5/2005 | Mollicone |
| 6,904,508 B2 | 6/2005 | Selkirk |
| 6,912,429 B1 | 6/2005 | Bilger |
| 6,923,653 B2 | 8/2005 | Ito |
| 6,933,486 B2 | 8/2005 | Pitigoi-Aron |
| 6,955,684 B2 | 10/2005 | Savage, Jr. |
| 6,964,638 B1 | 11/2005 | Theodoracopulos |
| 6,967,565 B2 | 11/2005 | Lingemann |
| 6,991,029 B2 | 1/2006 | Orfield |
| 6,992,803 B2 | 1/2006 | Chang |
| 7,004,606 B2 | 2/2006 | Schofield |
| 7,014,336 B1 | 3/2006 | Ducharme |
| 7,024,256 B2 | 4/2006 | Krzyzanowski |
| 7,038,399 B2 | 5/2006 | Lys |
| 7,065,280 B2 | 6/2006 | Ogawa |
| 7,067,995 B2 | 6/2006 | Gunter |
| 7,081,128 B2 | 7/2006 | Hart |
| D526,512 S | 8/2006 | Hahn |
| 7,092,101 B2 | 8/2006 | Brady |
| 7,095,056 B2 | 8/2006 | Vitta |
| 7,097,111 B2 | 8/2006 | Riley |
| 7,099,723 B2 | 8/2006 | Gonzales |
| 7,113,086 B2 | 9/2006 | Shorrock |
| D530,940 S | 10/2006 | Raile |
| 7,129,855 B2 | 10/2006 | Krzyzanowski |
| 7,145,295 B1 | 12/2006 | Lee |
| 7,145,614 B2 | 12/2006 | Lee |
| 7,173,384 B2 | 2/2007 | Ploetz |
| 7,190,126 B1 | 3/2007 | Paton |
| 7,196,619 B2 | 3/2007 | Perlman |
| 7,202,613 B2 | 4/2007 | Morgan |
| 7,204,611 B2 | 4/2007 | Kuepper |
| 7,213,940 B1 | 5/2007 | Van De Ven |
| 7,215,086 B2 | 5/2007 | Maxik |
| 7,224,282 B2 | 5/2007 | Terauchi |
| 7,234,943 B1 | 6/2007 | Aleali |
| 7,256,554 B2 | 8/2007 | Lys |
| 7,260,950 B2 | 8/2007 | Choi |
| 7,274,160 B2 | 9/2007 | Mueller |
| 7,288,902 B1 | 10/2007 | Melanson |
| 7,294,107 B2 | 11/2007 | Simon |
| 7,298,871 B2 | 11/2007 | Lee |
| 7,302,313 B2 | 11/2007 | Sharp |
| 7,308,296 B2 | 12/2007 | Lys |
| 7,319,298 B2 | 1/2008 | Jungwirth |
| 7,324,874 B2 | 1/2008 | Jung |
| 7,327,337 B2 | 2/2008 | Callahan |
| 7,328,243 B2 | 2/2008 | Yeager |
| 7,347,818 B2 | 3/2008 | Simon |
| 7,348,949 B2 | 3/2008 | Lee |
| D566,428 S | 4/2008 | Kester |
| 7,354,172 B2 | 4/2008 | Chemel |
| 7,358,679 B2 | 4/2008 | Lys |
| 7,364,583 B2 | 4/2008 | Rose |
| 7,366,989 B2 | 4/2008 | Naik |
| 7,369,903 B2 | 5/2008 | Diederiks |
| 7,387,405 B2 | 6/2008 | Ducharme |
| 7,415,310 B2 | 8/2008 | Bovee |
| 7,446,303 B2 | 11/2008 | Maniam |
| 7,453,217 B2 | 11/2008 | Lys |
| 7,457,834 B2 | 11/2008 | Jung |
| 7,507,091 B1 | 3/2009 | Aleali |
| 7,520,634 B2 | 4/2009 | Ducharme |
| 7,524,279 B2 | 4/2009 | Auphan |
| 7,534,255 B1 | 5/2009 | Streeter |
| 7,536,388 B2 | 5/2009 | Jung |
| 7,545,267 B2 | 6/2009 | Stortoni |
| 7,553,039 B2 | 6/2009 | Harris |
| 7,556,604 B2 | 7/2009 | Murata |
| 7,557,521 B2 | 7/2009 | Lys |
| 7,558,546 B2 | 7/2009 | Johnson |
| 7,567,956 B2 | 7/2009 | Yu |
| 7,572,028 B2 | 8/2009 | Mueller |
| 7,573,210 B2 | 8/2009 | Ashdown |
| 7,574,320 B2 | 8/2009 | Corwin |

(56) References Cited

U.S. PATENT DOCUMENTS

| | | |
|---|---|---|
| 7,577,915 B2 | 8/2009 | Hunter |
| 7,621,871 B2 | 11/2009 | Downs, III |
| 7,624,028 B1 | 11/2009 | Brown |
| 7,647,285 B2 | 1/2010 | Heckerman |
| 7,652,582 B2 | 1/2010 | Littell |
| 7,659,673 B2 | 2/2010 | Lys |
| 7,676,280 B1 | 3/2010 | Bash |
| 7,679,281 B2 | 3/2010 | Kim |
| 7,680,745 B2 | 3/2010 | Hunter |
| 7,689,437 B1 | 3/2010 | Teller |
| 7,725,842 B2 | 5/2010 | Bronkema |
| 7,759,854 B2 | 7/2010 | Miller |
| 7,766,503 B2 | 8/2010 | Heiking |
| 7,767,280 B2 | 8/2010 | Klasen-Memmer |
| 7,772,965 B2 | 8/2010 | Farhan |
| 7,779,097 B2 | 8/2010 | Lamkin |
| 7,792,920 B2 | 9/2010 | Istvan |
| 7,827,039 B2 | 11/2010 | Butcher |
| 7,828,205 B2 | 11/2010 | Cronin |
| 7,837,472 B1 | 11/2010 | Elsmore |
| 7,839,275 B2 | 11/2010 | Spalink |
| 7,840,310 B2 | 11/2010 | Orfield |
| 7,843,353 B2 | 11/2010 | Pan |
| 7,845,823 B2 | 12/2010 | Mueller |
| 7,848,945 B2 | 12/2010 | Rozell |
| D632,102 S | 2/2011 | Sato |
| 7,878,810 B2 | 2/2011 | Kuntz |
| D634,952 S | 3/2011 | Gile |
| 7,901,071 B1 | 3/2011 | Kulas |
| 7,906,789 B2 | 3/2011 | Jung |
| 7,914,172 B2 | 3/2011 | Nagara |
| 7,918,406 B2 | 4/2011 | Rosen |
| 7,918,407 B2 | 4/2011 | Patch |
| 7,925,673 B2 | 4/2011 | Beard |
| 7,953,678 B2 | 5/2011 | Hunter |
| 7,967,731 B2 | 6/2011 | Kil |
| 7,973,759 B2 | 7/2011 | Huang |
| 7,977,904 B2 | 7/2011 | Berman |
| 7,987,490 B2 | 7/2011 | Ansari |
| 8,025,687 B2 | 9/2011 | Streeter |
| 8,028,706 B2 | 10/2011 | Skene |
| 8,035,320 B2 | 10/2011 | Sibert |
| 8,038,615 B2 | 10/2011 | Gobeyn |
| 8,042,049 B2 | 10/2011 | Killian |
| 8,064,295 B2 | 11/2011 | Palmer |
| 8,066,405 B2 | 11/2011 | Simon |
| 8,081,216 B2 | 12/2011 | Cheung |
| 8,083,675 B2 | 12/2011 | Robinson |
| 8,086,407 B2 | 12/2011 | Chan |
| 8,095,153 B2 | 1/2012 | Jenkins |
| 8,100,552 B2 | 1/2012 | Spero |
| 8,100,746 B2 | 1/2012 | Heidel |
| 8,137,108 B2 | 3/2012 | Hamway |
| 8,140,391 B2 | 3/2012 | Jacobi |
| 8,143,792 B2 | 3/2012 | Joo |
| 8,147,302 B2 | 4/2012 | Desrochers |
| 8,150,707 B2 | 4/2012 | Hayet |
| 8,154,398 B2 | 4/2012 | Rolf |
| 8,159,150 B2 | 4/2012 | Ashdown |
| 8,172,153 B1 | 5/2012 | Kennedy |
| 8,188,873 B2 | 5/2012 | Barth |
| 8,200,744 B2 | 6/2012 | Jung |
| 8,202,095 B2 | 6/2012 | Shankle |
| 8,219,115 B1 | 7/2012 | Nelissen |
| 8,226,418 B2 | 7/2012 | Lycas |
| D666,123 S | 8/2012 | Sichello |
| 8,253,349 B2 | 8/2012 | Shteynberg |
| 8,271,575 B2 | 9/2012 | Hunter |
| 8,292,468 B2 | 10/2012 | Narendran |
| 8,296,408 B2 | 10/2012 | Anke |
| 8,301,482 B2 | 10/2012 | Reynolds |
| 8,308,784 B2 | 11/2012 | Streeter |
| 8,321,192 B2 | 11/2012 | Boyce |
| 8,344,665 B2 | 1/2013 | Verfuerth |
| 8,352,408 B2 | 1/2013 | Guillama |
| 8,358,214 B2 | 1/2013 | Amigo |
| 8,359,208 B2 | 1/2013 | Slutzky |
| 8,380,359 B2 | 2/2013 | Duchene |
| 8,385,812 B2 | 2/2013 | Bertelsen |
| 8,392,025 B2 | 3/2013 | Orfield |
| 8,429,223 B2 | 4/2013 | Gilley |
| 8,436,556 B2 | 5/2013 | Eisele |
| 8,446,275 B2 | 5/2013 | Utter, II |
| 8,449,300 B2 | 5/2013 | Lycas |
| 8,454,729 B2 | 6/2013 | Mittelmark |
| 8,469,547 B2 | 6/2013 | Paolini |
| 8,484,153 B2 | 7/2013 | Mott |
| 8,490,006 B1 | 7/2013 | Reeser |
| 8,497,871 B2 | 7/2013 | Zulch |
| 8,506,612 B2 | 8/2013 | Ashdown |
| 8,508,169 B2 | 8/2013 | Zaharchuk |
| 8,515,785 B2 | 8/2013 | Clark |
| 8,527,213 B2 | 9/2013 | Kailas |
| 8,540,515 B2 | 9/2013 | Williams |
| 8,543,244 B2 | 9/2013 | Keeling |
| 8,543,665 B2 | 9/2013 | Ansari |
| 8,558,466 B2 | 10/2013 | Curasi |
| 8,558,687 B2 | 10/2013 | Haupt |
| 8,560,344 B2 | 10/2013 | Earles |
| 8,609,121 B2 | 12/2013 | Averett |
| 8,622,560 B2 | 1/2014 | Di Trapani |
| 8,630,741 B1 | 1/2014 | Matsuoka |
| 8,632,209 B2 | 1/2014 | Graeber |
| 8,640,038 B1 | 1/2014 | Reeser |
| 8,655,717 B2 | 2/2014 | Schwarzberg |
| 8,660,861 B2 | 2/2014 | Chun |
| 8,662,897 B2 | 3/2014 | Sims, Jr. |
| 8,666,666 B2 | 3/2014 | Bassa |
| 8,674,608 B2 | 3/2014 | Holland |
| 8,674,842 B2 | 3/2014 | Zishaan |
| 8,690,771 B2 | 4/2014 | Wekell |
| 8,707,619 B2 | 4/2014 | Edwards |
| 8,716,952 B2 | 5/2014 | Van De Ven |
| 8,740,623 B2 | 6/2014 | Walker |
| 8,755,942 B2 | 6/2014 | Bonilla |
| 8,760,370 B2 | 6/2014 | Maxik |
| 8,783,902 B2 | 7/2014 | Takakura |
| 8,795,169 B2 | 8/2014 | Cosentino |
| 8,801,636 B2 | 8/2014 | Lewicke |
| 8,823,507 B1 | 9/2014 | Touloumtzis |
| 8,827,489 B2 | 9/2014 | Li |
| 8,836,243 B2 | 9/2014 | Eisele |
| 8,843,484 B2 | 9/2014 | Gu |
| 8,852,254 B2 | 10/2014 | Moscovici |
| 8,855,757 B2 | 10/2014 | Kapoor |
| 8,862,532 B2 | 10/2014 | Beaulieu |
| 8,870,740 B2 | 10/2014 | Clegg |
| 8,896,427 B1 | 11/2014 | Ramirez |
| 8,907,803 B2 | 12/2014 | Martin |
| 8,924,026 B2 | 12/2014 | Federspiel |
| 8,939,885 B2 | 1/2015 | Martin |
| 8,941,500 B1 | 1/2015 | Faaborg |
| 8,952,626 B2 | 2/2015 | Huang |
| 8,961,414 B2 | 2/2015 | Teller |
| 8,975,827 B2 | 3/2015 | Chobot |
| 8,979,913 B2 | 3/2015 | D Ambrosio |
| 8,986,204 B2 | 3/2015 | Pacey |
| 8,986,427 B2 | 3/2015 | Hauville |
| 9,007,877 B2 | 4/2015 | Godlieb |
| 9,010,019 B2 | 4/2015 | Mittelmark |
| 9,015,610 B2 | 4/2015 | Hunter |
| 9,020,647 B2 | 4/2015 | Johnson |
| 9,032,097 B2 | 5/2015 | Albanese |
| 9,032,215 B2 | 5/2015 | Kalofonos |
| 9,041,530 B2 | 5/2015 | Sprigg |
| 9,044,567 B2 | 6/2015 | Poirrier |
| 9,063,739 B2 | 6/2015 | Ward |
| 9,066,405 B2 | 6/2015 | Van De Ven |
| 9,068,887 B1 | 6/2015 | Bennouri |
| D734,958 S | 7/2015 | Gosling |
| 9,095,029 B2 | 7/2015 | Lu |
| D737,078 S | 8/2015 | Mckinney |
| 9,098,114 B2 | 8/2015 | Potter |
| 9,104,183 B2 | 8/2015 | Zheng |

(56) References Cited

U.S. PATENT DOCUMENTS

| | | |
|---|---|---|
| 9,110,958 B2 | 8/2015 | Brust |
| 9,118,499 B2 | 8/2015 | Hunter |
| 9,125,257 B2 | 9/2015 | Eisele |
| 9,125,274 B1 | 9/2015 | Brunault |
| 9,131,573 B2 | 9/2015 | Maxik |
| 9,147,296 B2 | 9/2015 | Ricci |
| 9,154,559 B1 | 10/2015 | Bovee |
| 9,155,165 B2 | 10/2015 | Chobot |
| 9,204,518 B2 | 12/2015 | Jung |
| 9,220,202 B2 | 12/2015 | Maxik |
| 9,226,371 B2 | 12/2015 | Mohan |
| 9,230,064 B2 | 1/2016 | Yanev |
| 9,230,560 B2 | 1/2016 | Ehsani |
| 9,235,978 B1 | 1/2016 | Charlton |
| 9,236,026 B2 | 1/2016 | Jia |
| 9,248,309 B2 | 2/2016 | Pugh |
| 9,251,716 B2 | 2/2016 | Drane |
| 9,286,442 B2 | 3/2016 | Csoma |
| 9,297,748 B2 | 3/2016 | Risk |
| 9,306,763 B2 | 4/2016 | Tatzel |
| 9,307,608 B2 | 4/2016 | Maxik |
| 9,326,363 B2 | 4/2016 | Godlieb |
| 9,339,227 B2 | 5/2016 | D'Arcy |
| 9,345,091 B2 | 5/2016 | Pickard |
| 9,360,364 B2 | 6/2016 | Hingorani |
| 9,360,731 B2 | 6/2016 | Berman |
| 9,370,689 B2 | 6/2016 | Guillama |
| D761,598 S | 7/2016 | Goodman |
| 9,380,978 B2 | 7/2016 | Reiner |
| 9,392,665 B2 | 7/2016 | Eisele |
| 9,401,098 B2 | 7/2016 | Ellis |
| 9,410,664 B2 | 8/2016 | Krames |
| 9,420,667 B2 | 8/2016 | Mohan |
| 9,420,671 B1 | 8/2016 | Sugimoto |
| 9,426,867 B2 | 8/2016 | Beghelli |
| 9,429,009 B2 | 8/2016 | Paulk |
| 9,430,617 B2 | 8/2016 | Brust |
| 9,430,927 B2 | 8/2016 | Yu |
| 9,450,904 B2 | 9/2016 | Wheeler |
| 9,456,482 B1 | 9/2016 | Pope |
| 9,465,392 B2 | 10/2016 | Bradley |
| 9,471,751 B1 | 10/2016 | Kahn |
| 9,473,321 B1 | 10/2016 | Bazar |
| 9,480,115 B2 | 10/2016 | Bradford |
| 9,493,112 B2 | 11/2016 | Thomas |
| 9,500,325 B2 | 11/2016 | Tong et al. |
| 9,501,049 B2 | 11/2016 | Rajalakshmi |
| 9,510,426 B2 | 11/2016 | Chemel |
| 9,526,455 B2 | 12/2016 | Horseman |
| 9,528,876 B2 | 12/2016 | Micheels |
| 9,562,702 B2 | 2/2017 | Law |
| 9,576,939 B2 | 2/2017 | Roth |
| 9,589,475 B2 | 3/2017 | Lycas |
| 9,589,480 B2 | 3/2017 | Ellis |
| 9,593,861 B1 | 3/2017 | Burnett |
| 9,595,118 B2 | 3/2017 | Maxik |
| 9,609,724 B2 | 3/2017 | Bulut |
| 9,615,429 B2 | 4/2017 | Roosli |
| 9,636,520 B2 | 5/2017 | Pedersen |
| 9,642,209 B2 | 5/2017 | Eisele |
| 9,655,195 B2 | 5/2017 | Tseng |
| 9,659,150 B2 | 5/2017 | Greene |
| 9,661,715 B2 | 5/2017 | Van De Ven |
| RE46,430 E | 6/2017 | Sibert |
| 9,672,335 B2 | 6/2017 | Shuart |
| 9,672,472 B2 | 6/2017 | Snyder |
| 9,687,187 B2 | 6/2017 | Dagum |
| 9,693,724 B2 | 7/2017 | Dagum |
| 9,694,496 B2 | 7/2017 | Martinson |
| 9,696,052 B2 | 7/2017 | Malchiondo |
| 9,699,874 B2 | 7/2017 | Phillips |
| 9,703,931 B2 | 7/2017 | Hinkel |
| 9,715,242 B2 | 7/2017 | Pillai |
| 9,717,459 B2 | 8/2017 | Sereno |
| 9,730,298 B2 | 8/2017 | Vangeel |
| 9,734,293 B2 | 8/2017 | Collins, Jr. |
| 9,734,542 B2 | 8/2017 | Ji |
| 9,737,842 B2 | 8/2017 | Matlin |
| 9,750,116 B2 | 8/2017 | Witzgall |
| 9,763,592 B2 | 9/2017 | Le |
| 9,774,697 B2 | 9/2017 | Li |
| 9,788,373 B1 | 10/2017 | Chowdhury |
| 9,791,129 B2 | 10/2017 | Dennis |
| 9,794,355 B2 | 10/2017 | Moghaddam |
| 9,801,259 B2 | 10/2017 | Rasmussen |
| 9,820,656 B2 | 11/2017 | Olivier |
| 9,827,439 B2 | 11/2017 | Maxik |
| 9,839,083 B2 | 12/2017 | Van De Ven |
| 9,842,313 B2 | 12/2017 | B'Far |
| 9,848,811 B2 | 12/2017 | Yasumura |
| 9,870,449 B2 | 1/2018 | Rajan |
| 9,874,317 B2 | 1/2018 | Dijken |
| 9,875,667 B2 | 1/2018 | Thompson |
| 9,881,511 B1 | 1/2018 | Srinivasan |
| 9,883,563 B2 | 1/2018 | Bosua |
| 9,887,854 B2 | 2/2018 | Park |
| 9,890,969 B2 | 2/2018 | Martin |
| 9,894,729 B2 | 2/2018 | Forbis |
| 9,907,149 B1 | 2/2018 | Dolan |
| 9,909,772 B2 | 3/2018 | Bazar |
| 9,913,583 B2 | 3/2018 | Smith, Sr. |
| 9,915,438 B2 | 3/2018 | Cheatham, III |
| 9,916,474 B2 | 3/2018 | Tribble |
| 9,924,243 B2 | 3/2018 | Lupien |
| 9,933,182 B2 | 4/2018 | Alfakhrany |
| 9,939,823 B2 | 4/2018 | Ovadia |
| 9,944,519 B2 | 4/2018 | Bohler |
| 9,949,074 B2 | 4/2018 | Austraat |
| 9,952,614 B2 | 4/2018 | Hunter |
| 9,954,147 B2 | 4/2018 | Pentlehner |
| 9,955,423 B2 | 4/2018 | Kates |
| 9,955,550 B2 | 4/2018 | Baek |
| 9,958,180 B2 | 5/2018 | Mahar |
| 9,959,997 B2 | 5/2018 | Bailey |
| 9,984,590 B2 | 5/2018 | Stevens |
| 9,986,313 B2 | 5/2018 | Schwarzkopf |
| 9,992,292 B2 | 6/2018 | Gunnarsson |
| 9,993,198 B2 | 6/2018 | Dugan |
| 10,001,789 B2 | 6/2018 | Hunka |
| 10,015,865 B2 | 7/2018 | Engelen |
| 10,019,690 B2 | 7/2018 | Oobayashi |
| 10,022,556 B1 | 7/2018 | Holbert |
| 10,024,699 B2 | 7/2018 | Rapetti Mogol |
| 10,030,833 B2 | 7/2018 | Adler |
| 10,031,973 B2 | 7/2018 | Dey |
| 10,039,169 B2 | 7/2018 | Chen |
| 10,042,336 B2 | 8/2018 | Cipollo |
| 10,047,971 B2 | 8/2018 | Nyamjav |
| 10,051,707 B2 | 8/2018 | Deixler |
| 10,052,061 B2 | 8/2018 | Raymann |
| 10,054,534 B1 | 8/2018 | Nourbakhsh |
| 10,057,963 B2 | 8/2018 | Mead |
| 10,060,787 B2 | 8/2018 | Balooch |
| 10,064,255 B2 | 8/2018 | Barroso |
| 10,068,297 B2 | 9/2018 | Hull Roskos |
| 10,072,866 B2 | 9/2018 | Bazar |
| 10,075,757 B2 | 9/2018 | Ugan |
| 10,078,865 B2 | 9/2018 | Joshi |
| 10,088,577 B2 | 10/2018 | Klein |
| 10,091,017 B2 | 10/2018 | Landow |
| 10,091,303 B1 | 10/2018 | Ledvina |
| 10,092,772 B1 | 10/2018 | Makesh |
| 10,129,367 B2 | 11/2018 | Yan |
| 10,139,118 B2 | 11/2018 | Law |
| 10,154,574 B2 | 12/2018 | Yeh |
| 10,178,972 B2 | 1/2019 | Raymann |
| 10,203,267 B2 | 2/2019 | D'Orlando |
| 10,230,538 B2 | 3/2019 | Killian |
| 10,234,162 B2 | 3/2019 | Lu |
| 10,242,757 B2 | 3/2019 | Baughman |
| 10,244,606 B2 | 3/2019 | Wingren |
| 10,265,011 B2 | 4/2019 | Garnavi |
| 10,271,400 B2 | 4/2019 | Parker |
| 10,304,249 B2 | 5/2019 | Cronin |

(56) References Cited

U.S. PATENT DOCUMENTS

| | | |
|---|---|---|
| 10,420,912 B2 | 9/2019 | Lütz |
| 10,527,490 B2 | 1/2020 | Dumont |
| 10,561,376 B1 | 2/2020 | Kahn |
| 10,602,599 B2 | 3/2020 | Wouhaybi |
| 10,709,899 B1 | 7/2020 | Maa |
| 10,775,068 B2 | 9/2020 | Lee |
| 10,845,829 B2 | 11/2020 | Pillai |
| 10,917,259 B1 | 2/2021 | Chein |
| 10,948,348 B2 | 3/2021 | Rountree |
| 10,969,129 B2 * | 4/2021 | Kim .................. F24F 11/61 |
| 10,972,360 B2 | 4/2021 | Cahill |
| 10,976,065 B2 | 4/2021 | Kohn |
| 10,980,096 B2 | 4/2021 | Summers |
| 11,078,899 B2 | 8/2021 | Mou |
| 11,137,163 B2 | 10/2021 | Nasis |
| 11,141,688 B2 | 10/2021 | Hur |
| 11,187,419 B2 | 11/2021 | Aleti |
| 2002/0072322 A1 | 6/2002 | Sharp |
| 2002/0072859 A1 | 6/2002 | Kajimoto |
| 2002/0096121 A1 | 7/2002 | Ingman |
| 2002/0119281 A1 | 8/2002 | Higgins |
| 2002/0128864 A1 | 9/2002 | Maus |
| 2002/0163529 A1 | 11/2002 | Evanicky |
| 2002/0187082 A1 | 12/2002 | Wu |
| 2002/0192624 A1 | 12/2002 | Darby |
| 2003/0100837 A1 | 5/2003 | Lys |
| 2003/0133292 A1 | 7/2003 | Mueller |
| 2003/0199244 A1 | 10/2003 | Siddaramanna |
| 2003/0209140 A1 | 11/2003 | Kutt |
| 2003/0209501 A1 | 11/2003 | Leung |
| 2004/0002792 A1 | 1/2004 | Hoffknecht |
| 2004/0052076 A1 | 3/2004 | Mueller |
| 2004/0060677 A1 | 4/2004 | Huang |
| 2004/0065098 A1 | 4/2004 | Choi |
| 2004/0105264 A1 | 6/2004 | Spero |
| 2004/0111036 A1 | 6/2004 | Nissila |
| 2004/0152995 A1 | 8/2004 | Cox |
| 2004/0160199 A1 | 8/2004 | Morgan |
| 2004/0176666 A1 | 9/2004 | Chait |
| 2004/0178751 A1 | 9/2004 | Mueller |
| 2004/0212321 A1 | 10/2004 | Lys |
| 2004/0222307 A1 | 11/2004 | DeLuca |
| 2004/0245351 A1 | 12/2004 | Orfield |
| 2004/0264193 A1 | 12/2004 | Okumura |
| 2004/0267385 A1 | 12/2004 | Lingemann |
| 2005/0004942 A1 | 1/2005 | Madsen |
| 2005/0053904 A1 | 3/2005 | Shephard |
| 2005/0057158 A1 | 3/2005 | Chang |
| 2005/0110416 A1 | 5/2005 | Veskovic |
| 2005/0125275 A1 | 6/2005 | Wright |
| 2005/0142524 A1 | 6/2005 | Simon |
| 2005/0151489 A1 | 7/2005 | Lys |
| 2005/0177957 A1 | 8/2005 | Long |
| 2005/0191505 A1 | 9/2005 | Akarsu |
| 2005/0200578 A1 | 9/2005 | Lee |
| 2005/0213353 A1 | 9/2005 | Lys |
| 2005/0214533 A1 | 9/2005 | Shimosaki |
| 2005/0218870 A1 | 10/2005 | Lys |
| 2005/0225976 A1 | 10/2005 | Zampini |
| 2005/0231133 A1 | 10/2005 | Lys |
| 2005/0236998 A1 | 10/2005 | Mueller |
| 2005/0253533 A1 | 11/2005 | Lys |
| 2005/0281531 A1 | 12/2005 | Unmehopa |
| 2006/0000257 A1 | 1/2006 | Samadpour |
| 2006/0002110 A1 | 1/2006 | Dowling |
| 2006/0017928 A1 | 1/2006 | Crowther |
| 2006/0018118 A1 | 1/2006 | Lee |
| 2006/0018428 A1 | 1/2006 | Li |
| 2006/0026972 A1 | 2/2006 | Masui |
| 2006/0074340 A1 | 4/2006 | Murata |
| 2006/0092520 A1 | 5/2006 | Buchsbaum |
| 2006/0103728 A1 | 5/2006 | Ishigami |
| 2006/0106437 A1 | 5/2006 | Czeisler |
| 2006/0111944 A1 | 5/2006 | Sirmans, Jr. |
| 2006/0154596 A1 | 7/2006 | Meneely, Jr. |
| 2006/0162552 A1 | 7/2006 | Yost |
| 2006/0172579 A1 | 8/2006 | Murphy |
| 2006/0173580 A1 | 8/2006 | Desrochers |
| 2006/0184283 A1 | 8/2006 | Lee |
| 2006/0207730 A1 | 9/2006 | Berman |
| 2006/0246149 A1 | 11/2006 | Buchholz |
| 2006/0252014 A1 | 11/2006 | Simon |
| 2007/0001617 A1 | 1/2007 | Pogodayev |
| 2007/0024210 A1 | 2/2007 | Zwanenburg |
| 2007/0084937 A1 * | 4/2007 | Ahmed .................. G05B 15/02 |
| | | 236/44 C |
| 2007/0115665 A1 | 5/2007 | Mueller |
| 2007/0162858 A1 | 7/2007 | Hurley |
| 2007/0166676 A1 | 7/2007 | Bird |
| 2007/0198226 A1 | 8/2007 | Lee |
| 2007/0240437 A1 | 10/2007 | Yonezawa |
| 2007/0276270 A1 | 11/2007 | Tran |
| 2007/0288247 A1 | 12/2007 | Mackay |
| 2008/0031832 A1 | 2/2008 | Wakefield |
| 2008/0103561 A1 | 5/2008 | Moscovici |
| 2008/0116780 A1 | 5/2008 | Kupper |
| 2008/0129174 A1 | 6/2008 | Schafer |
| 2008/0146892 A1 | 6/2008 | LeBoeuf |
| 2008/0182506 A1 | 7/2008 | Jackson |
| 2008/0187894 A1 | 8/2008 | Cady |
| 2008/0224121 A1 | 9/2008 | Bose |
| 2008/0225021 A1 | 9/2008 | Hekstra |
| 2008/0246629 A1 | 10/2008 | Tsui |
| 2008/0277486 A1 | 11/2008 | Seem |
| 2008/0283621 A1 * | 11/2008 | Quirino .................. F24F 11/65 |
| | | 236/1 C |
| 2008/0294012 A1 | 11/2008 | Kurtz |
| 2008/0297027 A1 | 12/2008 | Miller |
| 2009/0015403 A1 | 1/2009 | Kuris |
| 2009/0053989 A1 | 2/2009 | Lunde |
| 2009/0065596 A1 | 3/2009 | Seem |
| 2009/0068089 A1 | 3/2009 | Hussain |
| 2009/0104086 A1 | 4/2009 | Zax |
| 2009/0115597 A1 | 5/2009 | Giacalone |
| 2009/0126382 A1 | 5/2009 | Rubino |
| 2009/0128044 A1 | 5/2009 | Nevins |
| 2009/0158188 A1 * | 6/2009 | Bray .................. F24F 11/52 |
| | | 700/83 |
| 2009/0169425 A1 | 7/2009 | Park |
| 2009/0177613 A1 | 7/2009 | Martinez |
| 2009/0223126 A1 | 9/2009 | Garner |
| 2009/0241496 A1 | 10/2009 | Pintault |
| 2009/0242485 A1 | 10/2009 | Cabados |
| 2009/0243517 A1 | 10/2009 | Verfuerth |
| 2009/0273470 A1 | 11/2009 | Sinkevicius |
| 2009/0278464 A1 | 11/2009 | Chung |
| 2009/0287064 A1 | 11/2009 | Dougherty, Jr. |
| 2009/0292180 A1 | 11/2009 | Mirow |
| 2009/0300673 A1 | 12/2009 | Bachet |
| 2010/0021710 A1 | 1/2010 | Hunt |
| 2010/0084996 A1 | 4/2010 | Van De Sluis |
| 2010/0119461 A1 | 5/2010 | Bicard-Benhamou |
| 2010/0146855 A1 | 6/2010 | Ma |
| 2010/0169108 A1 | 7/2010 | Karkanias |
| 2010/0185064 A1 | 7/2010 | Bandic |
| 2010/0197495 A1 | 8/2010 | Filippini |
| 2010/0217099 A1 | 8/2010 | Leboeuf |
| 2010/0265803 A1 | 10/2010 | Lee |
| 2010/0277106 A1 | 11/2010 | Baaijens |
| 2010/0289643 A1 | 11/2010 | Trundle |
| 2010/0295244 A1 | 11/2010 | Stut |
| 2010/0298981 A1 | 11/2010 | Chamorro |
| 2010/0301776 A1 | 12/2010 | Feri |
| 2011/0010014 A1 | 1/2011 | Oexman |
| 2011/0066465 A1 | 3/2011 | Orfield |
| 2011/0084614 A1 | 4/2011 | Eisele |
| 2011/0178977 A1 | 7/2011 | Drees |
| 2011/0186644 A1 | 8/2011 | Yoshii |
| 2011/0190913 A1 | 8/2011 | Van De Sluis |
| 2011/0190945 A1 | 8/2011 | Yoshii |
| 2011/0237905 A1 | 9/2011 | Kutzik |
| 2011/0270446 A1 * | 11/2011 | Scharf .................. F24F 13/1426 |
| | | 700/282 |
| 2011/0307112 A1 | 12/2011 | Barrilleaux |

(56) References Cited

U.S. PATENT DOCUMENTS

| | | |
|---|---|---|
| 2012/0003198 A1 | 1/2012 | Barker |
| 2012/0011033 A1 | 1/2012 | Salgia |
| 2012/0019386 A1 | 1/2012 | Doraiswami |
| 2012/0031984 A1 | 2/2012 | Feldmeier |
| 2012/0064818 A1 | 3/2012 | Kurelowech |
| 2012/0072032 A1 | 3/2012 | Powell |
| 2012/0139720 A1 | 6/2012 | Mazar |
| 2012/0158203 A1 | 6/2012 | Feldstein |
| 2012/0176041 A1 | 7/2012 | Birru |
| 2012/0190001 A1 | 7/2012 | Knight |
| 2012/0206726 A1 | 8/2012 | Pervez |
| 2012/0214143 A1 | 8/2012 | Severson |
| 2012/0235579 A1 | 9/2012 | Chemel |
| 2012/0241633 A1 | 9/2012 | Smith |
| 2012/0279120 A1 | 11/2012 | Prescott |
| 2012/0298599 A1 | 11/2012 | Sichello |
| 2013/0027637 A1 | 1/2013 | Hosoki |
| 2013/0035208 A1 | 2/2013 | Dalebout |
| 2013/0065098 A1 | 3/2013 | Ohkawa |
| 2013/0073093 A1 | 3/2013 | Songkakul |
| 2013/0081541 A1 | 4/2013 | Hasenoehrl |
| 2013/0090562 A1 | 4/2013 | Ryan |
| 2013/0102852 A1 | 4/2013 | Kozloski |
| 2013/0119891 A1 | 5/2013 | Herremans |
| 2013/0134962 A1 | 5/2013 | Kamel |
| 2013/0141235 A1 | 6/2013 | Utter, II |
| 2013/0144537 A1 | 6/2013 | Schalk |
| 2013/0208576 A1 | 8/2013 | Loree, IV |
| 2013/0229114 A1 | 9/2013 | Eisele |
| 2013/0262357 A1 | 10/2013 | Amarasingham |
| 2013/0276371 A1 | 10/2013 | Birru |
| 2013/0331727 A1 | 12/2013 | Zhang |
| 2013/0342111 A1 | 12/2013 | Mohan |
| 2014/0039685 A1 | 2/2014 | Blount |
| 2014/0046193 A1 | 2/2014 | Stack |
| 2014/0052220 A1 | 2/2014 | Pedersen |
| 2014/0058566 A1 | 2/2014 | Rains, Jr. |
| 2014/0067130 A1 | 3/2014 | Pillai |
| 2014/0089836 A1 | 3/2014 | Damani |
| 2014/0093551 A1 | 4/2014 | Averett |
| 2014/0099348 A1 | 4/2014 | Averett |
| 2014/0107846 A1 | 4/2014 | Li |
| 2014/0114889 A1 | 4/2014 | Dagum |
| 2014/0125225 A1 | 5/2014 | Calame |
| 2014/0142760 A1 | 5/2014 | Drees |
| 2014/0155705 A1 | 6/2014 | Papadopoulos |
| 2014/0168636 A1 | 6/2014 | Funamoto |
| 2014/0222210 A1 | 8/2014 | Agarwal |
| 2014/0222241 A1 | 8/2014 | Ols |
| 2014/0243935 A1 | 8/2014 | Brainard |
| 2014/0249447 A1 | 9/2014 | Sereno |
| 2014/0249760 A1 | 9/2014 | Proud |
| 2014/0266669 A1 | 9/2014 | Fadell |
| 2014/0277757 A1 | 9/2014 | Wang |
| 2014/0283450 A1 | 9/2014 | Darlington |
| 2014/0298719 A1 | 10/2014 | Mackin |
| 2014/0318011 A1 | 10/2014 | Järvinen |
| 2014/0343380 A1 | 11/2014 | Carter |
| 2014/0375230 A1 | 12/2014 | Liu |
| 2015/0015152 A1 | 1/2015 | Aboulnaga |
| 2015/0027879 A1 | 1/2015 | Myre |
| 2015/0048742 A1 | 2/2015 | Wingren |
| 2015/0052975 A1 | 2/2015 | Martin |
| 2015/0066578 A1 | 3/2015 | Manocchia |
| 2015/0088786 A1 | 3/2015 | Anandhakrishnan |
| 2015/0102730 A1 | 4/2015 | Eisele |
| 2015/0119731 A1 | 4/2015 | Yasumura |
| 2015/0126806 A1 | 5/2015 | Barroso |
| 2015/0134123 A1 | 5/2015 | Obinelo |
| 2015/0154523 A1 | 6/2015 | Oobayashi |
| 2015/0174361 A1 | 6/2015 | Baaijens |
| 2015/0196232 A1 | 7/2015 | Mitsi |
| 2015/0204551 A1 * | 7/2015 | Nair .................. F24F 11/70 236/49.3 |
| 2015/0204561 A1 | 7/2015 | Sadwick |
| 2015/0212057 A1 | 7/2015 | Darveau |
| 2015/0221233 A1 | 8/2015 | Couriol |
| 2015/0227870 A1 | 8/2015 | Noboa |
| 2015/0234369 A1 | 8/2015 | Wen |
| 2015/0289347 A1 | 10/2015 | Baaijens |
| 2015/0309484 A1 | 10/2015 | Lyman |
| 2015/0312696 A1 | 10/2015 | Ribbich |
| 2015/0317592 A1 | 11/2015 | Oobayashi |
| 2015/0338117 A1 | 11/2015 | Henneberger |
| 2015/0382427 A1 | 12/2015 | Eisele |
| 2016/0007905 A1 | 1/2016 | Milner |
| 2016/0019813 A1 | 1/2016 | Mullen |
| 2016/0125758 A1 | 5/2016 | Hong |
| 2016/0139576 A1 | 5/2016 | Aiken |
| 2016/0151603 A1 | 6/2016 | Shouldice |
| 2016/0203700 A1 | 7/2016 | Bruhn |
| 2016/0206898 A1 | 7/2016 | Brainard |
| 2016/0213946 A1 | 7/2016 | Brainard |
| 2016/0231014 A1 | 8/2016 | Ro |
| 2016/0253802 A1 | 9/2016 | Venetianer |
| 2016/0284172 A1 | 9/2016 | Weast |
| 2016/0313245 A1 | 10/2016 | Sato |
| 2016/0316543 A1 | 10/2016 | Liu |
| 2016/0339203 A1 | 11/2016 | Krames |
| 2016/0341436 A1 | 11/2016 | Parker |
| 2016/0377305 A1 | 12/2016 | Kwa |
| 2017/0023225 A1 | 1/2017 | Chen |
| 2017/0023269 A1 | 1/2017 | Gevelber |
| 2017/0038787 A1 | 2/2017 | Baker |
| 2017/0050561 A1 | 2/2017 | Lickfelt |
| 2017/0053068 A1 | 2/2017 | Pillai |
| 2017/0065792 A1 | 3/2017 | Bonvallet |
| 2017/0068782 A1 | 3/2017 | Pillai |
| 2017/0080373 A1 | 3/2017 | Engelhard |
| 2017/0105666 A1 | 4/2017 | Lee |
| 2017/0123440 A1 | 5/2017 | Mangsuli |
| 2017/0136206 A1 | 5/2017 | Pillai |
| 2017/0139386 A1 | 5/2017 | Pillai |
| 2017/0162548 A1 | 6/2017 | Roth |
| 2017/0181685 A1 | 6/2017 | Lee |
| 2017/0188926 A1 | 7/2017 | Oobayashi |
| 2017/0189640 A1 | 7/2017 | Sadwick |
| 2017/0191695 A1 | 7/2017 | Bruhn |
| 2017/0196510 A1 | 7/2017 | Ouwerkerk |
| 2017/0200389 A1 | 7/2017 | Yigal |
| 2017/0208021 A1 | 7/2017 | Ingram |
| 2017/0232225 A1 | 8/2017 | Pedersen |
| 2017/0238401 A1 | 8/2017 | Sadwick |
| 2017/0259079 A1 | 9/2017 | Grajcar |
| 2017/0299210 A1 | 10/2017 | Nyamjav |
| 2017/0300647 A1 | 10/2017 | Goldberg |
| 2017/0300651 A1 | 10/2017 | Strobridge |
| 2017/0300655 A1 | 10/2017 | Lane |
| 2017/0301255 A1 | 10/2017 | Lee |
| 2017/0307243 A1 | 10/2017 | Burt |
| 2017/0319816 A1 | 11/2017 | Sokol |
| 2017/0321923 A1 | 11/2017 | Wiens-Kind |
| 2017/0325310 A1 | 11/2017 | Chen |
| 2017/0326380 A1 | 11/2017 | Moore-Ede |
| 2017/0347907 A1 | 12/2017 | Le |
| 2017/0348506 A1 | 12/2017 | Berman |
| 2017/0350610 A1 | 12/2017 | Michielsen |
| 2017/0356602 A1 | 12/2017 | Lin |
| 2017/0356670 A1 | 12/2017 | Zhang |
| 2017/0359879 A1 | 12/2017 | Eisele |
| 2017/0363314 A1 | 12/2017 | Barber |
| 2018/0011978 A1 | 1/2018 | Reeckmann |
| 2018/0012242 A1 | 1/2018 | Phan |
| 2018/0025125 A1 | 1/2018 | Crane |
| 2018/0025126 A1 | 1/2018 | Barnard |
| 2018/0042077 A1 | 2/2018 | Riley |
| 2018/0043130 A1 | 2/2018 | Martin |
| 2018/0077767 A1 | 3/2018 | Soler |
| 2018/0082261 A1 | 3/2018 | Hendriks |
| 2018/0082393 A1 | 3/2018 | Ahrens |
| 2018/0107962 A1 | 4/2018 | Lundin |
| 2018/0108442 A1 | 4/2018 | Börve |
| 2018/0119973 A1 | 5/2018 | Rothman |
| 2018/0120161 A1 | 5/2018 | Qiu |

(56) References Cited

U.S. PATENT DOCUMENTS

| | | | |
|---|---|---|---|
| 2018/0120162 A1 | 5/2018 | Qiu | |
| 2018/0149802 A1 | 5/2018 | Krames | |
| 2018/0154297 A1 | 6/2018 | Maletich | |
| 2018/0157864 A1 | 6/2018 | Tribble | |
| 2018/0160944 A1 | 6/2018 | Aubert | |
| 2018/0165588 A1 | 6/2018 | Saxena | |
| 2018/0166171 A1 | 6/2018 | Pulitzer | |
| 2018/0178063 A1 | 6/2018 | Silver | |
| 2018/0182472 A1 | 6/2018 | Preston | |
| 2018/0188701 A1 | 7/2018 | Billings | |
| 2018/0193589 A1 | 7/2018 | Mclaughlin | |
| 2018/0196925 A1 | 7/2018 | Mukherjee | |
| 2018/0197625 A1 | 7/2018 | Lobach | |
| 2018/0197637 A1 | 7/2018 | Chowdhury | |
| 2018/0197638 A1 | 7/2018 | Blanshard | |
| 2018/0206783 A1 | 7/2018 | Yoon | |
| 2018/0207445 A1 | 7/2018 | Maxik | |
| 2018/0209683 A1 | 7/2018 | Cho | |
| 2018/0216843 A1* | 8/2018 | Zhou | F24F 11/79 |
| 2018/0218289 A1 | 8/2018 | Albrecht | |
| 2018/0226158 A1 | 8/2018 | Fish | |
| 2018/0237850 A1* | 8/2018 | Mandell | G01R 33/093 |
| 2018/0240274 A1 | 8/2018 | Cronin | |
| 2018/0247029 A1 | 8/2018 | Fish | |
| 2018/0250430 A1 | 9/2018 | Machovina | |
| 2018/0264224 A1 | 9/2018 | Gronfier | |
| 2018/0266718 A1* | 9/2018 | Gillette | F24F 11/64 |
| 2018/0285934 A1 | 10/2018 | Baughman | |
| 2018/0295696 A1 | 10/2018 | Li | |
| 2018/0295704 A1 | 10/2018 | Haverlag | |
| 2018/0308390 A1 | 10/2018 | Moser | |
| 2018/0311464 A1 | 11/2018 | Krames | |
| 2018/0318602 A1 | 11/2018 | Ciccarelli | |
| 2018/0320919 A1 | 11/2018 | Tang | |
| 2018/0322240 A1 | 11/2018 | Goyal | |
| 2018/0322253 A1 | 11/2018 | Goyal | |
| 2018/0322255 A1 | 11/2018 | Connell, II | |
| 2018/0330626 A1 | 11/2018 | Donadio | |
| 2018/0331845 A1 | 11/2018 | Warren | |
| 2018/0336500 A1 | 11/2018 | Pinho et al. | |
| 2018/0336530 A1 | 11/2018 | Johnson | |
| 2018/0339127 A1 | 11/2018 | Van Reen | |
| 2018/0342327 A1 | 11/2018 | Madan | |
| 2018/0349689 A1 | 12/2018 | Lee | |
| 2018/0349945 A1 | 12/2018 | Jayaraman | |
| 2018/0350455 A1 | 12/2018 | Rosen | |
| 2018/0350456 A1 | 12/2018 | Kendrick | |
| 2018/0351758 A1 | 12/2018 | Becker | |
| 2018/0351761 A1 | 12/2018 | Li | |
| 2018/0353073 A1 | 12/2018 | Boucher | |
| 2018/0353108 A1 | 12/2018 | Prate | |
| 2018/0358117 A1 | 12/2018 | Neagle | |
| 2018/0358129 A1 | 12/2018 | Gorzelniak | |
| 2018/0358130 A1 | 12/2018 | Schmidt | |
| 2018/0369637 A1 | 12/2018 | Hoang | |
| 2018/0373843 A1 | 12/2018 | Baughman | |
| 2018/0374053 A1 | 12/2018 | Willamowski | |
| 2018/0374572 A1 | 12/2018 | Ackerman | |
| 2018/0374586 A1 | 12/2018 | Baughman | |
| 2019/0001059 A1 | 1/2019 | Handler | |
| 2019/0005844 A1 | 1/2019 | Dragicevic | |
| 2019/0007424 A1 | 1/2019 | Ford | |
| 2019/0007927 A1 | 1/2019 | Blahnik | |
| 2019/0010603 A1 | 1/2019 | Boughton | |
| 2019/0011146 A1 | 1/2019 | Seo | |
| 2019/0013960 A1 | 1/2019 | Sadwick | |
| 2019/0014643 A1 | 1/2019 | Gharabegian | |
| 2019/0024926 A1 | 1/2019 | Kim | |
| 2019/0028549 A1 | 1/2019 | Ledvina | |
| 2019/0041080 A1 | 2/2019 | Higuchi | |
| 2019/0046109 A1 | 2/2019 | Lewis | |
| 2019/0056126 A1 | 2/2019 | Law | |
| 2019/0057615 A1 | 2/2019 | Mullen | |
| 2019/0075687 A1 | 3/2019 | Brunstetter | |
| 2019/0091700 A1 | 3/2019 | Hilbig | |
| 2019/0107267 A1 | 4/2019 | Luo | |
| 2019/0193508 A1 | 6/2019 | Ganem | |
| 2019/0209806 A1 | 7/2019 | Allen | |
| 2019/0215184 A1 | 7/2019 | Emigh | |
| 2019/0224445 A1 | 7/2019 | Fernandes | |
| 2019/0268999 A1* | 8/2019 | Oobayashi | F24F 11/61 |
| 2019/0281681 A1 | 9/2019 | De Bries et al. | |
| 2019/0297700 A1 | 9/2019 | Gal | |
| 2019/0309975 A1* | 10/2019 | Salem | F24F 11/56 |
| 2019/0320516 A1 | 10/2019 | Parker | |
| 2019/0350066 A1 | 11/2019 | Herf | |
| 2019/0360718 A1* | 11/2019 | Ozaki | F24F 13/06 |
| 2019/0366032 A1 | 12/2019 | Lockley | |
| 2020/0011563 A1 | 1/2020 | Jeong | |
| 2020/0101893 A1 | 4/2020 | Studeny | |
| 2020/0103841 A1 | 4/2020 | Pillai | |
| 2020/0182495 A1 | 6/2020 | Park | |
| 2020/0224915 A1 | 7/2020 | Nourbakhsh | |
| 2020/0229289 A1 | 7/2020 | Cahill | |
| 2020/0298168 A1 | 9/2020 | Lee | |
| 2020/0340700 A1 | 10/2020 | Park | |
| 2021/0116144 A1 | 4/2021 | Morgan | |
| 2021/0207833 A1 | 7/2021 | Dameno | |
| 2021/0239339 A1* | 8/2021 | Morgan | F24F 11/58 |
| 2021/0379524 A1 | 12/2021 | Prigge | |

FOREIGN PATENT DOCUMENTS

| | | |
|---|---|---|
| CN | 1150882 | 5/1997 |
| CN | 1544222 | 11/2004 |
| CN | 1971268 | 5/2007 |
| CN | 101421558 | 4/2009 |
| CN | 201414191 Y | 2/2010 |
| CN | 101963607 | 2/2011 |
| CN | 101976063 | 2/2011 |
| CN | 102073935 | 5/2011 |
| CN | 102262710 | 11/2011 |
| CN | 202075431 | 12/2011 |
| CN | 102305451 | 1/2012 |
| CN | 202551821 | 11/2012 |
| CN | 103040443 A | 4/2013 |
| CN | 103197659 A | 7/2013 |
| CN | 103277870 | 9/2013 |
| CN | 203175090 U | 9/2013 |
| CN | 103531174 A | 1/2014 |
| CN | 103604198 A | 2/2014 |
| CN | 203454309 U | 2/2014 |
| CN | 204759076 | 11/2015 |
| EP | 0710804 | 5/1996 |
| EP | 1067825 | 1/2001 |
| EP | 1271442 | 1/2003 |
| EP | 1511218 | 3/2005 |
| EP | 1821582 | 8/2007 |
| EP | 2016879 | 1/2009 |
| EP | 2132960 | 12/2009 |
| EP | 2296448 | 3/2011 |
| EP | 2431541 | 3/2012 |
| EP | 2488912 | 8/2012 |
| EP | 3297218 | 10/2020 |
| JP | S60110520 A | 6/1985 |
| JP | H04341243 | 11/1992 |
| JP | H0552361 A | 3/1993 |
| JP | H0658593 | 3/1994 |
| JP | H0658593 A | 3/1994 |
| JP | H06159763 A | 6/1994 |
| JP | H06225858 A | 8/1994 |
| JP | H09303842 A | 11/1997 |
| JP | H10238089 A | 9/1998 |
| JP | 2000130828 | 5/2000 |
| JP | 2000294388 | 10/2000 |
| JP | 2001224078 | 8/2001 |
| JP | 2001286226 | 10/2001 |
| JP | 2001314882 | 11/2001 |
| JP | 2002042546 A | 2/2002 |
| JP | 2002059152 A | 2/2002 |
| JP | 2003042507 | 2/2003 |
| JP | 2003042509 | 2/2003 |
| JP | 2003083590 | 3/2003 |
| JP | 2003232559 | 8/2003 |

(56) References Cited

FOREIGN PATENT DOCUMENTS

| | | |
|---|---|---|
| JP | 2004005313 A | 1/2004 |
| JP | 2004053130 A | 2/2004 |
| JP | 2005040769 A | 2/2005 |
| JP | 2005177726 | 7/2005 |
| JP | 2005211319 | 8/2005 |
| JP | 2005235634 | 9/2005 |
| JP | 2006210045 | 8/2006 |
| JP | 2006522699 | 10/2006 |
| JP | 2006321721 | 11/2006 |
| JP | 2006348600 | 12/2006 |
| JP | 2007170761 | 7/2007 |
| JP | 2007184436 | 7/2007 |
| JP | 2008125541 | 6/2008 |
| JP | 2008157548 | 7/2008 |
| JP | 2008204640 | 9/2008 |
| JP | 2010119563 | 6/2010 |
| JP | 2010182661 | 8/2010 |
| JP | 2010239878 | 10/2010 |
| JP | 2011146137 | 7/2011 |
| JP | 2012001931 | 1/2012 |
| JP | 2012149839 A | 8/2012 |
| JP | 2013140523 A | 7/2013 |
| KR | 20000009824 A | 2/2000 |
| KR | 20010048235 | 6/2001 |
| KR | 20030074107 A | 9/2003 |
| KR | 20050003899 | 1/2005 |
| KR | 100771486 | 10/2007 |
| KR | 100804892 | 2/2008 |
| KR | 101102733 | 1/2012 |
| KR | 20120004243 | 1/2012 |
| KR | 101135926 | 4/2012 |
| KR | 20120039359 A | 4/2012 |
| KR | 20130108709 | 10/2013 |
| KR | 20130124184 | 11/2013 |
| WO | 0039964 | 7/2000 |
| WO | 2000058873 | 10/2000 |
| WO | 2004037301 | 5/2004 |
| WO | 2007026387 | 3/2007 |
| WO | 2008043396 | 4/2008 |
| WO | 2008051222 | 5/2008 |
| WO | 2008102308 | 8/2008 |
| WO | 2008120127 | 10/2008 |
| WO | 2008135093 | 11/2008 |
| WO | 2009030641 | 3/2009 |
| WO | 2009044330 | 4/2009 |
| WO | 2009044330 A1 | 4/2009 |
| WO | 2010046875 | 4/2010 |
| WO | 2010087386 | 8/2010 |
| WO | 2010115720 | 10/2010 |
| WO | 2011033377 | 3/2011 |
| WO | 2011046875 | 4/2011 |
| WO | 2012104773 | 8/2012 |
| WO | 2012151407 | 11/2012 |
| WO | 2013014337 | 1/2013 |
| WO | 2013049297 | 4/2013 |
| WO | 2013175348 | 11/2013 |
| WO | 2014013376 | 1/2014 |
| WO | 2014036133 | 3/2014 |
| WO | 2014071046 | 5/2014 |
| WO | 2015130786 | 9/2015 |
| WO | 2015200730 A1 | 12/2015 |
| WO | 2016019005 A1 | 2/2016 |
| WO | 2016115230 | 7/2016 |
| WO | 2016154320 | 9/2016 |
| WO | 2017008321 | 1/2017 |
| WO | 2018039433 | 3/2018 |
| WO | 2018157063 | 8/2018 |
| WO | 2019046580 | 3/2019 |
| WO | 2019151684 | 8/2019 |
| WO | 2019204779 | 10/2019 |
| WO | 2020014688 | 1/2020 |
| WO | 2020073723 | 4/2020 |
| WO | 2020075189 | 4/2020 |
| WO | 2020104878 | 5/2020 |
| WO | 2020146315 | 7/2020 |
| WO | 2020189819 | 9/2020 |
| WO | 2021011822 | 1/2021 |
| WO | 2021249653 | 12/2021 |
| WO | 2021252439 | 12/2021 |

OTHER PUBLICATIONS

Sarigiannis, D.A. and Saisana, M., 2008. Multi-objective optimization of air quality monitoring. Environmental monitoring and assessment, 136(1), pp. 87-99. (Year: 2008).*
International Search Report issued in International Application No. PCT/US2019/50416, dated Nov. 27, 2019, 1 p.
International Search Report for International Application No. PCT/US2019/050339, dated Nov. 27, 2019 (2 pages).
Siemens, "Demand-controlled ventilation: Control strategy and applications for energy-efficient operation," publicly available at least as early as May 21, 2018 (72 pages).
"Proceedings: vol. 1—Indoor Air Quality (IAQ), building related diseases and human response," Healthy Buildings, 2006 (361 pages).
Abt et al., "Characterization of Indoor Particle Sources: A Study Conducted in the Metropolitan Boston Area," Environmental Health Perspectives, 2000, vol. 108, No. 1, pp. 35-44.
Advances in Building Energy Research, 2007, vol. 1 (263 pages).
Ahn, "Synthesis and Characterization of Nanostructured ZnO and SnOx for VOC Sensor Devices," 2011 (204 pages)>.
Amaral et al., "An Overview of Particulate Matter Measurement Instruments," Atmosphere, 2015, vol. 6, pp. 1327-1345.
American Society of Heating, Refrigerating and Air-Conditioning Engineers, Inc., ASHRAE Standard 55-2010: Thermal Environmental Conditions for Human Occupancy (44 pages).
Anderson et al., "Clearing the Air: A Review of the Effects of Particulate Matter Air Pollution on Human Health," Journal of Medical Toxicology, 2012, vol. 8, pp. 166-175.
Arundel et al., "Indirect Health Effects of Relative Humidity in Indoor Environments," Environmental Health Perspectives, 1986, vol. 65, pp. 351-361.
Astolfi et al., "Subjective and objective assessment of acoustical and overall environmental quality in secondary school classrooms," The Journal of the Acoustical Society of America, 2008, vol. 123, No. 1, pp. 163-173.
Atmaca et al., "Effects of radiant temperature on thermal comfort," Building and Environment, 2007, vol. 42, pp. 3210-3220.
Atmaca et al., "Predicting the effect of relative humidity on skin temperature and skin wettedness," Journal of Thermal Biology, 2006, vol. 31, pp. 442-452.
Bekö et al., Ventilation rates in the bedrooms of 500 Danish children, Building and Environment, 2010, vol. 45, pp. 2289-2295.
Bell et al., "The Exposure-Response Curve for Ozone and Risk of Mortality and the Adequacy of Current Ozone Regulations," Environmental Health Perspectives, 2006, vol. 114, No. 4, pp. 532-536.
Braniš et al., "The effect of outdoor air and indoor human activity on mass concentrations of PM10, PM2.5, and PM1 in a classroom," Environmental Research, 2005, vol. 99, pp. 143-149.
Brook et al., "Particulate Matter Air Pollution and Cardiovascular Disease: An Update to the Scientific Statement From the American Heart Association," Circulation: Journal of the American Heart Association, 2010, vol. 121, pp. 2331-2378.
Buchanan et al., "Air filter materials, outdoor ozone and building-related symptoms in the BASE study," Indoor Air, 2008, vol. 18, pp. 144-155.
Carrer et al., "Assessment through Environmental and Biological Measurements of Total Daily Exposure to Volatile Organic Compounds of Office Workers in Milan, Italy," Indoor Air, 2000, vol. 10, pp. 258-268.
Chou, "A Practical Guide to Hazardous Gas Monitors" Occupational Hazards, 2000, vol. 62, No. 9, pp. 61-66.
Chun et al., "Thermal diary: Connecting temperature history to indoor comfort," Building and Environment, 2008, vol. 43, pp. 877-885.
Clements-Croome, "Work performance, productivity and indoor air," Scandinavian Journal of Work Environment & Health, 2008, pp. 69-78.

(56) References Cited

OTHER PUBLICATIONS

D'Ambrosio Alfano et al., "On the measurement of the mean radiant temperature and its influence on the indoor thermal environment assessment," Building and Environment, 2013, vol. 63, pp. 79-88.
De Dear et al., "Developing an Adaptive Model of Thermal Comfort and Preference," ASHRAE Transactions, 1998, vol. 104, part 1 (19 pages).
Destaillats et al., "Indoor pollutants emitted by office equipment: A review of reported data and information needs," Atmospheric Environment, 2008, vol. 42, pp. 1371-1388.
Dingle et al., "Formaldehyde Levels and the Factors Affecting These Levels in Homes in Perth, Western Australia," Indoor Built Environment, 2002, vol. 11, pp. 111-116.
Domanico et al., "Documenting the NICU design dilemma: comparative patient progress in open-ward and single family room units," Journal of Perinatology, 2011, vol. 31, pp. 281-288.
Dounis et al., "Design of a fuzzy system for living space thermal-comfort regulation," Applied Energy, 2001, vol. 69, pp. 119-144.
Engvall et al., "Sick building syndrome in relation to building dampness in multi-family residential buildings in Stockholm," International Archives of Occupational and Environmental Health, 2001, vol. 74, pp. 270-278.
Epstein et al., "Thermal Comfort and the Heat Stress Indices," Industrial Health, 2006, vol. 44, pp. 388-398.
Farzaneh et al., "Controlling automobile thermal comfort using optimized fuzzy controller," Applied Thermal Engineering, 2008, vol. 28, pp. 1906-1917.
Fisk, "Estimates Of Potential Nationwide Productivity And Health Benefits From Better Indoor Environments: An Update," Indoor Air Quality Handbook, 1999 (38 pages).
Földváry et al., "Effect of energy renovation on indoor air quality in multifamily residential buildings in Slovakia," Building and Environment, 2017, vol. 122, pp. 363-372.
Frontczak et al., "Literature survey on how different factors influence human comfort in indoor environments," Building and Environment, 2011, vol. 46, pp. 922-937.
GBD 2013 Risk Factors Collaborators, "Global, regional, and national comparative risk assessment of 79 behavioural, environmental and occupational, and metabolic risks or clusters of risks in 188 countries, 1990-2013: a systematic analysis for the Global Burden of Disease Study 2013," The Lancet, 2015, vol. 386, pp. 2287-2323.
Hasan et al., "Sensitivity study for the PMV thermal comfort model and the use of wearable devices biometric data for metabolic rate estimation," Building and Environment, 2016, vol. 110, pp. 173-183.
Hensen, "Literature Review on Thermal Comfort in Transient Conditions," Building and Environment, 1990, vol. 25, No. 4, pp. 309-316.
Howieson et al., "Building tight—ventilating right? How are new air tightness standards affecting indoor air quality in dwellings?" Journal of Building Services Engineering Research & Technology, 2014, vol. 35, No. 5, pp. 475-487.
Huang et al., "A study about the demand for air movement in warm environment," Building and Environment, 2013, vol. 61, pp. 27-33.
Huizenga et al., "Air Quality and Thermal Comfort in Office Buildings: Results of a Large Indoor Environmental Quality Survey," Proceedings of Healthy Buildings, 2006, vol. 3, pp. 393-397.
Humphreys, "Quantifying occupant comfort: are combined indices of the indoor environment practicable?" Building Research & Information, 2005, vol. 33, No. 4, pp. 317-325.
International Organization for Standardization, "Ergonomics of the thermal environment—Instruments for measuring physical quantities," BS EN ISO 7726, 2nd Edition, 2001 (62 pages).
International Organization for Standardization, "Ergonomics of the thermal environment—Analytical determination and interpretation of thermal comfort using calculation of the PMV and PPD indices and local thermal comfort criteria," ISO 7730, 3rd Edition, 2005 (11 pages).

Karjalainen et al., "User problems with individual temperature control in offices," Building and Environment, 2007, vol. 42, pp. 2880-2887.
Karjalainen, "Thermal comfort and gender: a literature review," Indoor Air, 2012, vol. 22, pp. 96-109.
Kinney, "Climate Change, Air Quality, and Human Health," American Journal of Preventive Medicine, 2008, vol. 35, No. 5, pp. 459-467.
Klepeis et al., "The National Human Activity Pattern Survey (NHAPS): a resource for assessing exposure to environmental pollutants," Journal of Exposure Analysis and Environmental Epidemiology, 2001, vol. 11, No. 3, pp. 231-252.
Knudsen et al., "Sensory and chemical characterization of VOC emissions from building products: impact of concentration and air velocity," Atmospheric Environment, 1999, vol. 33, pp. 1217-1230.
Korotcenkov et al., "In2O3- and SnO2-Based Thin Film Ozone Sensors: Fundamentals," Journal of Sensors, 2016, vol. 2016 (32 pages).
Lai et al., "An evaluation model for indoor environmental quality (IEQ) acceptance in residential buildings," Energy and Buildings, 2009, vol. 41, pp. 930-936.
Lai et al., "Perceived Importance of the Quality of the Indoor Environment in Commercial Buildings," Indoor and Built Environment, 2007, vol. 16, No. 4, pp. 311-321.
Lai et al., "Perception of importance and performance of the indoor environmental quality of high-rise residential buildings," Building and Environment, 2009, vol. 44, pp. 352-360.
Leidinger et al., "Selective detection of hazardous VOCs for indoor air quality applications using a virtual gas sensor array," Journal of Sensors and Sensor Systems, 2014, vol. 3, pp. 253-263.
Levy et al., "Ozone Exposure and Mortality: An Empiric Bayes Metaregression Analysis," Epidemiology, 2005, vol. 16, No. 4, pp. 458-468.
Lewtas, "Air pollution combustion emissions: Characterization of causative agents and mechanisms associated with cancer, reproductive, and cardiovascular effects," Reviews in Mutation Research, 2007, vol. 636, pp. 95-133.
Licina et al., "Concentrations and Sources of Airborne Particles in a Neonatal Intensive Care Unit," PLOS One, 2016 (17 pages).
Licina et al., "Emission rates and the personal cloud effect associated with particle release from the perihuman environment," Indoor Air, 2017, vol. 27, pp. 791-802.
Liu et al., "Human thermal adaptive behaviour in naturally ventilated offices for different outdoor air temperatures: A case study in Changsha China," Building and Environment, 2012, vol. 50, pp. 76-89.
Liu et al., "A Survey on Gas Sensing Technology," Sensors, 2012, vol. 12, pp. 9635-9665.
Löndahl et al., "A set-up for field studies of respiratory tract deposition of fine and ultrafine particles in humans," Journal of Aerosol Science, 2006, vol. 37, pp. 1152-1163.
Mahyuddin et al., "The spatial distribution of carbon dioxide in rooms with particular application to classrooms," Indoor and Built Environment, 2014, vol. 23, No. 3, pp. 433-448.
Massey et al., "Emission and Formation of Fine Particles from Hardcopy Devices: the Cause of Indoor Air Pollution," Monitoring, Control and Effects of Air Pollution, 2001, pp. 121-134.
McCullough et al., "Determining temperature ratings for children's cold weather clothing," Applied Ergonomics, 2009, vol. 40, pp. 870-877.
McIntyre, "Response to Atmospheric Humidity at Comfortable Air Temperature: A Comparison of Three Experiments," Annals of Occupational Hygiene, 1978, vol. 21, pp. 177-190.
Mendell et al., "Improving the Health of Workers in Indoor Environments: Priority Research Needs for a National Occupational Research Agenda," American Journal of Public Health, 2002, vol. 92, No. 9, pp. 1430-1440.
Newsham, "Clothing as a thermal comfort moderator and the effect on energy consumption," Energy and Buildings, 1997, vol. 26, pp. 283-291.
Nicol et al., "A critique of European Standard EN 15251: strengths, weaknesses and lessons for future standards," Building Research & Information, 2011, vol. 39, No. 2, pp. 183-193.

(56) References Cited

OTHER PUBLICATIONS

Novoselac et al., "A critical review on the performance and design of combined cooled ceiling and displacement ventilation systems," Energy and Buildings, 2002, vol. 34, pp. 497-509.
Ormandy et al., "Health and thermal comfort: From WHO guidance to housing strategies," Energy Policy, 2012, vol. 49, pp. 116-121.
Painter et al., "Practical application of a sensor overlay system for building monitoring and commissioning," Energy and Buildings, 2012, vol. 48, pp. 29-39.
Park et al., "Variations of formaldehyde and VOC levels during 3 years in new and older homes," Indoor Air, 2006, vol. 16, pp. 129-135.
Persily, "Evaluating Building IAQ and Ventilation with Indoor Carbon Dioxide," ASHRAE Transactions, 1997, vol. 103 (12 pages).
Revel et al., "Integration of real-time metabolic rate measurement in a low-cost tool for the thermal comfort monitoring in AAL environments," Ambient Assisted Living, 2015 (11 pages).
Salthammer et al. "Formaldehyde in the Indoor Environment," Chemical Reviews, 2010, vol. 110, No. 4, pp. 2536-2572.
Sandberg et al., "Experimental Methods in Ventilation," Advances in Building Energy Research, 2008, vol. 2, No. 1, pp. 159-210.
Satish et al., "Is CO2 an Indoor Pollutant? Direct Effects of Low-to-Mode rate CO2 Concentrations on Human Decision-Making Performance," Environmental Health Perspectives, 2012, vol. 120, No. 12, pp. 1671-1677.
Schellen et al., "Differences between young adults and elderly in thermal comfort, productivity, and thermal physiology in response to a moderate temperature drift and a steady-state condition," Indoor Air, 2010, vol. 20, pp. 273-283.
Schlegel, "The Relative Effects of Convection And Radiation Heat Transfer on the Thermal Sensations of Sedentary Subjects," 1968 (73 pages).
Seppänen et al., "Association of Ventilation Rates and CO2 Concentrations with Health and Other Responses in Commercial and Institutional Buildings," Indoor Air, 1999, vol. 9, pp. 226-252.
Seppänen et al., "Summary of human responses to ventilation," Indoor Air, 2004, vol. 14, pp. 102-118.
Song, "Could sperm quality be affected by a building environment? A literature review," Building and Environment, 2010, vol. 45, pp. 936-943.
Spinellis, "The information furnace: consolidated home control," Personal and Ubiquitous Computing, 2003, vol. 7, pp. 53-69.
Strauss et al., "Influence of Heat and Humidity on the Airway Obstruction Induced by Exercise in Asthma," The Journal of Clinical Investigation, 1978, vol. 61, pp. 433-440.
Szigeti et al., "Spatial and temporal variation of particulate matter characteristics within office buildings—The OFFICAIR study," Science of the Total Environment, 2017, vol. 587-588, pp. 59-67.
Uğursal et al., "The effect of temperature, metabolic rate and dynamic localized airflow on thermal comfort," Applied Energy, 2013, vol. 111, pp. 64-73.
Vastamäki et al., "A behavioural model of temperature controller usage and energy saving," Personal and Ubiquitous Computing, 2005, vol. 9, pp. 250-259.
Wargocki et al., "Ten questions concerning thermal and indoor air quality effects on the performance of office work and schoolwork," Building and Environment, 2017, vol. 112, pp. 359-366.
Wargocki et al., "The Effects of Outdoor Air Supply Rate in an Office on Perceived Air Quality, Sick Building Syndrome (SBS) Symptoms and Productivity," Indoor Air, 2000, vol. 10, pp. 222-236.
Weschler, "Ozone in Indoor Environments: Concentration and Chemistry," Indoor Air, 2000, vol. 10, pp. 269-288.
Weschler, "Ozone's Impact on Public Health: Contributions from Indoor Exposures to Ozone and Products of Ozone-Initiated Chemistry," Environmental Health Perspectives, 2006, vol. 114, No. 10, pp. 1489-1496.
Williams et al., Next Generation Air Monitor (NGAM) VOC Sensor Evaluation Report, EPA/600/R-15/122, 2015 (71 pages).
Wisthaler et al., "Reactions of ozone with human skin lipids: Sources of carbonyls, dicarbonyls, and hydroxycarbonyls in indoor air," Proceedings of the National Academy of Sciences, 2010, vol. 107, No. 15, pp. 6568-6575.
Wolkoff, "Impact of Air Velocity, Temperature, Humidity, and Air On Long-Term VOC Emissions From Building Products," Atmospheric Environment, 1998, vol. 32, No. 14/15, pp. 2659-2668.
Won et al., "The State-of-the-Art in Sensor Technology for Demand-Controlled Ventilation, PERD S5-42: Final Report," IRC-RR-243, NRC Publications Archive, 2005 (89 pages).
Wong et al., "A multivariate-logistic model for acceptance of indoor environmental quality (IEQ) in offices," Building and Environment, 2008, vol. 48, pp. 1-6.
Xiong et al., "Potential indicators for the effect of temperature steps on human health and thermal comfort," Energy and Buildings, 2016, vol. 113, pp. 87-98.
Yu et al., "People who live in a cold climate: thermal adaptation differences based on availability of heating," Indoor Air, 2013, vol. 23, pp. 303-310.
Zhang et al., "Study on TVOCs concentration distribution and evaluation of inhaled air quality under a re-circulated ventilation system," Building and Environment, 2007, vol. 42, pp. 1110-1118.
Zhang et al., "Thermal comfort in naturally ventilated buildings in hot-humid area of China," Building and Environment, 2010, vol. 45, pp. 2562-2570.
Zhao et al., "Effect of particle spatial distribution on particle deposition in ventilation rooms," Journal of Hazardous Materials, 2009, vol. 170, pp. 449-456.
Zhou et al., "Experimental study of the influence of anticipated control on human thermal sensation and thermal comfort," Indoor Air, 2014, vol. 24, pp. 171-177.
"Active Design Guidelines: Promoting Physical Activity and Health in Design," New York City Departments of Design and Construction, 2010.
"Assembly: Civic Design Guidelines," Center for Active Design, 2018.
"LEED Reference Guide for Building Design and Construction," U.S. Green Building Council, 2013, (67 pages).
"Policy recommendations on protection from exposure to second-hand tobacco smoke," World Health Organization, 2007, pp. 1-50 (56 pages).
"Preventing Diarrhoea Through Better Water, Sanitation and Hygiene: Exposures and impacts in low- and middle-income countries," World Health Organization, 2014, pp. 1-33 (48 pages).
"Social determinants of mental health," World Health Organization and Calouste Gulbenkian Foundation, 2014, pp. 1-52 (54 pages).
Abrahamsson et al., "Impairment of Contrast Sensitivity Function (CSF) as a Measure of Disability Glare," Investigative Ophthalmology & Visual Science, 1986, vol. 27, pp. 1131-1136.
Akacem et al., "Bedtime and evening light exposure influence circadian timing in preschoolage children: A field study," Neurobiology of Sleep and Circadian Rhythms, 2016, vol. 1, pp. 27-31.
Akacem et al., "Sensitivity of the circadian system to evening bright light in preschool-age children," Physiological Reports, 2018, vol. 6, No. 5, pp. 1-10.
Al Horr et al., "Occupant productivity and office indoor environment quality: A review of the literature," Building and Environment, 2016, vol. 105, pp. 369-389.
Allen, Michele L. et al., "Effective Parenting Interventions to Reduce Youth Substance Use: A Systematic Review," Pediatrics, 2016, vol. 138, No. 2 (19 pages).
Allergy Buyers Club, "Philips Wake Up Light Dawn Simulators Alarm Clocks," retrieved from http://www.allergybuyersclub.com/philips-wake-up-light-dawn-simulator-alarm-clocks.html, retrieved on Aug. 13, 2012, 2 pages.
Amendment, filed Jan. 25, 2018, for U.S. Appl. No. 15/421,046, Eisele et al., "LED Lighting System," 6 pages.
American Diabetes Association, "Standards of Medical Care in Diabetes—2017 Abridged for Primary Care Providers," Clinical Diabetes, 2017, vol. 35, No. 1, pp. 5-26 (22 pages).
American Society of Heating, Refrigerating and Air-Conditioning Engineers et al., "Indoor Air Quality Guide: Best Practices for Design, Construction and Commissioning," 2009 (198 pages).

(56) References Cited

OTHER PUBLICATIONS

American Society of Heating, Refrigerating and Air-Conditioning Engineers, "Indoor Air Quality Guide: Best Practices for Design, Construction and Commissioning," 2009 (19 pages).
American Ultraviolet, "Handheld Germicidal Fixtures," retrieved from http://americanultraviolet.com/germicidal_solutions/commercial_products/handheld . . . , retrieved on Aug. 13, 2012, 1 page.
American Ultraviolet, "In Room Germicidal Solutions," HVAC MRS (0810/2.5M), retrieved from http://www.americanultraviolet.com, 2 pages.
Apaydin, Erica A. et al., "Asystematic review of St. John's wort for major depressive disorder," Systematic Reviews, 2016, vol. 5, No. 148 (25 pages).
Aries et al., "Daylight and health: A review of the evidence and consequences for the built environment," Lighting Research & Technology, 2015, vol. 47, pp. 6-27.
Aries et al., "Windows, view, and office characteristics predict physical and psychological discomfort," Journal of Environmental Psychology, 2010, vol. 30, pp. 533-541.
Aries, "Human lighting demands: healthy lighting in an office environment," thesis, 2005 (159 pages).
Arrington et al., "Voluntary Task Switching: Chasing the Elusive Homunculus," Journal of Experimental Psychology: Learning, Memory, and Cognition, 2005, vol. 31, No. 4, pp. 683-702.
Australian Examination report No. 1, dated Dec. 13, 2017, for Australian Application No. 2017200995, 6 pages.
Australian Patent Examination Report, dated Sep. 14, 2016, for Australian Application No. 2013308871, 5 pages.
Averett et al., "Titanium Dioxide Photocatalytic Compositions and Uses Thereof," U.S. Appl. No. 61/482,393, filed May 4, 2011, 26 pages.
Babyak, Richard J., "Ready to roll," Appliance Manufacturer, 2000, vol. 48, No. 9, pp. 40-42.
Bakker et al., "User satisfaction and interaction with automated dynamic facades: a pilot study," Building and Environment, 2014, vol. 78, pp. 44-52.
Beauchemin et al., "Sunny hospital rooms expedite recovery from severe and refractory depressions," Journal of Affective Disorders, 1996, vol. 40, pp. 49-51.
Beaven et al., "A Comparison of Blue Light and Caffeine Effects on Cognitive Function and Alertness in Humans," PLoS One, 2013, vol. 8, No. 10 (7 pages).
Bellicha, Alice et al., "A multistage controlled intervention to increase stair climbing at work: effectiveness and process evaluation," International Journal of Behavioral Nutrition and Physical Activity, 2016, vol. 13, No. 47, pp. 1-9 (9 pages).
Benedetti, "Morning sunlight reduces length of hospitalization in bipolar depression," Journal of Affective Disorders, 2001, vol. 62, pp. 221-223.
Berman et al., "The Cognitive Benefits of Interacting With Nature," Psychological Science, 2008, vol. 19, No. 12, pp. 1207-1212.
Berto, "Exposure to restorative environments helps restore attentional capacity," Journal of Environmental Psychology, 2005, vol. 25, pp. 249-259.
Berto, "The Role of Nature in Coping with Psycho-Physiological Stress: A Literature Review on Restorativeness," Behavioral Sciences, 2014, vol. 4, pp. 394-409.
Besner et al., "The Stroop effect and the myth of automaticity," Psychonomic Bulletin & Review, 1997, vol. 4, No. 2, pp. 221-225.
Bhutta, Zulfiqar A. et al., "Evidence-based interventions for improvement of maternal and child nutrition: what can be done and at what cost?," The Lancet, 2013, vol. 382, pp. 452-447.
Bidonde, J. et al., "Aerobic exercise training for adults with fibromyalgia (Review)," Cochrane Database of Systematic Reviews, 2017, Issue 6 (130 pages).
Bierman et al., "Characterizing Daylight Photosensor System Performance to Help Overcome Market Barriers," Journal of the Illuminating Engineering Society, 2000, vol. 29, No. 1, pp. 101-115.

Bohn, Hendrik et al., "SIRENA—Service Infrastructure for Real-time Embedded Networked Devices: A service oriented framework for different domains," 2006 (7 pages).
Borisuit et al., "Effects of realistic office daylighting and electric lighting conditions on visual comfort, alertness and mood," Lighting Research and Technology, 2015, vol. 47, pp. 192-209.
Boubekri et al., "Impact of Windows and Daylight Exposure on Overall Health and Sleep Quality of Office Workers: A Case-Control Pilot Study," Journal of Clinical Sleep Medicine, 2014, vol. 10, No. 6, pp. 603-611.
Boubekri et al., "The Impact of Optimized Daylight and Views on the Sleep Duration and Cognitive Performance of Office Workers," International Journal of Environmental Research and Public Health, 2020, vol. 17, No. 3219, pp. 1-16.
Boubekri et al., "Windows and Environmental Satisfaction: A Survey Study of an Office Building," Indoor Environment, 1993, vol. 2, pp. 164-172.
Bourcier, Johann et al., "A Dynamic-SOA Home Control Gateway," 2006 (9 pages).
Brager, Gail S., et al., "Thermal adaptation in the built environment: a literature review," Energy and Buildings, 1998, vol. 27, pp. 83-96 (15 pages).
Brookstone, "Tranquil Moments® Advanced Sleep Sounds," 2012, retrieved from http://www.brookstone.com/tranquil-moments-advanced-sleep-sound . . . , retrieved on Apr. 28, 2014, 3 pages.
Brown et al., "Interventions to Reduce Harm from Smoking with Families in Infancy and Early Childhood: A Systematic Review," International Journal of Environmental Research and Public Health, 2015, vol. 12, pp. 3091-3119 (29 pages).
Brown et al., "Recommendations for healthy daytime, evening, and night-time indoor light exposure," Preprints, 2020 (21 pages).
Brown, Nicola et al., "Interventions to Reduce Harm from Smoking with Families in Infancy and Early Childhood: A Systematic Review ," International Journal of Environmental Research and Public Health, 2015, vol. 12, pp. 3091-3119, (29 pages).
Burge et al., "Sick Building Syndrome: A Study of 4373 Office Workers," Annals of Occupational Hygiene, 1987, vol. 31, No. 4A, pp. 493-504.
Bussières, André E., et al., "The Treatment of Neck Pain-Associated Disorders and Whiplash-Associated Disorders: A Clinical Practice Guideline," Journal of Manipulative and Physiological Therapeutics, 2016, vol. 39, No. 8, pp. 523-564.e27 (69 pages).
Butler et al., "Effects Of Setting On Window Preferences And Factors Associated With Those Preferences," Environment and Behavior, 1989, vol. 21, No. 1, pp. 17-31.
Byrne, Daniel W. et al., "Seven-Year Trends in Employee Health Habits From a Comprehensive Workplace Health Promotion Program at Vanderbilt University," Journal of Occupational and Environmental Medicine, Dec. 2011, vol. 53, No. 12, pp. 1372-1381 (10 pages).
Cairncross, Sandy, et al., "Water, sanitation and hygiene for the prevention of diarrhoea," International Journal of Epidemiology, 2010, vol. 39, pp. :i193-i205 (14 pages).
California Energy Commission, 2013 Building Energy Efficiency Standards for Residential and Nonresidential Buildings, CEC☐400☐2012☐004-CMF-REV2 (268 pages).
Campanella et al., "Well Living Lab: A New Tool for Measuring the Human Experience in the Built Environment," Conscious Cities Journal No. 2, Conscious Cities Anthology 2017: Bridging Neuroscience, Architecture and Technology, 2017 (5 pages).
Canadian Office Action, dated Jul. 18, 2017, for Canadian Application No. 2,946,367, 3 pages.
Canadian Office Action, dated Jul. 25, 2017, for Canadian Application No. 2,940,766, 6 pages.
Cao, Chunmei et al., "Effect of Active Workstation on Energy Expenditure and Job Performance: A Systematic Review and Meta-analysis," Journal of Physical Activity and Health, 2016, vol. 13, No. 5, pp. 562-571.
Carlucci, Salvatore et al., "A review of indices for assessing visual comfort with a view to their use in optimization processes to support building integrated design," Renewable and Sustainable Energy Reviews, 2015, vol. 47, pp. 1016-1033.

(56) References Cited

OTHER PUBLICATIONS

Carr et al., "Interventions for tobacco cessation in the dental setting (Review)," Cochrane Database of Systematic Reviews, 2012, Issue 6, pp. 1-38 (40 pages).
Center for Disease Control and Prevention, "Steps to Wellness: A Guide to Implementing the 2008 Physical Activity Guidelines for Americans in the Workplace" U.S. Department of Health Services, 2012, (120 pages).
Centers for Disease Control and Prevention, "Strategies to Prevent Obesity and Other Chronic Diseases: The CDC Guide to Strategies to Increase the Consumption of Fruits and Vegetables.," U.S. Department of Health and Human Services, 2011, pp. 1-60 (68 pages).
Chellappa et al., "Can light make US bright? Effects of light on cognition and sleep," Progress in Brain Research, 2011, vol. 190, 119-133.
Chellappa et al., "Non-Visual Effects of Light on Melatonin, Alertness and Cognitive Performance: Can Blue-Enriched Light Keep Us Alert?," PLoS One, 2011, vol. 6, No. 1 (11 pages).
Chellappa et al., "Sex differences in light sensitivity impact on brightness perception, vigilant attention and sleep in humans," Scientific Reports, 2017, vol. 7, No. 14215, pp. 1-9.
Chellappa, "Individual differences in light sensitivity affect sleep and circadian rhythms," Sleep, 2021, vol. 44, No. 2, pp. 1-10.
Chen et al., "The Effect of Blue-Enriched Lighting on Medical Error Rate in a University Hospital ICU," The Joint Commission Journal on Quality and Patient Safety, 2021, vol. 47, No. 3, pp. 165-175.
Chen, Chun-Yuan, "A MOM-based Home Automation Platform in Heterogeneous Environments," A Thesis Submitted to Institute of Computer Science and Engineering College of Computer Science National Chiao Tung University, 2006 (93 pages).
Chinese Office Action, dated May 5, 2016, for Chinese Application No. 201380051774.0, 10 pages.
Cho et al., "Effects of artificial light at night on human health: A literature review of observational and experimental studies applied to exposure assessment," Chronobiology International: The Journal of Biological and Medical Rhythm Research, 2015, pp. 1-17.
Choi et al., "Impacts of indoor daylight environments on patient average length of stay (ALOS) in a healthcare facility," Building and Environment, 2012, vol. 50, pp. 65-75.
Christoffersen et al., "Windows and Daylight—A post-occupancy evaluation of Danish offices," 2000 (9 pages).
Clasen et al., "Interventions to improve water quality for preventing diarrhoea (Review)," Cochrane Database of Systematic Reviews, 2015, Issue 10, pp. 1-175 (178 pages).
Communication pursuant to Article 94(3) EPC issued in EP Application No. 20191237.5 dated Jun. 14, 2021 (13 pages).
Communication pursuant to Article 94(3) EPC, dated Mar. 15, 2018, for European Application No. 15 754 628.4-1222, 9 pages.
Communication pursuant to Article 94(3) EPC, dated Nov. 23, 2016, for European Application No. 13833105.3, 8 pages.
Communication pursuant to Rule 164(1) EPC, dated Mar. 30, 2016, for European Application No. 13833105.3-1853 / 2891019, 9 pages.
Corbijn Van Willenswaard, Kyrsten et al., "Music interventions to reduce stress and anxiety in pregnancy: a systematic review and meta-analysis," BMC Psychiatry, 2017, vol. 17, No. 271, pp. 1-9 (9 pages).
Corrected Notice of Allowance, dated Jun. 26, 2017, for U.S. Appl. No. 14/012,444, Pillai et al, "Systems, Methods and Articles for Enhancing Wellness Associated With Habitable Environments," 2 pages.
Corrected Notice of Allowance, dated Jun. 6, 2017, for U.S. Appl. No. 14/012,444, Pillai et al, "Systems, Methods and Articles for Enhancing Wellness Associated With Habitable Environments," 2 pages.
Coury, Helenice J.C.G. et al., "Evaluation of the effectiveness of workplace exercise in controlling neck, shoulder and low back pain: a systematic review," Brazilian Journal of Physical Therapy, 2009, vo. 13, No. 6, pp. 461-479.
Dalager et al., "Implementing intelligent physical exercise training at the workplace: health effects among office workers—a randomized controlled trial," European Journal of Applied Physiology, 2016, vol. 116, pp. 1433-1442 (10 pages).
Dalal, Reeshad S., "Job Attitudes: Cognition and Affect," Handbook of Psychology, Second Edition, 2013, pp. 341-366 (26 pages).
Darvesh, Nazia, et al., "Water, sanitation and hygiene interventions for acute childhood diarrhea: a systematic review to provide estimates for the Lives Saved Tool," BMC Public Health, 2017, vol. 17(Suppl 4), Article 776, pp. 101-111 (11 pages).
Delos, "Delos and MGM Grand Las Vegas Introduce First-Ever Stay Well Rooms, Sep. 20, 2012, retrieved from http://delosliving.com/staywell/delos-mgm-grand-las-vegas-introduce-first-ever-stay-well- . . . " retrieved on May 14, 2014, 4 pages.
Delos, "Delos Announces First-Ever WELL™ Certified Office At CBRE Headquarters In Los Angeles, Nov. 19, 2013, retrieved from http://delosliving.com/press-release/delos-the-pioneer-of-wellness-real-estate-announces-fi . . . ," retrieved on May 14, 2014, 4 pages.
Delos, "MGM Grand and Delos Complete Expansion Of Stay Well Experience And Introduce New Stay Well Lounge, Feb. 26, 2014, retrieved from http://delosliving.com/press-release/mgm-grand-and-delos-complete-expansion-of-stay-we . . . ," retrieved on May 14, 2014, 4 pages.
Delos, "World's First WELL® Certified Restaurants Introduced by Delos And LYFE Kitchen, Dec. 4, 2013, retrieved from http://delosliving.com/press-release/worlds-first-well-certified-restaurants-introduced-by-d . . . " retrieved on May 14, 2014, 4 pages.
Delos, "World's First Wellness-Infused Student Housing Model In Philadelphia For St. Joseph's University Introduced By Delos and Cross Properties, Nov. 25, 2013, retrieved from http://delosliving.com/press-release/delos-the-pioneer-of-wellness-real-estate-and-cross-pr . . . ," retrieved on May 14, 2014, 4 pages.
Delos, "Introducing Wellness Real Estate—Can Your Home Actually Improve Your Health?," May 1, 2012, retrieved from http://delosliving.com/press-release/can-your-home-actually-improve-your-health/, retrieved on May 14, 2014, 3 pages.
Diamond, "Executive Functions," Annual Review of Psychology, 2013, vol. 64, pp. 135-168.
Dijk et al., "Light, Sleep, and Circadian Rhythms: Together Again," PLoS Biology, 2009, vol. 7, No. 6, pp. 1-4.
Duckitt, Kirsten et al., "Menorrhagia," BMJ Clinical Evidence, 2012, pp. 1-69 (69 pages).
Dueñas, Juan C. et al., "An End-to-End Service Provisioning Scenario for the Residential Environment," IEEE Communications Magazine, 2005, pp. 94-100.
Dussault et al., "Office buildings with electrochromic windows: A sensitivity analysis of design parameters on energy performance, and thermal and visual comfort," Energy and Building, 2017, vol. 153, pp. 50-62.
Ebbert et al., "Interventions for smokeless tobacco use cessation (Review)," Cochrane Database of Systematic Reviews, 2015, No. 10 (56 pages).
Eisele et al, "LED Lighting System," Notice of Allowance, dated Apr. 21, 2015, for U.S. Appl. No. 14/486,753, 9 pages.
Eisele et al, "LED Lighting System," Notice of Allowance, dated Mar. 14, 2016, for U.S. Appl. No. 14/805,243, 6 pages.
Eisele et al, "LED Lighting System," Notice of Allowance, dated May 13, 2014, for U.S. Appl. No. 13/863,589, 6 pages.
Eisele et al, "LED Lighting System," Office Action dated Oct. 22, 2015, for U.S. Appl. No. 14/805,243, 14 pages.
Eisele et al, "LED Lighting System," Office Action, dated Feb. 4, 2015, for U.S. Appl. No. 14/486,753, 7 pages.
Eisele et al, "LED Lighting System," Office Action, dated Jul. 26, 2012, for U.S. Appl. No. 12/900,158, 13 pages.
Eisele et al, "LED Lighting System," Office Action, dated Jun. 5, 2013, for U.S. Appl. No. 13/863,589, 5 pages.
Eisele et al, "LED Lighting System," Office Action, dated Nov. 1, 2013, for U.S. Appl. No. 13/863,589, 6 pages.
Eisele et al, "LED Lighting System," Office Action, dated Oct. 22, 2015, for U.S. Appl. No. 14/805,243, 18 pages.
Eisele et al, "LED Lighting System," Preliminary Amendment, filed Dec. 30, 2014, for U.S. Appl. No. 14/486,753.

(56) References Cited

OTHER PUBLICATIONS

Eisele et al, "LED Lighting System," Preliminary Amendment, filed Sep. 15, 2015, for U.S. Appl. No. 14/805,243, 9 pages.
Eisele et al, "LED Lighting System," Preliminary Amendment, filed Sep. 8, 2016, for U.S. Appl. No. 15/187,317, 9 pages.
Eisele et al, "LED Lighting System," Response, filed Jan. 27, 2014, for U.S. Appl. No. 13/863,589, 3 pages.
Eisele et al, "LED Lighting System," Response, filed Jan. 5, 2016, for U.S. Appl. No. 14/805,243, 3 pages.
Eisele et al, "LED Lighting System," Response, filed Mar. 6, 2015, for U.S. Appl. No. 14/486,753, 3 pages.
Eisele et al, "LED Lighting System," Response, filed Sep. 4, 2013, for U.S. Appl. No. 13/863,589, 3 pages.
Eisele et al., "LED Lighting System," Amendment, filed Oct. 24, 2012, for U.S. Appl. No. 12/900,158, 12 pages.
Eisele et al., "LED Lighting System," Second Preliminary Amendment filed Dec. 30, 2014, for U.S. Appl. No. 14/486,753, 9 pages.
Eisele et al., "LED Lighting System," U.S. Appl. No. 61/249,858, filed Oct. 8, 2009, 58 pages.
Eisele et al., "LED Lighting System," Notice of Allowance dated Jan. 9, 2013, for U.S. Appl. No. 12/900,158, 9 pages.
European Agency for Safety and Health at Work, et al, "Work-related musculoskeletal disorders: back to work report," Luxembourg: Office for Official Publications of the European Communities, 2007. pp. 3-100 (100 pages).
European Search Report for EP Application No. 15160578.9, dated Aug. 11, 2015, 8 pages.
Examination Report issued in AU Application No. 2016202287 dated May 8, 2020.
Examiner's Report issued in CA Application No. 2,940,766 dated Jan. 11, 2019.
Exelmans et al., "Bedtime mobile phone use and sleep in adults," Social Science & Medicine, 2016, vol. 148, pp. 93-101.
Extended European Search Report and Lack of Unity of Invention Sheet B, dated Jul. 28, 2016, for European Application No. 13833105.3, 17 pages.
Extended European Search Report issued in EP Application No. 17844397.4 dated Jun. 17, 2020 (8 pages).
Extended European Search report issued in EP Application No. 20152815.5 dated Aug. 4, 2020.
Extended European Search Report issued in EP Application No. 20191237.5 dated Sep. 21, 2020.
Extended European Search Report, dated Feb. 1, 2018, for European Application No. 17167920.2-1213, 10 pages.
Extended European Search Report, dated Jul. 12, 2017, for European Application No. 15754628.4-1958, 11 pages.
Extended European Search Report, dated May 28, 2018, for European Application No. 16737803.3-1222/3245631, 7 pages.
Extended European Search Report, dated Nov. 5, 2014, for European Application No. 12779504.5-1352, 6 pages.
Fabrictech International, "PureCare™ Antibacterial Silver," retrieved from http://www.fabrictech.com/shop/purecaresilver.html, retrieved on Aug. 13, 2012, 1 page.
Fabrictech International, "Total Health & Wellness Protection Package—Save 25%," retrieved from http://www.fabrictech.com/shop/custom-package/total-healthawellness-protection.html, retrieved on Aug. 13, 2012, 3 pages.
Felleman et al., "Distributed Hierarchical Processing in the Primate Cerebral Cortex," Cerebral Corte, 1991, vol. 1, No. 1, pp. 1-47.
Ferguson Ma et al., "Hearing aids for mild to moderate hearing loss in adults (Review)," Cochrane Database of Systematic Reviews, 2017, Issue 9, pp. 1-46 (48 pages).
Fewtrell, Lorna, et al., "Water, sanitation, and hygiene interventions to reduce diarrhoea in less developed countries: a systematic review and meta-analysis," The Lancet Infect Diseases, 2005, vol. 5, pp. 42-52 (11 pages).
Figueiro et al., "Daylight and Productivity—A Field Study," Panel 8. Human and Social Dimensions of Energy Use: Understanding Markets and Demand, 2002 (10 pages).
Finnegan et al., "Work Attitudes in Windowed vs. Windowless Environments," The Journal of Social Psychology, 1981, vol. 115, pp. 291-292.
First Examination Report issued in IN Application No. 201617032677 dated Jul. 30, 2020.
Fisk et al., "Age-Related Impairment in Executive Functioning: Updating, Inhibition, Shifting, and Access," Journal of Clinical and Experimental Neuropsychology, 2004, vol. 26, No. 7, pp. 874-890.
Fisk, William, "How IEQ Affects Health, Productivity," ASHRAE Journal, 2002, vol. 44, No. 5, pp. 56-60 (4 pages).
Fonken et al., "Dim Light at Night Disrupts Molecular Circadian Rhythms and Affects Metabolism," Journal of Biological Rhythms, Author Manuscript, 2013, vol. 28, No. 4 (15 pages).
Food Service Guidelines Federal Workgroup, "Food Service Guidelines for Federal Facilities," 2017, U.S. Department of Health and Human Services, Washington, DC (30 pages).
Fossum et al., "The Association Between Use of Electronic Media in Bed Before Going to Sleep and Insomnia Symptoms, Daytime Sleepiness, Morningness, and Chronotype," Behavioral Sleep Medicine, 2014, vol. 12, pp. 343-357.
Foster et al., "Shortened complex span tasks can reliably measure working memory capacity," Memory & Cognition, 2015, vol. 43, pp. 226-236.
Foster, "Fundamentals of circadian entrainment by light," Lighting Research & Technology, 2021, vol. 53, pp. 377-393.
Frazer K et al., "Impact of institutional smoking bans on reducing harms and secondhand smoke exposure (Review)," Cochrane Database of Systematic Reviews, 2016, Issue 5, pp. 1-85 (87 pages).
Frazer, K et al., "Legislative smoking bans for reducing harms from secondhand smoke exposure, smoking prevalence and tobacco consumption (Review)," Cochrane Database of Systematic Reviews, 2016, Issue 2, pp. 1-192 (194 pages).
Frontczak, Monika et al., "Literature survey on how different factors influence human comfort in indoor environments," Building and Environment, vol. 46, 2011, pp. 922-937 (16 pages).
Galasiu et al., "Occupant preferences and satisfaction with the luminous environment and control systems in daylit offices: a literature review," Energy and Buildings, 2006, vol. 38, pp. 728-742.
Garn, Joshua V., et al., "The impact of sanitation interventions on latrine coverage and latrine use: A systematic review and meta-analysis," International Journal of Hygiene and Environmental Health, 2017, vol. 220, pp. 329-340 (12 pages).
GBD 2016 Risk Factors Collaborators, "Global, regional, and national comparative risk assessment of 84 behavioural, environmental and occupational, and metabolic risks or clusters of risks, 1990-2016: a systematic analysis for the Global Burden of Disease Study 2016," The Lancet, 2017, vol. 390, pp. 1345-1422 (78 pages).
Geaney, F., et al., "The effectiveness of workplace dietary modification interventions: A systematic review," Preventive Medicine, 2013, vol. 57, pp. 438-447, 10 pages.
General Services Administration, "Sound Matters: How to achieve accoustic comfort in the contemporary office," 2011, pp. 1-42 (42 pages).
Goodman, "Measurement and specification of lighting: A look at the future," Lighting Research and Technology, 2009, vol. 41, pp. 229-243.
Goodman, "Green Wall Frame," Amendment After Allowance, filed May 11, 2016, for U.S. Appl. No. 29/528,147, 8 pages.
Goodman, "Green Wall Frame," Notice of Allowance, dated Feb. 11, 2016, for U.S. Appl. No. 29/528,147, 11 pages.
Goodnough, L.T. et al., "Detection, evaluation, and management of preoperative anaemia in the elective orthopaedic surgical patient: NATA guidelines," British Journal of Anaesthesia, 2011, vol. 106, No. 1, pp. 13-22.
Grant et al., "Daytime Exposure to Short Wavelength-Enriched Light Improves Cognitive Performance in Sleep-Restricted College-Aged Adults," Frontier in Neurology, 2021, vol. 12, pp. 1-10.
Graves, Lee E.F. et al., "Evaluation of sit-stand workstations in an office setting: a randomised controlled trial," BMC Public Health, 2015, vol. 15, No. 1145 (14 pages).

(56) References Cited

OTHER PUBLICATIONS

Grønli et al., "Reading from an iPad or from a book in bed: the impact on human sleep. A randomized controlled crossover trial," Sleep Medicine, 2016, vol. 21, pp. 86-92.

GSky Plant Systems, Inc., "Smart Wall Cabinet," 2012, retrieved from http://gsky.com/green-walls/smartwall/, retrieved on Apr. 29, 2015, 3 pages.

Gueymard, "Turbidity Determination from Broadband Irradiance Measurements: A Detailed Multicoefficient Approach," Journal of Applied Meteorology, 1998, vol. 37, pp. 414-435.

Guirao, "Average Optical Performance of the Human Eye as a Function of Age in a Normal Population," Investigative Ophthalmology & Visual Science, 1999, vol. 40, No. 1, pp. 203-213.

Guyatt et al., "GRADE: an emerging consensus on rating quality of evidence and strength of recommendations," BMJ, Apr. 26, 2008, vol. 336, pp. 924-926 (3 pages).

Hafner et al., Why sleep matters—the economic costs of insufficient sleep: A cross-country comparative analysis, 2016 (101 pages).

Haider, B.A. et al., "Anaemia, prenatal iron use, and risk of adverse pregnancy outcomes: systematic review and meta-analysis," BMJ, 2013, pp. 1-19.

Haider, BA et al., "Multiple-micronutrient supplementation for women during pregnancy (Review)," Cochrane Database of Systematic Reviews, 2015, Issue 11, pp. 1-100 (103 pages).

Hajdukiewicz, Magdalena et al., "Calibrated CFD simulation to evaluate thermal comfort in a highly-glazed naturally ventilated room," Building and Environment, 2013, vol. 70, pp. 73-89.

Hajdukiewicz, Magdalena et al., "Formal calibration methodology for CFD models of naturally ventilated indoor environments," Building and Environment, 2012, vol. 59 (28 pages).

Hannibal et al., "Melanopsin Is Expressed in PACAP-Containing Retinal Ganglion Cells of the Human Retinohypothalamic Tract," Investigative Ophthalmology & Visual Science, 2004, vol. 45, No. 11, pp. 4202-4209.

Haq et al., "A review on lighting control technologies in commercial buildings, their performance and affecting factors," Renewable and Sustainable Energy Reviews, 2014, vol. 33, pp. 268-279.

Hasan, Mohammad H., et al. "Sensitivity study for the PMV thermal comfort model and the use of wearable devices biometric data for metabolic rate estimation," Building and Environment, 2016, vol. 110, pp. 173-183 (11 pages).

Heijnen, Marieke et al., "Shared Sanitation versus Individual Household Latrines: A Systematic Review of Health Outcomes," PLoS One, 2014, vol. 9, Issue 4, pp. 1-9 (9 pages).

Higuchi et al., "Influence of eye colors of Caucasians and Asians on suppression of melatonin secretion by light," American Journal of Physiology: Regulatory, Integrative and Comparative Physiology, 2007, vol. 292, pp. R2352-R2356.

Hiscocks, "Measuring Light," 2008 (9 pages).

Hiscocks, "Measuring Luminance with a Digital Camera: Case History," 2013 (10 pages).

Hoisington et al., "Ten questions concerning the built environment and mental health, Building and Environment," 2019, vol. 155, pp. 58-69.

Horne et al., "A Self-Assessment Questionnaire to Determine Morningness-Eveningness in Human Circadian Rhythms," International Journal of Chronobiology, 1976, vol. 4, pp. 97-110.

Hossain, Muttaquina et al., "Evidence-based approaches to childhood stunting in low and middle income countries: a systematic review," Archives of Disease in Childhood, 2017, vol. 102, pp. 903-909.

Hou, Can et al., "Do Mobile Phone Applications Improve Glycemic Control (HbA1c) in the Self-management of Diabetes? A Systematic Review, Meta-analysis, and Grade of 14 Randomized Trials," Diabetes Care, 2016, vol. 39, pp. 2089-2095.

Huizenga, C. et al., "Air Quality and Thermal Comfort in Office Buildings: Results of a Large Indoor Environmental Quality Survey," Proceeding of Healthy Buildings, 2006, vol. 3 (6 pages).

Huo, Jun Sheng et al., "Effect of NaFeEDTA-Fortified Soy Sauce on Anemia Prevalence in China: A Systematic Review and Meta-analysis of Randomized Controlled Trials," Biomedical and Environmental Science, 2015, vol. 28, No. 11, pp. 788-798.

Hutchinson, et al. "Improving nutrition and physical activity in the workplace: a meta-analysis of intervention studies," Health Promotion International, 2012, vol. 27, No. 2, pp. 238-249 (12 pages).

Hysing et al., "Sleep and use of electronic devices in adolescence: results from a large population-based study," BMJ Open, 2015, vol. 5, pp. 1-7.

International Commission on Illumination, Technical Report: Guide on the Limitation of the Effects of Obtrusive Light From outdoor Lighting Installations, 2003 (46 pages).

International Search Report and the Written Opinion of the International Searching Authority, dated Jun. 8, 2015, for International Application No. PCT/US2015/017528, 20 pages.

International Search Report and Written Opinion for PCT/US2022/020903, dated Jul. 12, 2022 (17 pages).

International Search Report and Written Opinion of the International Searching Authority, dated Aug. 29, 2016, for International Application No. PCT/US2016/034416, 22 pages.

International Search Report for PCT/JUS2020/019697, dated Jul. 14, 2020 (4 pages).

International Search Report for PCT/US2017/048382 dated Jan. 4, 2018 (4 pages).

International Search Report for PCT/US2018/048853 dated Nov. 21, 2018.

International Search Report, dated Apr. 28, 2016, for International Application No. PCT/US2016/013215, 5 pages.

International Search Report, dated Dec. 26, 2013, for International Application No. PCT/US2013/057070, 4 pages.

International Search Report, dated Feb. 4, 2011, for International Application No. PCT/US2010/051791, 2 pages.

International Well Building Institute, "The WELL Building Standard: Version 1.0," 2015 (220 pages).

Ishihara et al., "Metabolic responses to polychromatic LED and OLED light at night," Scientific Reports, 2021, vol. 11, pp. 1-11.

Jammes, François et al., "Service-Oriented Device Communications Using the Devices Profile for Web Services," 2005 (8 pages).

Jamrozik et al., "A novel methodology to realistically monitor office occupant reactions and environmental conditions using a living lab," Building and Environment, 2018, vol. 130, pp. 190-199.

Japanese Office Action dated Apr. 25, 2017 for JP Application No. 2015-529995, with English summary, 14 pages.

Jenkins et al., "A practical approach to glare assessment for train cabs," Applied Ergonomics, 2015, vol. 47, pp. 170-180.

Jernigan, "Light studies focus on circadian rhythms," BioPhotonics, Jul. 2009, retrieved from http://www.photonics.com/Article.aspx?PID=I&VID=43&IID=396&AID=38995, retrieved on Nov. 3, 2014, 2 pages.

Jernigan, R., "Light Studies Focus on Circadian Rhythms," Photonics Showcase, Nov. 2009, p. 12.

Job Accommodation Network, "Accommodation and Compliance Series: Employees with Hearing Loss," available at https://askjan.org/media/Hearing.html, accessed Oct. 31, 2017 (25 pages).

Jones, "Chapter 4—Acoustical Treatment for Indoor Areas," in Handbook for Sound Engineers, Ballou (ed.), Burlington, MA, Focal Press, 2008, 65-94.

Jonsson, Ulf et al., "Psychological Treatment of Depression in People Aged 65 Years and Over: A Systematic Review of Efficacy, Safety, and Cost Effectiveness," PLoS One, 2016, vol. 11, No. 8, pp. 1-20 (20 pages).

Joshi et al., "The importance of temperature and thermoregulation for optimal human sleep," Energy and Buildings, 2016, vol. 131, pp. 153-157.

Kahn-Marshall, Jennifer L. et al., "Making Healthy Behaviors the Easy Choice for Employees: A Review of the Literature on Environmental and Policy Changes in Worksite Health Promotion," Health Education & Behavior, 2012, vol. 39, No. 6, pp. 752-776, (25 pages).

(56) References Cited

OTHER PUBLICATIONS

Kakde, S. et al., "Asystematic review on the social context of smokeless tobacco use in the South Asian population: Implications for public health," Public Health, 2012, vol. 126, No. 8, pp. 635-645.

Kaplan et al., "Directed Attention as a Common Resource for Executive Functioning and Self-Regulation," Perspectives on Psychological Science, 2010, vol. 5, No. 1, pp. 43-57.

Kaplan, "The Restorative Benefits of Nature: Toward an Integrative Framework," Journal of Environmental Psychology, 1995, vol. 15, pp. 169-182.

Kastner, Wolfgang et al., "Communication Systems for Building Automation and Control," Proceedings of the IEEE, 2005, vol. 93, No. 6, pp. 1178-1203.

Kennedy et al., "Smoke-Free Policies in U.S. Prisons and Jails: A Review of the Literature," (Author Manuscript) Nicotine & Tobacco Research, 2015, vol. 17, No. 6 (14 pages).

Khunti, Kamlesh et al., "Association Between Adherence to Pharmacotherapy and Outcomes in Type 2 Diabetes: A Meta-analysis," Diabetes Care, 2017, vol. 40, pp. 1588-1596.

Klein, Laura et al., "Coordinating occupant behavior for building energy and comfort management using multi-agent systems," Automation In Construction, vol. 22, Mar. 2012, pp. 525-536.

Knai, Cécile C. et al., "Are the Public Health Responsibility Deal alcohol pledges likely to improve public health? An evidence synthesis," Addiction, 2015, vol. 110, No. 8 (29 pages).

Kong et al., "The impact of interior design on visual discomfort reduction: A field study integrating lighting environments with POE survey," Building and Environment, 2018, vol. 138, pp. 135-148.

Konstantzos et al., "The effect of lighting environment on task performance in buildings—A review," Energy & Buildings, 2020, vol. 226, pp. 1-14.

Kool et al., "Decision Making and the Avoidance of Cognitive Demand," Journal of Experimental Psychology: General, 2010, vol. 139, No. 4, pp. 665-682.

Kota, Sandeep et al., "Historical Survey of Daylighting Calculations Methods and Their Use in Energy Performance Simulations," Proceedings of the Ninth International Conference for Enhanced Building Operations, Nov. 17-19, 2009, Austin, Texas (9 pages).

LaCaille et al., "Go!: results from a quasi-experimental obesity prevention trial with hospital employees," BMC Public Health, 2016, vol. 17, No. 171, pp. 1-16 (16 pages).

Lal, Avtar, et al., "The Effect of Physical Exercise After a Concussion: A Systematic Review and Meta-analysis," The American Journal of Sports Medicine, 2018, vol. 43, Issue 3, pp. 743-752 (10 pages).

Lan et al., "Ten questions concerning thermal environment and sleep quality," Building and Environment, 2016, vol. 99, pp. 252-259.

Land, "Using Vitamin C To Neutralize Chlorine in Water Systems," Recreation Management Tech Tips, Apr. 2005, retrieved from http://www.fs.fed.us/t-d/pubs/html/05231301/05231301.html, retrieved on Mar. 1, 2016, 6 pages.

Landrigan, Phillip J., "Air pollution and health," The Lancet Public Health, 2017, vol. 2, No. 1, pp. e4-e5.

Larson, Nicole et al., "A Review of Environmental Influences on Food Choices," Annals of Behavioral Medicine : A Publication of the Society of Behavioral Medicine, 2009, vol. 38 Suppl 1, pp. S56-73.

Lassi et al., "Impact of education and provision of complementary feeding on growth and morbidity in children less than 2 years of age in developing countries: a systematic review," BMC Public Health, 2013, vol. 13, pp. 1-10 (10 pages).

Leather et al., "Windows in the Workplace: Sunlight, View, and Occupational Stress," Environment and Behavior, 1998, vol. 30, No. 6, pp. 739-762.

Leder et al., "Effects of office environment on employee satisfaction: a new analysis," Building Research and Information, 2015 (22 pages).

Lee, Courtney, et al., "The effectiveness of acupuncture research across components of the trauma spectrum response (tsr): a systematic review of reviews," Systematic Reviews, 2012, vol. 1, Article 46, pp. 1-18 (18 pages).

Leech et al., "It's about time: A comparison of Canadian and American time—activity patterns," Journal of Exposure Analysis and Environmental Epidemiology, 2002, vol. 12, No. 6, pp. 427-432.

Li et al., "Health promotion interventions and policies addressing excessive alcohol use: A systematic review of national and global evidence as a guide to health-care reform in China," HHS Public Access, Author Manuscript, 2015, vol. 110, No. 1, pp. 1-18 (18 pages).

Licht.wissen 19: Impact of Light on Human Beings, licht.de, Mar. 2014 (56 pages).

Luedtke, Kerstin et al., "Efficacy of interventions used by physiotherapists for patients with headache and migraine—Systematic review and meta-analysis," Cephalalgia, 2015 (20 pages).

Luke, "Evaluating significance in linear mixed-effects models in R," Behavior Research Methods, 2017, vol. 49, pp. 1494-1502.

Luttmann, Alwin et al., "Preventing Musculoskeletal Disorders in the Workplace," World Health Organization, Protecting Workers' Health Series No. 5, 2003 (40 pages).

Macarthur, Georgie J. et al., "Peer-led interventions to prevent tobacco, alcohol and/or drug use among young people aged 11-21 years: a systematic review and meta-analysis," 2016, Addiction, vol. 111, pp. 391-407 (17 pages).

Macary et al., "Systems, Methods and Articles for Monitoring and Enhancing Human Wellness," U.S. Appl. No. 15/543,114, filed Jul. 12, 2017, 113 pages.

Maes, Lea et al., "Effectiveness of workplace interventions in Europe promoting healthy eating: a systematic review," European Journal of Public Health, 2012, vol. 22, No. 5, pp. 677-683.

Marinelli et al., "Hours of Television Viewing and Sleep Duration in Children: A Multicenter Birth Cohort Study," JAMA Pediatrics, 2014, vol. 168, No. 5, pp. 458-464.

Markus, "The Function of Windows—A Reappraisal," Building Science, 1967, vol. 2, pp. 97-121.

Mckay, Alisa J. et al,, "Strategies for Tobacco Control in India: A Systematic Review," PLOS One, 2015, vol. 4. pp. 1-34 (34 pages).

Meerbeek et al., "Impact of blinds usage on energy consumption: automatic versus manual control," conference paper, 2014 (17 pages).

Meister et al., "Low-Level Visual Processing: The Retina," Chapter 26, Principles of Neural Science, 2014, pp. 577-601.

Mendell, et al. "Improving the Health of Workers in Indoor Environments: Priority Research Needs for a National Occupational Research Agenda," American Journal of Public Health, 2002, vol. 92, No. 9, pp. 1430-1440 (11 pages).

Merz, Victoire et al., "Brief interventions to prevent recurrence and alcohol-related problems in young adults admitted to the emergency ward following an alcohol-related event: a systematic review," Journal of Epidemiology and Community Health, 2015, vol. 69, No. 9, pp. 912-917.

Messer, Alan et al., "InterPlay: A Middleware for Seamless Device Integration and Task Orchestration in a Networked Home," Proceedings of the Fourth Annual IEEE International Conference on Pervasive Computing and Communications, 2006 (10 pages).

Mingkhwan, A. et al., "Dynamic service composition in home appliance networks," Multimedia Tools and Applications, 2006, vol. 29, pp. 257-284.

Minichiello, Alexa et al., "Effective strategies to reduce commercial tobacco use in Indigenous communities globally: A systematic review," BMC Public Health, 2016, vol. 16, No. 21 (25 pages).

Mitchell, Lana J. et al., "Effectiveness of dietetic consultations in primary health care: A systematic review of randomized controlled trials," Journal of the Academy of Nutrition and Dietetics, 2017 (41 pages).

Miyake et al., "The Unity and Diversity of Executive Functions and Their Contributions to Complex "Frontal Lobe" Tasks: A Latent Variable Analysis," Cognitive Psychology, 2000, vol. 41, pp. 49-100.

(56) References Cited

OTHER PUBLICATIONS

Mold Inspection California, "Killing Mold With Ozone & Thermal Heat," retrieved from http://moldinspectioncalifornia.com/kill_mold_with_ozone.html, 3 pages.

Monson, Eva et al., "Effects of Enactment of Legislative (Public) Smoking Bans on Voluntary Home Smoking Restrictions: A Review," Nicotine & Tobacco Research, 2017, vol. 19, No. 2, pp. 141-148.

Moore-Ede et al., "Circadian Potency Spectrum with Extended Exposure to Polychromatic White LED Light under Workplace Conditions," Journal of Biological Rhythms, 2020, vol. 35, No. 4, pp. 405-415.

Moore-Ede et al., "LEDs must spectrally balance illumination, circadian health, productivity, and energy efficiency," LEDs Magazine, available at least as early as Aug. 2021 at https://www.ledsmagazine.com/lighting-health-wellbeing/article/14199941/ideal-led-lighting-must-balance-multiple-objectives-magazine (14 pages).

Myhren, Jonn Are et al., "Flow patterns and thermal comfort in a room with panel, floor and wall heating," Energy and Buildings, 2008, vol. 40, 524-536.

Nabil et al., "Useful daylight illuminances: A replacement for daylight factors," Energy and Buildings, 2006, vol. 38, pp. 905-913.

Nair, Natasha K. et al., "A Systematic Review of Digital and Computer-Based Alcohol Intervention Programs in Primary Care," Current Drug Abuse Reviews, 2015, vol. 8, No. 2, pp. 1-8.

National Center for Chronic Disease Prevention and Health Promotion, Division for Heart Disease and Stroke Prevention, "Under Pressure: Strategies for Sodium Reduction in Worksites," Centers for Disease Control and Prevention, 2012, pp. 1-9 (12 pages).

National Lighting Product Information Program, "Photosensors: Dimming and Switching Systems for Daylight Harvesting," Specifier Reports, 2007, vol. 11, No. 1 (54 pages).

NaturVention, "Science," URL=https://www.naturvention.com/technology-and-science/science/, download date Apr. 5, 2016, 4 pages.

NaturVention, "Technology," URL=https://www.naturvention.com/technology-and-science/, download date Apr. 5, 2016, 6 pages.

Ne'eman et al., "Office Worker Response to Lighting and Daylighting Issues in Workspace Environments: A Pilot Survey," Energy and Buildings, 1984, vol. 6, pp. 159-171.

Ni Mhurchu, Cliona et al., "Effects of worksite health promotion interventions on employee diets: a systematic review," BMC Public Health, 2010, vol. 10, No. 62, (7 pages).

Nie et al., "The effects of dynamic daylight☐ like-light on the rhythm, cognition, and mood of irregular shift workers in closed environment," Scientific Reports, 2021, vol. 11, No. 13059, pp. 1-11.

Nieuwenhuijsen, K. et al., "Interventions to improve return to work in depressed people (Review)," The Cochrane Library, 2014, Issue 12, pp. 1-140 (143 pages).

Ning, Mao et al., "Experimental and numerical studies on the performance evaluation of a bed-based task/ambient air conditioning (TAC) system," Applied Sciences, 2014, vol. 136, pp. 956-967.

O'Brien et al., "Manually-operated window shade patterns in office buildings: A critical review," Building and Environment, 2013, vol. 60, pp. 319-338.

Obiltschnig, Gunter, "Automatic Configuration and Service Discovery for Networked Smart Devices," Electronica Embedded Conference Munich, 2006 (8 pages).

Office Action issued in CN Application No. 201580021358.5 dated Feb. 2, 2019.

Office Action issued in CN Application No. 201680009629.X dated Jul. 23, 2020.

Office Action issued in MX Application No. MX/a/2016/011107.

Office Action, dated May 21, 2018, for U.S. Appl. No. 15/121,953, Pillai et al., "Systems and Articles for Enhancing Wellness Associated With Habitable Environments," 38 pages.

Office Action, dated May 31, 2018, for U.S. Appl. No. 15/421,046, Eisele et al., "LED Lighting System," 9 pages.

Office Action, dated Oct. 27, 2017, for U.S. Appl. No. 15/421,046, Eisele et al., "LED Lighting System," 8 pages.

Osilla, Karen Chan, et al., "Systematic review of the Impact of Worksite Wellness Programs," The American Journal of Managed Care, 2012, vol. 18, No. 2, pp. e68-e81, (14 pages).

OxiTitan, "Light Powered Protection," retrieved from http://www.oxititan.com, retrieved on Aug. 13, 2012, 2 pages.

Pachón, Helena et al., "Evidence of the effectiveness of flour fortification programs on iron status and anemia: a systematic review," Nutrition Reviews, 2015, vol. 73, No. 11, pp. 780-795.

Panda et al., "Coordinated Transcription of Key Pathways in the Mouse by the Circadian Clock," Cell, 2002, vol. 109, pp. 307-320.

Park, "Are Humans Good Sensors? Using Occupants as Sensors for Indoor Environmental Quality Assessment and for Developing Thresholds that Matter," thesis, 2015 (274 pages).

Pasricha, Sant-Ryan et al., "Effect of daily iron supplementation on health in children aged 4-23 months: a systematic review and meta-analysis of randomised controlled trials," The Lancet Global Health, 2013, vol. 1, pp. e77-e86.

Passey, Megan E. et al., "Smoke-free homes: what are the barriers, motivators and enablers? A qualitative systematic review and thematic synthesis," BMJ Open, 2016, vol. 6, pp. 1-16 (16 pages).

Pasut, Wilmer et al., "Energy-efficient comfort with a heated/cooled chair: Results from human subject tests," Building and Environment, 2015, vol. 84, pp. 10-21.

Peña-Rosas et al. "Intermittent oral iron supplementation during pregnancy (Review)," Cochrane Database of Systematic Reviews, 2015, Issue 10, pp. 1-186 (193 pages).

Perez et al., "All-Weather Model For Sky Luminance Distribution—Preliminary Configuration and Validation," Solar Energy, 1993, vol. 50, No. 3, pp. 235-245.

Pervez et al., "Photonic Crystal Spectrometer," U.S. Appl. No. 61/278,773, filed Oct. 12, 2009, 78 pages.

Pervez et al., "Photonic Crystal Spectrometer," U.S. Appl. No. 61/349,570, filed May 28, 2010, 52 pages.

Peuhkuri et al., "Diet promotes sleep duration and quality," Nutrition Research, 2012, vol. 32, pp. 309-319.

Phillips et al., "High sensitivity and interindividual variability in the response of the human circadian system to evening light," Proceedings of the National Academy of Sciences of the United States of America, 2019, vol. 116, No. 24, pp. 12019-12024.

Phipps-Nelson et al., "Daytime Exposure to Bright Light, as Compared to Dim Light, Decreases Sleepiness and Improves Psychomotor Vigilance Performance," Sleep, 2003, vol. 26, No. 6, pp. 695-700.

Piccolo et al., "Effect of switchable glazing on discomfort glare from windows," Building and Environment, 2009, vol. 44, pp. 1171-1180.

Pillai et al., "Systems, Methods and Articles for Enhancing Wellness Associated With Habitable Environments," Amendment, filed Jul. 21, 2016, for U.S. Appl. No. 14/012,444, 25 pages.

Pillai et al., "Systems, Methods and Articles for Enhancing Wellness Associated With Habitable Environments," Office Action, dated Mar. 22, 2016, for U.S. Appl. No. 14/012,444, 29 pages.

Pillai et al., "Systems, Methods and Articles for Enhancing Wellness Associated With Habitable Environments," Preliminary Amendment, filed Mar. 25, 2015, for U.S. Appl. No. 14/012,444, 149 pages.

Pillai et al., "Systems, Methods and Articles for Enhancing Wellness Associated With Habitable Environments," U.S. Appl. No. 15/409,233, filed Jan. 18, 2017, 84 pages.

Pillai et al., "Systems, Methods and Articles for Enhancing Wellness Associated With Habitable Environments," U.S. Appl. No. 15/421,022, filed Jan. 31, 2017, 84 pages.

Plotnikoff, Ronald et al., "Effectiveness of Interventions Targeting Health Behaviors in University and College Staff: A Systematic Review," American Journal of Health Promotion, 2015, vol. 29, No. 5 (20 pages).

Potter et al., "Circadian Rhythm and Sleep Disruption: Causes, Metabolic Consequences, and Countermeasures," Endocrine Reviews, 2016, vol. 37, No. 6, pp. 584-608.

Preliminary Amendment, filed Jul. 12, 2017, for U.S. Appl. No. 15/543,114, Macary et al., "Systems, Methods and Articles for Monitoring and Enhancing Human Wellness," 10 pages.

(56) References Cited

OTHER PUBLICATIONS

Preto et al., "Lighting in the Workplace: Recommended Illuminance (lux) at Workplace Environs," Advances in Design for Inclusion, 2019, pp. 180-191.
Provencio et al., "A Novel Human Opsin in the Inner Retina," The Journal of Neuroscience, 2000, vol. 20, No. 2, pp. 600-605.
Prudhon, Claudine et al., "WHO, UNICEF, and SCN Informal Consultation on Community-Based Management of Severe Malnutrition in Children," SCN Nutrition Policy Paper No. 21, Food and Nutrition Bulletin, 2006, vol. 27, No. 3 (supplement), The United Nations University, pp. s3-s108 (108 pages).
Rabbie, Harold M., "Distributed Processing Using Local Operating Networks," Assembly Automation, 1992, vol. 12, No. 1 (7 pages).
Rea, "Window Blind Occlusion: a Pilot Study," Building and Environment, 1984, vol. 19, No. 2, pp. 133-137.
Reinhart et al., "Monitoring manual control of electric lighting and blinds," Lighting Research & Technology, 2003, vol. 35, No. 3, pp. 243-260.
Roberge et al., Operational Amplifiers: Theory and Practice, Second Edition, 2007 (104 pages).
Romm et al., Greening the Building and the Bottom Line: Increasing Productivity Through Energy-Efficient Design, 1994 (17 pages).
Rosen, Laura J. et al., "Effectiveness of Interventions to Reduce Tobacco Smoke Pollution in Homes: A Systematic Review and Meta-Analysis," International Journal of Environmental Research and Public Health, 2015, vol. 12, pp. 16043-16059.
Rubin et al., "Window Blinds as a Potential Energy Saver—A Case Study," National Bureau of Standards Building Science Series 112, 1978 (89 pages).
Saif, Umar, "Architectures for ubiquitous systems," University of Cambridge Computer Laboratory Technical Report No. 527, 2002 (271 pages).
Saini et al., "The Mammalian Circadian Timing System: Synchronization of Peripheral Clocks," Cold Spring Harbor Symposia on Quantitative Biology, 2011, vol. 76 (10 pages).
Sbar et al., "Electrochromic dynamic windows for office buildings," International Journal of Sustainable Built Environment, 2012, vol. 1, pp. 125-139.
Schröer, S. et al., "Evidence-based lifestyle interventions in the workplace—an overview," Occupational Medicine, 2014, vol. 64, pp. 8-12.
Schweizer et al., "Indoor time-microenvironment-activity patterns in seven regions of Europe," Journal of Exposure Analysis and Environmental Epidemiology, 2007, vol. 17, No. 2, pp. 170-181.
Semenova et al., "Association of the melatonin circadian rhythms with clock 3111T/C gene polymorphism in Caucasian and Asian menopausal women with insomnia," Chronobiology International, 2018 (12 pages).
Seppänen, O.A., et al., "Summary of human responses to ventilation," Indoor Air, 2004, vol. 14, Suppl. 7, pp. 102-118 (17 pages).
Shearer, Jane et al., "Nutra-ergonomics: influence of nutrition on physical employment standards and the health of workers," Applied Physiology, Nutrition, and Metabolism, 2016, vol. 41, pp. S165-S174 (10 pages).
Smith-Mclallen, Aaron et al., "Comparative Effectiveness of Two Walking Interventions on Participation, Step Counts, and Health," American Journal of Health Promotion, 2016 (9 pages).
Smith, GA et al., "Oral or parenteral iron supplementation to reduce deferral, iron deficiency and/or anaemia in blood donors (Review)," Cochrane Database of Systematic Reviews, 2014, Issue 7, pp. 1-120 (124 pages).
Sorensen, Glorian, et al., "Worksite-based research and initiatives to increase fruit and vegetable consumption," Preventive Medicine, 2004, vol. 39, pp. S94-S100 (7 pages).
Storch et al., "Extensive and divergent circadian gene expression in liver and heart," Nature, 2002, vol. 417 (8 pages).
Strøm-Tejsen et al., "The effects of bedroom air quality on sleep and next-day performance," Indoor Air, 2016, vol. 26, pp. 679-686.
Summons to attend oral proceedings issued in EP Application No. 15754628.4 dated Sep. 10, 2018.
Sunde et al., "Blue-Enriched White Light Improves Performance but Not Subjective Alertness and Circadian Adaptation During Three Consecutive Simulated Night Shifts," Frontiers in Psychology, 2020, vol. 11, No. 2172, pp. 1-16.
Suryadevara, N.K. et al., "Sensor data fusion to determine wellness of an elderly in intelligent home monitoring environment", Instrumentation and Measurement Technology Conference, Graz: IEEE, (2012), ISSN 1091-5281, pp. 947-952, XP032451677.
Sutter et al., "The use of shading systems in VDU task offices: A pilot study," Energy and Buildings, 2006, vol. 38, pp. 780-789.
Swaminathan et al., "Are Individual Differences in Sleep and Circadian Timing Amplified by Use of Artificial Light Sources?," Journal of Biological Rhythms, 2017, vol. 32, No. 2, pp. 165-176.
Tähkämö et al., "Systematic review of light exposure impact on human circadian rhythm," Chronobiology International: The Journal of Biological and Medical Rhythm Research, 2019, vol. 36, No. 2, pp. 151-170.
Tan, Ai May et al., "Efficacy of a workplace osteoporosis prevention intervention: a cluster randomized trial," BMC Public Health, 2016, vol. 16, No. 859 (14 pages).
Tansil, Kristin A. et al., "Alcohol Electronic Screening and Brief Intervention: A Community Guide Systematic Review," American Journal of Preventative Medicine Author Manuscript, 2016 (19 pages).
Taylor et al., "Impact of Booster Breaks and Computer Prompts on Physical Activity and Sedentary Behavior Among Desk-Based Workers: A Cluster-Randomized Controlled Trial," Preventing Chonic Disease Public Health Research, Practice, and Policy, Centers for Disease Control and Prevention, Nov. 2016, vol. 13, E155, pp. 1-15 (16 pages).
Te Kulve et al., "Early evening light mitigates sleep compromising physiological and alerting responses to subsequent late evening light," Scientific Reports, 2019, vol. 9, No. 16064, pp. 1-12.
Tebb et al., "Use of theory in computer-based interventions to reduce alcohol use among adolescents and young adults: a systematic review," BMC Public Health, 2016, vol. 16, No. 517, pp. 1-33.
Techau, David et al. "Buildings, Brains and Behaviour: Towards an affective neuroscience of architecture: The Hedonic Impact of Sustainable Work Environments on Occupant Well-being," World Health Design, 2016, pp. 24-37.
Tennessen et al., "Views to Nature: Effects on Attention," Journal of Environmental Psychology, 1995, vol. 15, pp. 77-85.
Third Examination Report issued in AU Application No. 2016202287 dated Feb. 15, 2021.
Third Office Action issued in MX Application No. MX/a/2016/011107.
Tong, Van T. et al., "Clinical interventions to reduce secondhand smoke exposure among pregnant women: a systematic review," Tobacco Control, Author Manuscript, 2015 (17 pages).
U.S. Green Building Council, "Daylight and views—daylight," 2009, available at https://www.usgbc.org/credits/schools/v2009/ieqc81.
Uğursal, Ahmet, et al., "The effect of temperature, metabolic rate and dynamic localized airflow on thermal comfort," Applied Energy, 2013, vol. 111, pp. 64-73 (10 pages).
Ulrich, "View Through a Window May Influence Recovery from Surgery," Science, 1984, vol. 224, pp. 420-421.
Unsworth et al., "An automated version of the operation span task," Behavior Research Methods, 2005, vol. 37, No. 3, pp. 498-505.
US Department of Health and Human Services, 2008 Physical Activity Guidelines for Americans, Oct. 2008, available at https://health.gov/paguidelines/pdf/paguide.pdf (76 pages).
US Department of Justice Civil Rights Division, 2010 ADA Standards for Accessible Design, available at https://www.ada.gov/regs2010/2010ADAStandards/2010ADAStandards.pdf, accessed Oct. 31, 2017 (279 pages).
Van Den Wymelenberg, "Patterns of occupant interaction with window blinds: A literature review," Energy and Buildings, 2012, vol. 51, pp. 165-176.
Van Eerd, D. et al., "Effectiveness of workplace interventions in the prevention of upper extremity musculoskeletal disorders and symptoms: an update of the evidence," Occupational and Environmental Medicine, 2016, vol. 73, pp. 62-70.

(56) References Cited

OTHER PUBLICATIONS

Vandewalle et al., "Daytime Light Exposure Dynamically Enhances Brain Responses," Current Biology, 2006, vol. 16, pp. 1616-1621.
Veitch et al., "A model of satisfaction with open-plan office conditions: COPE field findings," Journal of Environmental Psychology, 2007, vol. 27, pp. 177-189.
Veitch et al., "Assessing Beliefs about Lighting Effects on Health, Performance, Mood, and Social Behavior," Environment and Behavior, 1996, vol. 28, No. 4, pp. 446-470.
Veitch et al., "Determinants of Lighting Quality II: Research and Recommendations," presented at the 104th Annual Convention of the American Psychological Association, 1996 (57 pages).
Verlarde et al., "Health effects of viewing landscapes—Landscape types in environmental psychology," Urban Forestry & Urban Greening, 2007, vol. 6, pp. 199-212.
Viola et al., "Blue-enriched white light in the workplace improves self-reported alertness, performance and sleep quality," Scandinavian Journal of Work, Environment & Health, 2008, vol. 34, No. 4, pp. 294-306.
Vitashower Corp., "Products," retrieved from http://www.vitashowercorp.com/products.html, retrieved on May 13, 2014, 8 pages.
Vitashower Corporation, "Ascorbic Acid Reduction of Residual Active Chlorine in Potable Water Prior to Halocarboxylate Determination," from Urbansky et al., Journal of Environmental Monitoring 2(3):253-256, 2000, retrieved from http://www.vitashowercorp.com/research.html, retrieved on May 13, 2014, 2 pages.
Vitashower Corporation, "Frequently Asked Questions," 2003, retrieved from http://www.vitashowercorp.com/FAQs.html, retrieved on May 13, 2014, 3 pages.
Vitashower Corporation, "Vitamin C Shower Filter SF-2000," 2003, retrieved from http://www.vitashowercorp.com/products.html, retrieved on May 13, 2014, 8 pages.
Vitashower Corporation, "Welcome to Vitashower Corporation," 2003, retrieved from http://www.vitashowercorp.com/index.html, retrieved on May 13, 2014, 4 pages.
Watson et al., "Recommended Amount of Sleep for a Healthy Adult: A Joint Consensus Statement of the American Academy of Sleep Medicine and Sleep Research Society," Sleep, 2015, vol. 38, No. 6, pp. 843-844.
Wells et al., "Subjective Responses to the Lighting Installation in a Modern Office Building and their Design Implications," Building Science, 1965, vol. 1, pp. 57-68.
West et al., "Blue light from light-emitting diodes elicits a dose-dependent suppression of melatonin in humans," Journal of Applied Physiology, 2011, vol. 110, pp. 619-626.
Wikipedia, "Home automation," Jan. 17, 2014, URL: https://en.wikipedia.org/w/index.php?title=Home_automation&oldid=591169195, retreived on Sep. 2, 2020 (11 pages).
Wikipedia, "Thermostat," as archived on Jan. 24, 2014, URL= https://en.wikipedia.org/w/index.php?title=Thermostat&oldid=592239648, download date Jun. 30, 2017, 10 pages.
World Health Organization, "Global Nutrition Targets 2025: Low Birth Weight policy Brief," 2014, Geneva (8 pages).
World Health Organization, "Guideline: Daily iron supplementation in adult women and adolescent girls," 2016, Geneva (34 pages).
World Health Organization, "Guideline: Daily iron supplementation in infants and children," 2016, Geneva (54 pages).
World Health Organization, "WHO Recommendations for the Prevention and Management of tobacco use and second-hand smoke exposure in pregnancy," 2013 (104 pages).
Written Opinion of the International Searching Authority, dated Apr. 28, 2016, for International Application No. PCT/US2016/013215, 16 pages.
Written Opinion of the International Searching Authority, dated Dec. 26, 2013, for International Application No. PCT/US2013/057070, 5 pages.
Yadlapalli et al., "Circadian clock neurons constantly monitor environmental temperature to set sleep timing," Nature, 2018, vol. 555 (21 pages).
Yetish et al., "Natural sleep and its seasonal variations in three pre-industrial societies," Current Biology, Author Manuscript, 2015, vol. 25, No. 21 (19 pages).
Zhai et al., "Human comfort and perceived air quality in warm and humid environments with ceiling fans," Building and Environment, 2015, vol. 90, pp. 178-185 (8 pages).
Zhai, Yongchao et al., "Comfort under personally controlled air movement in warm and humid environments," Building and Environment, 2013 (16 pages).
Zhai, Yongchao, et al., "Using air movement for comfort during moderate exercise," Building and Environment, 2015, vol. 24, pp. 344-352 (9 pages).
Zhang, Hui, "Human Thermal Sensation and Comfort in Transient and Non-Uniform Thermal Environments," Dissertation, 2003, University of California, Berkeley (436 pages).
Zhang, Yu F., et al., "The influence of heated or cooled seats on the acceptable ambient temperature range," Ergonomics, 2007, vol. 50, No. 4, pp. 586-600 (16 pages).
Zhu, Hongmei et al., "Is self-monitoring of blood glucose effective in improving glycaemic control in type 2 diabetes without insulin treatment: a meta-analysis of randomised controlled trials," BMJ Open, 2016, vol. 6, pp. 1-9 (9 pages).
Zhuang et al., "Haze insights and mitigation in China: an overview," Journal of Environmental Sciences, 2014, vol. 26, pp. 2-12 (11 pages).
Zinzi, "Office worker preferences of electrochromic windows: a pilot study," Building and Environment, 2006, vol. 41, pp. 1262-1273.
"Adolescent Psychology Around the World", Edited by Jeffrey Jensen Arnett, Ph.D., Clark University, Worcester, MA, 2012, (30 pages).
"ANSI/ASAS 12.60-2010/Part 1 American National Standard Acoustical Performance Criteria, Design Requirements, and Guidelines for Schools, Part 1: Permanent Schools", Acoustical Society of America, 2010, 44 pgs.
"Cochrane Handbook for Systematic Reviews of Interventions", Cochrane Book Series, Edited by Julian PT Higgins and Sally Green, 2008, 17 pgs.
"Daylight Metrics: PIER Daylighting Plus Research Program", Public Interest Energy Research (PIER) Program Final Project Report, Feb. 2012, 387 pgs.
"Depression and Other Common Mental Disorders", Global Health Estimates, World Health Organization, 2017, 24 pgs.
"Depression: A Global Crisis World Mental Health Day, Oct. 10, 2012", World Federation for Mental Health, (2012), (32 pages).
"Ergonomics of the thermal environment—Analytical determination and interpretation of thermal comfort using calculation of the PMV and PPD indices and local thermal comfort criteria", International Standard, Third edition, Nov. 15, 2005, 11 pgs.
"Evidence-based methodologies for public health—How to assess the best available evidence when time is limited and there is lack of sound evidence", European Centre for Disease Prevention and Control, Stockholm: ECDC; 2011, 67 pgs.
"Global Burden of Disease Study 2015 provides GPS for global health 2030", www.thelancet.com, vol. 388, Oct. 8, 2016, pp. 1448-1449.
"Global status report on alcohol and health 2014", World Health Organization, 2014, 392 pgs.
"Global, regional, and national age-sex specific all-cause and cause-specific mortality for 240 causes of death, 1990-2013: a systematic analysis for the Global Burden of Disease Study 2013", www.thelancet.com, vol. 385, Jan. 10, 2015, pp. 117-171.
"Global, regional, and national life expectancy, all-cause mortality, and cause-specific mortality for 249 causes of death, 1980-2015: a systematic analysis for the Global Burden of Disease Study 2015", www.thelancet.com, vol. 388, Oct. 8, 2016, pp. 1459-1544.
"Haemoglobin concentrations for the diagnosis of anaemia and assessment of severity", Vitamin and Mineral Nutrition Information System. Geneva, World Health Organization, 2011, pp. 1-6.
"Hazard Prevention and Control in the Work Environment: Airborne Dust", Occupational and Environmental Health Series, Department of Protection of the Human Environment, World Health Organization, Geneva, Dec. 1999, 224 pgs.

(56) References Cited

OTHER PUBLICATIONS

"IARC Monographs on the Evaluation of Carcinogenic Risks to Humans vol. 90 Human papillomaviruses", World Health Organization International Agency for Research on Cancer, Lyon, France, 2007, 690 pgs.

"Light and Lighting—Basic terms and criteria for specifying lighting requirements", The National Standards Authority of Ireland. (2011), (7 pages).

"My Plate My Wins, Make half your grains whole grains", Center for Nutrition Policy and Promotion. United States Department of Agriculture, Oct. 2016, (1 page).

"Progress on Drinking Water, Sanitation and Hygiene, 2017, Update and SDG Baselines", World Health Organization (WHO) and the United Nations Children's Fund (UNICEF), 2017, 116 pgs.

"Sodium in Your Diet Use the Nutrition Facts Label and Reduce Your Intake", U.S. Food and Drug Administration. Mar. 2020, (4 pages).

"State Council Air Pollution Prevention and Control Action Plan, China Clean Air Updates", Clean Air Alliance of China, Issue II, 2013, English Translation, 20 pgs.

"WHO Framework Convention on Tobacco Control," World Health Organization 2003, updated reprint 2004, 2005, (44 pages).

Ahmed, Tahmeed, et al.; "Global Burden of Maternal and Child Undernutrition and Micronutrient Deficiencies", Ann Nutr Metab 2012;61 (suppl 1):8-17.

Ajzen, I. "Nature and operation of attitudes", Annual review of psychology vol. 52: 27-58 (2001).

Alfano, Francesca Romana d'Ambrosio et al. "On the measurement of the mean radiant temperature and its influence on the indoor thermal environment assessment", Building and Environment 63: 79-88, (2013).

Alonso-Coello, Pablo, et al.; "GRADE Evidence to Decision (EtD) frameworks: a systematic and transparent approach to making well informed healthcare choices. 1: Introduction"; BMJ 2016; 353:i2016, http://dx.doi.org/10.1136/bmj.i2016, 10 pgs.

American Society of Heating, Refrigerating and Air-Conditioning Engineers (ASHRAE), "Indoor Air Quality Guide, Best Practices for Design, Construction and Commissioning", ASHRAE Philadelphia Chapter, May 14, 2009, http://ashraephilly.org/images/downloads/Presentation_Archives/0509.pdf, Accessed Nov. 27, 2017 (19 pages).

Arnett, Jeffrey J. "The neglected 95%: why American psychology needs to become less American." The American psychologist vol. 63,7 : 602-14, (2008).

Arundel, Anthongy V., et al.; "Indirect Health Effects of Relative Humidity in Indoor Environments", Environmental Health Perspectives vol. 65, pp. 351-361, 1986.

Astolfi, Arianna, and Franco Pellerey. "Subjective and objective assessment of acoustical and overall environmental quality in secondary school classrooms." The Journal of the Acoustical Society of America vol. 123,1: 163-73, (2008).

Atmaca, Ibrahim, et al.; "Effects of radiant temperature on thermal comfort", Building and Environment 42 (2007) 3210-3220.

Bandura, A. "Self-efficacy", In V. S. Ramachaudran (Ed.), Encyclopedia of human behavior (vol. 4, pp. 71-81) (1994). New York: Academic Press. (Reprinted in H. Friedman [Ed.], Encyclopedia of mental health. San Diego: Academic Press, (1998).

Barclay, Laurie, J., et al.; "Healing the Wounds of Organizational Injustice: Examining the Benefits of Expressive Writing", Journal of Applied Psychology 2009, vol. 94, No. 2, 511-523.

Bornehag, C. G., et al.; "Dampness in Buildings and Health: Nordic Interdisciplinary Review of the Scientific Evidence on Associations between Exposure to "Dampness" in Buildings and Health Effects (NORDDAMP)", Indoor Air 2001; 11: 72-86.

Bradley, J. S., et al.; "Describing Levels of Speech Privacy in Open-Plan Offices", NRC Publications Archive, National Research Council of Canada, Sep. 12, 2003, 29 pgs.

Cavanaugh, William J. et al. "Speech Privacy in Buildings." Journal of the Acoustical Society of America 34: 475-492, (1962).

D. A. Mcintyre, "Response to Atmospheric Humidity at Comfortable Air Temperature: A Comparison of Three Experiments", The Annals of Occupational Hygiene, vol. 21, Issue 2, Aug. 1978, pp. 177-190.

Edgerton, V. R., et al.; "Elevation of Hemoglobin and Work Tolerance in Iron-Deficient Subjects", J. Nutr. Sci. Vitaminol., 27, 77-86, 1981.

Evans, G W, and D Johnson. "Stress and open-office noise." The Journal of applied psychology vol. 85,5: 779-83, (2000).

Fanger, P.O.; "Assessment of man's thermal comfort in practice", British Journal of Industrial Medicine, 1973, 30, 313-324.

Fanger, P.O., "Introduction of the olf and the decipol units to quantify air pollution perceived by humans indoors and outdoors", Building Serv. Eng. Res. Technol. 9(4), 1988, pp. 155-157 (3 pages).

Fanger, PO; "Olf and decipol: New units for perceived air quality," Building Serv. Eng. Res. Technol. 9(4) 155-157 (1988), (3 pages).

Fanger, PO; "Local Discomfort to the Human Body Caused by Non-Uniform Thermal Environments", Annals of Occupational Hygiene 20: 285-291 (1977).

Fitzgerald, Sarah, et al.; "A cost-analysis of complex workplace nutrition education and environmental dietary modification interventions", BMC Public Health (2017) 17:49, 10 pgs.

Fox, Marilyn L., et al.; "Effects of Stressful Job Demands and Control on Physiological and Attitudinal Outcomes in a Hospital Setting", The Academy of Management Journal, Apr. 1993, vol. 36, No. 2 (Apr. 1993), pp. 289-318.

GBD 2015 Tobacco Collaborators. "Smoking prevalence and attributable disease burden in 195 countries and territories, 1990-2015: a systematic analysis from the Global Burden of Disease Study 2015." Lancet (London, England) vol. 389,10082: 1885-1906, (2017).

Global, regional, and national disability-adjusted life-years (DALYs) for 315 diseases and injuries and healthy life expectancy (HALE), 1990-2015: a systematic analysis for the Global Burden of Disease Study 2015, www.thelancet.com, vol. 388, Oct. 8, 2016, pp. 1603-1658.

Greenwald, Anthony G et al. "Understanding and using the Implicit Association Test: III. Meta-analysis of predictive validity." Journal of personality and social psychology vol. 97,1: 17-41, (2009), (25 pages).

Gunnar, Megan, and Karina Quevedo. "The neurobiology of stress and development." Annual review of psychology vol. 58: 145-73, (2007), (33 pages).

Hastings, R., "Accommodating Seasonal Affective Disorder", https://www.shrm.org/resourcesandtools/hr-topics/employeerelations/pages/accommodatingsad.aspx. Dec. 21, 2009, Accessed Oct. 27, 2017 (3 pages).

Henrich, J., Heine, S. & Norenzayan, A. "Most people are not Weird", Nature 466, 29 (2010), (1 Page).

Hertenstein, Matthew J et al. "The communication of emotion via touch." Emotion (Washington, D.C.) vol. 9,4: 566-73, (2009), (8 pages).

Hoffman, Steven J, and Charlie Tan. "Overview of systematic reviews on the health-related effects of government tobacco control policies", BMC public health vol. 15 744. Aug. 5, 2015, (11 pages).

Hu, Yi-meng et al., "Effects of probiotics supplement in patients with type 2 diabetes mellitus: A meta-analysis of randomized trials", Medicina Clinica (English Edition), vol. 148, Issue 8, Apr. 21, 2017, pp. 362-370 (6 pages).

Humphreys, Michael A., "Quantifying occupant comfort: are combined indices of the indoor environment practicable?", Building Research & Information, 33:4, 317-325, (2005), (10 pages).

Jensen, KL, et al.; "Acoustical Quality In Office Workstations, As Assessed By Occupant Surveys", Proceedings: Indoor Air (2002) UC Berkeley Indoor Environmental Quality (IEQ), Sep. 4, 2005, 6 pgs.

Kaplan, Seth, et al. "Measurement of Emotions." Research Methods in Occupational Health Psychology: Measurement, Design, and Data Analysis, 1st ed., Routledge, New York, New York, 2012, pp. 61-75.

(56) References Cited

OTHER PUBLICATIONS

Lai et al., "An evaluation model for indoor environmental quality (IEQ) acceptance in residential buildings," 2009, vol. 41, pp. 930-9636.

Lai, A.C.K, et al.; "An evaluation model for indoor environmental quality (IEQ) acceptance in residential buildings", Energy and Buildings 41 (2009) 930-936.

Lai, H. K., and Yik, F. W. H., "Perception of importance and performance of the indoor environmental quality of high-rise residential buildings", Building and Environment, 44(2), 352-360 (2009).

Lai, Joseph H. K. and Francis W.H. Yik. "Perceived Importance of the Quality of the Indoor Environment in Commercial Buildings." Indoor and Built Environment 16: 311-321, (2007).

Leavitt, Keith, et al.; "Asking about well-being gets you half an answer: Intra-individual processes of implicit and explicit job attitudes", Journal of Organizational Behavior, J. Organiz. Behav. 32, 672-687 (2011).

Li, Danny H. W., et al.; "A simplified procedure for determining indoor daylight illuminance using daylight coefficient concept", Building and Environment 41 (2006) 578-589.

Mardaljevic, J., et al.; "Daylighting Metrics: Is There A Relation Between Useful Daylight Illuminance And Daylight Glare Probability? ", First Building Simulation and Optimization Conference Loughborough, UK, Sep. 10-11, 2012, 189-196.

Moya-Albiol, Luis et al. "Job satisfaction and cortisol awakening response in teachers scoring high and low on burnout." The Spanish journal of psychology vol. 13,2: 629-36, (2010).

Nabil, A. and Mardaljevic, John, "Useful daylight illuminance: A new paradigm for assessing daylight in buildings", Lighting Research & Technology—Lighting Res Technol. 37. 41-59, (2005).

Nabil, Azza and John Mardaljevic. "Useful daylight illuminances: A replacement for daylight factors." Energy and Buildings 38: 905-913, (2006).

National Center for Health Statistics (CDC), National Health Interview Survey (Adult Physical Activity Information; Glossary), https://www.cdc.gov/nchs/nhis/physical_activity/pa_glossary.htm, 2017 (2 pages).

Newsham, Guy R.; "Clothing as a thermal comfort moderator and the effect on energy consumption", Energy and Buildings 26 (1997) 283-291.

Oberg, Mattias et al. "Worldwide burden of disease from exposure to second-hand smoke: a retrospective analysis of data from 192 countries." Lancet (London, England) vol. 377,9760: 139-46, (2011).

Oxizidis, S., et al.; "Typical Weather Years and the Effect of Urban Microclimate on the Energy Behaviour of Buildings and HVAC Systems", Advances in Building Energy Research, 2007, vol. 1, 26 pages.

Pattakos, Alex, et al.; "Discovering Meaning Through the Lens of Work", Journal of Constructivist Psychology, 30:1, 42-49 (2017), (9 pages).

Pennebaker, James W. "Writing about Emotional Experiences as a Therapeutic Process." Psychological Science 8, No. 3: 162-66, (1997).

Pennebaker, James W., et al.; "Accelarating the Coping Process", Journal of Personality and Social Psychology, 1990, vol. 58, No. 3, 528-537.

Pruessner, Jens C., et al.; "Burnout, Perceived Stress, and Cortisol Responses to Awakening", Psychosomatic Medicine 61:197-204 (1999).

Rocha, Maria C. et al., "Stress among nurses: An examination of salivary cortisol levels on work and day off", Revista da Escola de Enfermagem da U S P. 47. 1187-1194 (2013).

Safizadeh, M. Reza, et al.; "Evaluation of Radiant Ceiling Heating Systems for Renovated Buildings based on Thermal Comfort Criteria", Windsor Conference Rethinking comfort, Apr. 12-15, 2018, 16 pgs.

Salter, Charles M. et al.; "Case studies of a method for predicting speech privacy in the contemporary workplace", UC Berkeley Indoor Environmental Quality (IEQ), Center for the Build Environment, 2003, 48 pgs.

Schlegel, Jay C., "The Relative Effects Of Convection And Radiation Heat Transfer On The Thermal Sensations of Sedentary Objects", Kansas State University, (1968), (73 pages).

Shea, Beverley J., et al.; "Development of AMSTAR: a measurement tool to assess the methodological quality of systematic reviews", BMC Medical Research Methodology 2007, 7:10, 7 pgs.

Smith, Emma et al. "The global burden of other musculoskeletal disorders: estimates from the Global Burden of Disease 2010 study." Annals of the rheumatic diseases vol. 73,8: 1462-9, (2014).

Song, Gook-Sup; "Could sperm quality be affected by a building environment? A literature review", Building and Environment 45 (2010) 936-943.

Steger, Michael, et al. "Measuring meaningful work: The Work as Meaning Inventory (WAMI)", Journal of Career Assessment—J Career Assessment. 20. 322-337,(2012).

Strauss, Richard. H., et al.; "Influence of Heat and Humidity on the Airway Obstruction Induced by Exercise in Asthma", The Journal of Clinical Investigation, vol. 61, Feb. 1978, 433-440.

Thompson, J. et al., "Effects of daily iron supplementation in 2- to 5-year-old children: systematic review and meta-analysis", Pediatrics. 2013; vol. 131, No. 4, pp. 739-753 (16 pages).

Tracy, Jessica L., and Richard W. Robins, "Show Your Pride: Evidence for a Discrete Emotion Expression", Psychological Science 15, No. 3: 194-97, (2004).

Trust for America's Health, "A healthier America 2013: strategies to move from sick care to health care in the next four years", Issue Report, Jan. 2013, http://healthyamericans.org/assets/files/TFAH2013HealthierAmericaFnlRv.pdf, Accessed Nov. 30, 2017 (100 pages).

US Environmental Protection Agency, National Oceanic and Atmospheric Administration, National Park Service, et al., "Extremely high levels of PM2.5: steps to reduce your exposure", AirNow, https://airnow.gov/index.cfm?action=aqibasics.pmhilevels, Accessed Nov. 27, 2017 (4 pages).

Van Der Scheer J.W, et al., "Effects of exercise on fitness and health of adults with spinal cord injury: A systematic review", Neurology, 2017 (34 pages).

Vining, R F et al. "Salivary cortisol: a better measure of adrenal cortical function than serum cortisol", Annals of clinical biochemistry vol. 20 (Pt 6): 329-35, (1983).

Wang, Jiandong et al. "Particulate matter pollution over China and the effects of control policies." The Science of the total environment vol. 584-585: 426-447, (2017).

Weibel, Laurence et al. "Work-related stress in an emergency medical dispatch center." Annals of emergency medicine vol. 41,4: 500-506, (2003), (7 pages).

Wong et al., "A multivariate-logistic model for acceptance of indoor environmental quality (IEQ) in offices," 2007, Building and Environment, vol. 48, pp. 1-6.

Wong, L. T., et al.; "A multivariate-logistic model for acceptance of indoor environmental quality (IEQ) in offices", Building and Environment 43 (2008) 1-6.

World Health Organization, "Nutritional Anaemias: Tools for Effective Prevention and Control", Geneva: World Health Organization; 2017, available online: http://apps.who.int/iris/bitstream/10665/66914/1/WHO_NHD_01.3.pdf (96 pages).

World Health Organization. (2019). Nutrition Landscape Information System (NLiS) country profile indicators: interpretation guide, 2nd ed. World Health Organization, https://apps.who.int/iris/handle/10665/332223. License: CC BY-NC-SA 3.0 IGO.

Zakowski, Sandra G et al. "Written emotional disclosure buffers the effects of social constraints on distress among cancer patients." Health psychology : official journal of the Division of Health Psychology, American Psychological Association vol. 23,6: 555-63, (2004).

\* cited by examiner

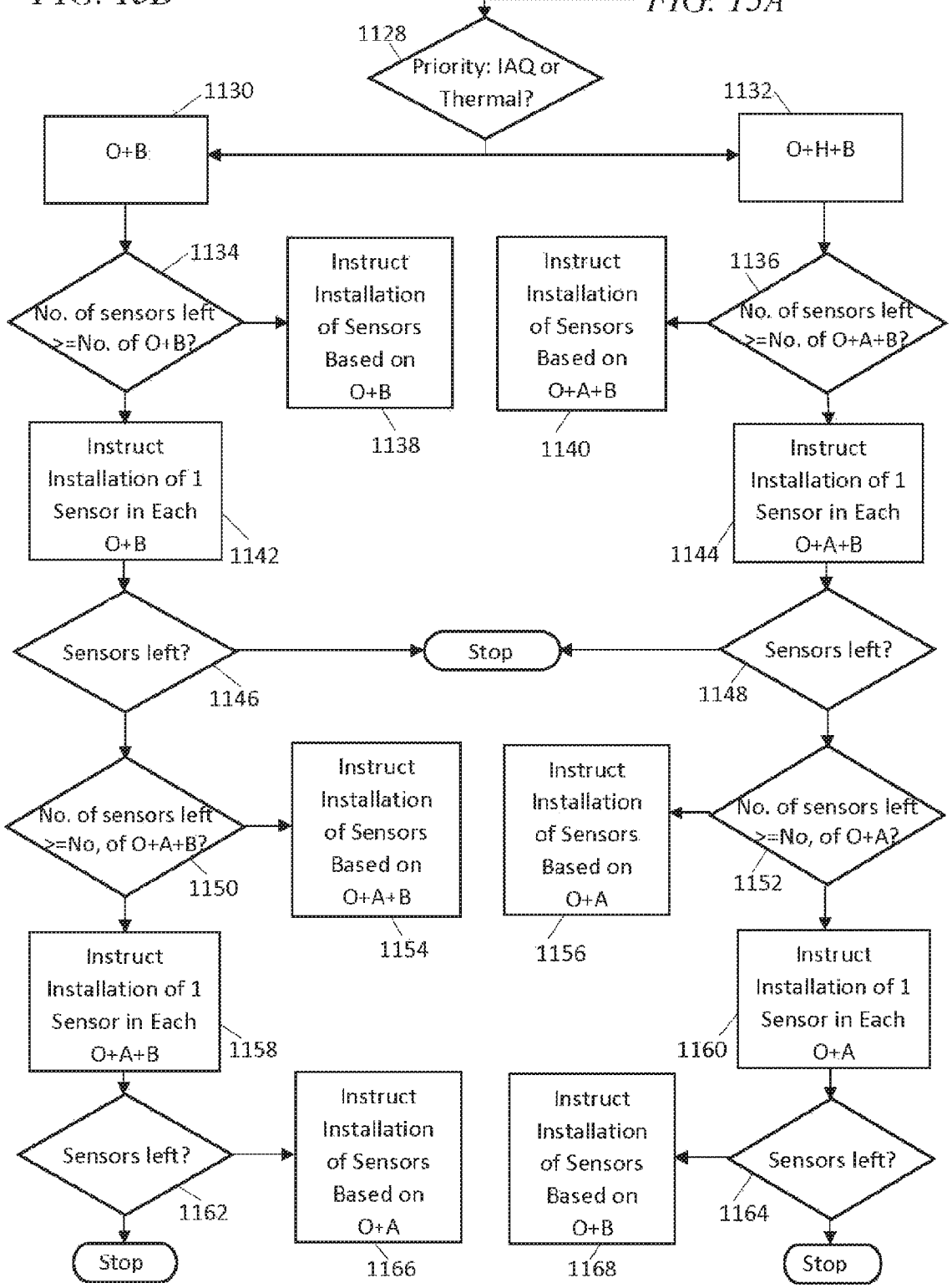

SYSTEMS AND METHODS FOR AIR REMEDIATION

CROSS-REFERENCE TO RELATED APPLICATIONS

This application claims benefit of International Application Number PCT/US2019/050416, filed Sep. 10, 2019, which claims benefit of U.S. Provisional Application No. 62/783,718, filed Dec. 21, 2018, and claims benefit of U.S. Provisional Application No. 62/756,913, filed Nov. 7, 2018, and claims benefit of U.S. Provisional Application No. 62/731,535, filed Sep. 14, 2018, which are all hereby incorporated herein by reference in their entirety. This application also is a continuation-in part of International Application Number PCT/US2019/050339 filed Sep. 10, 2019, which claims benefit of U.S. Provisional Application No. 62/756,913, filed Nov. 7, 2018, and claims benefit of U.S. Provisional Application No. 62/731,535, filed Sep. 14, 2018, which are all hereby incorporated herein by reference in their entirety.

TECHNICAL FIELD

This disclosure relates generally to assessing, monitoring, and improving the indoor air quality in a habitable environment and/or spaces therein.

BACKGROUND

Most people spend significant amounts of time in habitable environments such as enclosed indoor spaces associated with homes, apartments, condominium units, hotel suites or rooms, motel suites or rooms, spas, hospitals, and other public and private facilities. Sometimes these indoor spaces are controlled, or even owned by, the principal occupants, such as homes, apartments or condominium units. Other times these enclosed spaces are controlled by others, for example a facility owner or operator who may own and/or operate a hotel, motel, spa, hospital.

Significant time in these indoor spaces exposes the occupant to a wide range of environmental factors, any of which may have either adverse or beneficial effects on the occupant's health, well-being or sense of well-being. For example, poor indoor air quality has been linked to numerous short- and long-term health issues. Common indoor air pollutants include, for example, carbon dioxide ($CO_2$), carbon monoxide (CO), particulate matter (e.g., $PM_{2.5}$, $PM_{10}$), volatile organic compounds (VOCs), radon, nitrogen dioxide, ozone (O), and noxygen (NOx), which may be produced or otherwise released by, for example, building materials, HVAC systems, fuel burning combustion appliances, cleaning products, smoking, etc.

Short-term effects of indoor air pollutants may include irritation of the eyes, nose, and throat, headaches, dizziness, and fatigue, while long-term effects may include respiratory diseases, heart disease, and even cancer. Sick Building Syndrome (SBS) is a condition associated with increased time spent in buildings, and the chemicals used in building materials are thought to be a major contributing factor.

New approaches for improving air quality in indoor spaces within habitable environments are desirable.

BRIEF SUMMARY

Most people spend significant amounts of time in habitable environments such as enclosed indoor spaces associated with homes, apartments, condominium units, hotel suites or rooms, motel suites or rooms, spas, hospitals, office spaces, meeting rooms, and other public and private facilities. Sometimes these indoor spaces are controlled, or even owned by, the principal occupants, such as homes, apartments or condominium units. Other times these enclosed spaces are controlled by others, for example a facility owner or operator who may own and/or operate a hotel, motel, spa, hospital, office building or office space, etc.

Products, methods and systems may be usable for improving air quality within a particular indoor space or other habitable environment. Such spaces may include, for example, an office building, building office, school, apartment building, dormitory, single family home, multi-family dwelling or building, townhouse, theatre, train or bus station, library, public lounge, store or market, bakery, restaurant, tavern, pub, resort, bar, hostel, lodge, hotel, motel, inn, guest house, mall, art gallery, art studio, craft studio, ship, boat, gym, spa, fitness center, sports facility, gas station, airplane, airport, automobile, train, bus, kiosk, hospital, doctor's office, dentist's office, police station, fire station, lighthouse, bank, coffee shop, dry cleaner, department store, pharmacy, hardware store, drug store, grocery store, institution, music studio, recording studio, concert hall, radio station or studio, television station or studio, post office, church, mosque, synagogue, chapel, mobile home, barn, farm house, silo, residence, assisted living center, hospice, dwelling, laundromat, museum, hair salon, parking structure or facility, greenhouse, nursery, nail salon, barbershop, trailer, warehouse, storage facility, rest home, day care facility, laboratory, military facility, and any other place or facility where one or more people may congregate, live, work, meet, engage, spend time, etc. Within such spaces, there may be one or more sub-spaces or habitable environments that may be used for single or multiple purposes, such as home or other offices, kitchens, galleys, pantries, cooking areas, eating areas, home or office libraries or studies, conference rooms, dining rooms, bathrooms, toilets, powder rooms, play rooms, bedrooms, foyers, reception areas, file rooms, pods, pet rooms, storage rooms, junk rooms, carports, dens, basements, attics, garages, closets, classrooms, cabins, cabooses, train cars, bunk rooms, media rooms, baths, auditoriums, locker rooms, changing rooms, engine rooms, cockpits, work rooms, stairwells, exhibition rooms, platforms, elevators, walk ways, hallways, pools, stock rooms, exercise rooms, break rooms, snack rooms, living or family rooms, dressing rooms, slumber rooms, meeting rooms, conference rooms, offices, game rooms, porches, patios, seating areas, clean rooms, common rooms, lunch rooms, sky boxes, stages, prop rooms, make up rooms, safes, vaults, reception areas, check-in areas, compartments, drafting rooms, drawing rooms, computer or information technology rooms, waiting rooms, operating rooms, examination rooms, therapy rooms, emergency rooms, recovery rooms, machine rooms, equipment rooms, control rooms, laboratory rooms, monitoring rooms, and enclosed or partially enclosed areas, among others. In some spaces, requirements in the design, operation or other aspect of the space may apply. For example, enclosed stairwells often may have a separate source of air, a separate air handling system, or be pressurized to make sure that the stairwells remain usable in a fire.

Various approaches described herein employ combinations of passive and active techniques for improving air quality in indoor spaces, to reduce or ameliorate adverse effects of various indoor air pollutants. These approaches may have application in occupational environments, for instance offices, retail locations, factories or warehouses.

These approaches may have application in residential settings, for instance homes, apartments, porches, condominiums or other residences. These approaches may have application in other settings, for instance hospitals or clinics, waiting areas associated with transportation such as airports and train stations, and/or public areas such as theaters, arenas, stadiums, museums, hotels and other venues. The various combinations may advantageously produce synergistic results, which may not be otherwise achievable on an individual basis.

Occupants or other users of such spaces or sub-spaces (i.e., zones) may want to control or influence the indoor air quality or other parameters within a given space or sub-space, which may be, or may be part, of a habitable environment or other habitable, usable or occupiable area.

In one illustrative approach, a system for improving the air quality in an indoor space may be summarized as including a sensor array configured to measure at least one air parameter in an indoor space; an air handling unit comprising a control circuit; and a central control circuit that includes at least one processor and at least one non-transitory processor-readable medium that stores at least one of processor-executable instructions or data. The central controller is communicatively coupled to the sensor array and the air handling unit and is configured to receive from the sensor array a first signal indicative of a measurement of a first air parameter in the space; determine if the measurement of the first air parameter is above a first threshold value for a first duration; if the measurement of the first air parameter is above the first threshold value for the first duration, determine if air within the space is currently being remediated; and if the air within the space is not currently being remediated, cause the air handling unit to remediate the air within the space until a measurement of the first air parameter is lower than a second value for a second duration. In some embodiments, a sensor array may be or include one or more environmental parameter measuring devices or other sensors.

In some embodiments, the first and second threshold values may be substantially the same. In other embodiments, the second threshold value may be lower than the first threshold value. For example, the second threshold value may be about half of the first threshold value.

The sensor array may be configured to measure one or more air parameters at defined detection intervals. In addition, each of the first and second durations may comprise at least one, and sometimes, at least two sensor detection intervals. In some embodiments, the first and second durations are substantially similar. In other embodiments, the second duration is longer than the first duration.

The sensor array may include one or more sensors that are capable of detecting and/or measuring any detectable air pollutant or air quality parameter including, but not limited to, carbon dioxide, carbon monoxide, particulate matter, volatile organic compounds (VOCs), radon, nitrogen dioxide, ozone, noxygen (NOx), and combinations thereof.

The air handling unit may remediate the air within the indoor space using any suitable air remediation technique including, but not limited to fresh air exchange, particulate filtration, ionic filtration, activated carbon filtration, ultraviolet air purification, chemical sorbent filtration, catalyst sorbent filtration, and combinations thereof. In some embodiments, when the detected air quality parameter above the threshold is carbon dioxide, the air handling unit may remediate the air within the indoor space by fresh air exchange. For example, when the measurement of carbon dioxide in the indoor space is above the first threshold value for the first duration, the central control circuit causes a window or vent in the indoor space to open a predetermined amount to facilitate the fresh air exchange by the air handling unit.

In some embodiments, the central control circuit may receive from the sensor array a second signal indicative of a measurement of a second air pollutant or parameter in the space. In some embodiments, the central control circuit may then determine if the measurement of the second air parameter is above a third threshold value for a third duration, and if the measurement of the second air parameter is above the third threshold value for the third duration, the central control circuit may cause the air handling unit to remediate the air within the space until a measurement of the second air parameter is lower than a fourth threshold value for a fourth duration. In other embodiments, the central control circuit may determine that a combined measurement of the first and second air parameters in the indoor space is above a first combined threshold value for the first duration, and cause the air handling unit to remediate the air within the space until a combined measurement of the first and second air parameters is lower than a second combined threshold value for the second duration. When the first air parameter comprises carbon dioxide and a second air parameter comprises particulate matter, the air handling unit may remediate the air in the indoor space by at least fresh air exchange.

The system may further include one or more occupancy sensors or sensor arrays communicatively coupled to the central control circuit and configured to detect an occupancy in the indoor space or zones therein, and the system may automatically adjust the first and second threshold values and/or the first and second durations based on a detected occupancy in the indoor space or zones therein.

In some embodiments, the central control circuit may be further configured to initiate operation of the air handling unit at a specific time of day or for a period prior to a predetermined time of day to reduce a measurement of the first air parameter below a threshold value that is lower than each of the first and second threshold values.

The system may further comprise an outdoor air sensor communicatively coupled to the central control circuit, the outdoor air sensor located in an outdoor area outside of the indoor space and configured to measure at least one air outdoor parameter in the outdoor area. The central control circuit may receive from the outdoor sensor a first outdoor signal indicative of a measurement of a first outdoor air parameter in the outdoor area and determine if the measurement of the first outdoor air parameter is above a first outdoor threshold value for a first outdoor duration.

In some embodiments, if the measurement of the first outdoor air parameter is above the first outdoor threshold value for the first outdoor duration, and if the air within the space is not currently being remediated, the central control circuit may cause the air handling unit to remediate the air within the indoor space without using fresh air exchange until the sooner of: a measurement of the first outdoor air parameter is lower than a second outdoor threshold value for a second outdoor duration, or a measurement of the first air parameter in the indoor space is lower than the second threshold value for the second duration. In some embodiments, if the measurement of the first outdoor air parameter is above the first outdoor threshold value for the first outdoor duration, and if the air within the space is not currently being remediated, the control circuit may delay air remediation in the indoor space by the air handling unit until a measurement of the first outdoor air parameter is lower than the second threshold value for the second outdoor duration. In some embodiments, if the measurement of the first outdoor air parameter is above the first outdoor threshold value for the first outdoor duration, and if the air within the space is currently being remediated, the central control circuit may cause the air handling unit to cease air remediation in the indoor space until the measurement of the first outdoor air parameter is lower than a second outdoor threshold value for the second outdoor duration.

In another illustrative approach, a system for improving the air quality in an indoor space may be summarized as including a first sensor array located in a first zone of an indoor space and a second sensor array located in a second zone of the indoor space, the first and second sensors configured to measure at least one air parameter in the first and second zones of the indoor space, respectively; and an air handling unit associated with the first and second zones of the indoor space comprising a control circuit. The system further includes a central control circuit communicatively coupled to the sensor array and the air handling unit, the central control circuit configured to receive from the first sensor array a signal indicative of a measurement of a first air parameter in the first zone; determine if the measurement of the first air parameter is above a first threshold value for a first duration; if the measurement of the first air parameter is above the first threshold value for the first duration, determine if air within the first zone is currently being remediated; and if the air within the first zone is not currently being remediated, cause the air handling unit to remediate the air within the first and second zones until a measurement of the first air parameter is lower than a second value for a second duration.

In some embodiments, the air handling unit associated with the first and second zones may further comprise a first damper located in the first zone and a second damper located in the second zone, the first and second dampers configured to control airflow into the first and second zones, respectively. If the measurement of the first air parameter is above the first threshold value for the first duration, and if the air within the first zone is not currently being remediated, the air handling unit associated with the first and second zones may remediate the air within the first zone by reconfiguring positions of the first and second dampers to allow airflow into the first zone and to restrict airflow into the second zone.

The system may further may comprise a third sensor array located in a third zone of a of the indoor space and a fourth sensor array located in a fourth zone of the indoor space, the third and fourth sensor arrays communicatively coupled to the central control circuit and configured to measure at least one air parameter in the third and fourth zones of the indoor space, respectively. The system may further include an air handling unit associated with the third and fourth zones of the indoor space comprising a control circuit. The control circuit may be further configured to receive from the third sensor array a signal indicative of a measurement of a second air parameter in the third zone; determine if the measurement of the second air parameter in the third zone is above a third threshold value for a third duration; if the measurement of the second air parameter in the third zone is above the third threshold value for the third duration, determine if air within the third zone is currently being remediated; and if the air within the third zone is not currently being remediated, cause the air handling unit associated with the third and fourth zones to remediate the air within the third and fourth zones until a measurement of the second air parameter in the third zone is lower than a fourth threshold value for a fourth duration.

In some embodiments, the air handling unit associated with the third and fourth zones may further comprise a third damper located in the third zone and a fourth damper located in the fourth zone, the third and fourth dampers configured to control airflow into the third and fourth zones, respectively. If the measurement of the first air parameter in the third zone is above the first threshold value for the first duration, and if the air within the third zone is not currently being remediated, the air handling unit associated with the third and fourth zones may remediate the air within the third zone by reconfiguring positions of the third and fourth dampers to allow airflow into the third zone and to restrict airflow into the fourth zone.

In some embodiments, the first and second threshold values may be substantially the same. In other embodiments, the second threshold value may be lower than the first threshold value. For example, the second threshold value may be about half of the first threshold value. In some embodiments, the first, second, third, and fourth threshold values may be substantially the same. In other embodiments, the first and third threshold values may be substantially the same and the second and fourth values may be substantially the same. In some embodiments, the second and fourth threshold values may be lower than the first and third threshold values. For example, the second and fourth threshold values may be about half of the first and third thresholds values.

The sensor arrays are generally capable of detecting and/or measuring any detectable air quality parameter including, but not limited to, carbon dioxide, carbon monoxide, particulate matter, volatile organic compounds (VOCs), radon, nitrogen dioxide, ozone, noxygen (NOx), and combinations thereof. The sensor arrays may be configured to measure one or more air parameters at defined detection intervals. In addition, each of the first, second, third, and/or fourth durations may comprise at least one, and in some embodiments, at least two sensor detection intervals. In some embodiments, the first, second, third, and fourth durations maybe substantially similar. In other embodiments, the first and third durations may be substantially similar and the second and fourth durations may be substantially similar, and the second and fourth durations may be longer than the first and third durations.

The air handling unit associated with the first and second zones may remediate the air within the first and second zones using any suitable air remediation technique including, but not limited to fresh air exchange, particulate filtration, ionic filtration, activated carbon filtration, ultraviolet air purification, and combinations thereof. In some embodiments, when the detected air quality parameter above the threshold is carbon dioxide, the air handling unit associated with the first and second zones may remediate the air within the first and second zones by fresh air exchange. For example, when the measurement of carbon dioxide in the first and second zones is above the first threshold value for the first duration, the central control circuit causes a window or vent in the first and/or second zones to open a predetermined amount to facilitate the fresh air exchange by the air handling unit.

In some embodiments, the central control circuit may receive a signal from the first sensor array indicating that levels of two different air parameters in the first zone are above respective first and second thresholds for the first duration. The central control circuit may then cause the air handling unit associated with the first and second zones to remediate the air within the first and second zones until a measurement of the two air parameters in the first zone is lower than respective second predetermined threshold values for the second duration. In other embodiments, the central control circuit may determine that a combined measurement of first and second air parameters in the first zone is above a first combined threshold value for the first duration and cause the air handling unit to remediate the air within the first and second zones until a combined measurement of the first and second air parameters is lower than a second combined threshold value for the second duration. When the first air parameter comprises carbon dioxide and a second air parameter comprises particulate matter, the air handling unit associated with the first and second zones may remediate the air in the first and second zones by at least fresh air exchange.

The system may further include one or more occupancy sensors or sensor arrays communicatively coupled to the central control circuit and configured to detect an occupancy in the first zone, and the system may automatically adjust the first and second threshold values and/or the first and second durations based on a detected occupancy in the first zone In some embodiments, the central control circuit may be further configured to initiate operation of the air handling unit associated with the first and second zones at a specific time of day or for a period prior to a predetermined time of day to reduce a measurement of the first air parameter in the first zone below a threshold value that is lower than each of the first and second threshold values.

The system may further comprise an outdoor air sensor communicatively coupled to the central control circuit, the outdoor air sensor located in an outdoor area outside of the indoor space and configured to measure at least one air outdoor parameter in the outdoor area. The central control circuit may receive from the outdoor sensor a first outdoor signal indicative of a measurement of a first outdoor air parameter in the outdoor area and determine if the measurement of the first outdoor air parameter is above a first outdoor threshold value for a first outdoor duration.

In some embodiments, if the measurement of the first outdoor air parameter is above the first outdoor threshold value for the first outdoor duration, and if the air within the first and second zones is not currently being remediated, the central control circuit may cause the air handling unit to remediate the air within the first and second zones without using fresh air exchange until the sooner of: a measurement of the first outdoor air parameter is lower than a second outdoor threshold value for a second outdoor duration; or a measurement of the first air parameter in the first zone is lower than the second threshold value for the second duration. In some embodiments, if the measurement of the first outdoor air parameter is above the first outdoor threshold value for the first outdoor duration, and if the air within the space is not currently being remediated, the control circuit may delay air remediation in the first and second zones by the air handling unit until a measurement of the first outdoor air parameter is lower than the second threshold value for the second outdoor duration. In some embodiments, if the measurement of the first outdoor air parameter is above the first outdoor threshold value for the first outdoor duration, and if the air within the first and second zones is currently being remediated, the central control circuit may cause the air handling unit to cease air remediation in the first and second zones until the measurement of the first outdoor air parameter is lower than a second outdoor threshold value for the second outdoor duration.

In one illustrative approach, a method of improving air quality in an indoor space may be summarized as including receiving from a sensor array a first signal indicative of a measurement of a first air parameter in the space; determining if the measurement of the first air parameter is above a first threshold value for a first duration; if the measurement of the first air parameter is above the first threshold value for the first duration, determining if air within the space is currently being remediated; and if the air within the space is not currently being remediated, initiating air remediation in the space by an air handling unit and continuing air remediation within the space until a measurement of the first air parameter is lower than a second value for a second duration. The air handling unit may remediate the air within the space using at least one of fresh air exchange, particulate filtration, ionic filtration, activated carbon filtration, and ultraviolet air purification. The first air parameter may be selected from the group consisting of carbon dioxide, particulate matter, volatile organic compounds (VOCs), radon, carbon monoxide, nitrogen dioxide, ozone, noxygen (NOx), and combinations thereof.

In some embodiments, the method may further include receiving from a sensor array a second signal indicative of a measurement of a second air parameter in the space; determining if the measurement of the second air parameter is above a third threshold value for a third duration; and if the measurement of the second air parameter is above the third threshold value for the third duration, initiating air remediation in the indoor space by the air handling unit and continuing air remediation within the space until a measurement of the second air parameter is lower than a fourth threshold value for a fourth duration. In other embodiments, the method may further include receiving from the sensor array a second signal indicative of a measurement of a second air parameter in the space; determining that a combined measurement of the first and second air parameters in the indoor space is above a first combined threshold value for the first duration; initiating air remediation in the indoor space by the air handling unit; and continuing air remediation within the space until a combined measurement of the first and second air parameters is lower than a second combined threshold value for the second duration.

In some embodiments, the method may further include initiating operation of the air handling unit at a specific time of day or for a period prior to a predetermined time of day to reduce a measurement of the first air parameter below a threshold value that is lower than each of the first and second threshold values.

The method may further comprise receiving from an outdoor sensor a first outdoor signal indicative of a measurement of a first outdoor air parameter in the outdoor area; and determining if the measurement of the first outdoor air parameter is above a first outdoor threshold value for a first outdoor duration. In some embodiments, if the measurement of the first outdoor air parameter is above the first outdoor threshold value for the first outdoor duration, and if the air within the space is not currently being remediated, the method may further comprise initiating air remediation within the indoor space by the air handling unit without using fresh air exchange, and continuing air remediation until the sooner of: a measurement of the first outdoor air parameter is lower than a second outdoor threshold value for a second outdoor duration; or a measurement of the first air parameter in the indoor space is lower than the second threshold value for the second duration. In other embodiments, if the measurement of the first outdoor air parameter is above the first outdoor threshold value for the first outdoor duration, and if the air within the space is not currently being remediated, the method may further comprise delaying air remediation in the indoor space by the air handling unit until a measurement of the first outdoor air parameter is lower than the second threshold value for the second outdoor duration. In some embodiments, if the measurement of the first outdoor air parameter is above the first outdoor threshold value for the first outdoor duration, and if the air within the space is currently being remediated, the method may further comprise causing the air handling unit to cease air remediation in the indoor space until the measurement of the first outdoor air parameter is lower than a second outdoor threshold value for the second outdoor duration.

In another illustrative approach, a method of improving air quality in an indoor space may be summarized as including receiving from a first sensor array a signal indicative of a measurement of a first air parameter in a first zone; determining if the measurement of the first air parameter is above a first threshold value for a first duration; if the measurement of the first air parameter is above the first threshold value for the first duration, determining if air within the first zone is currently being remediated; if the air within the first zone is not currently being remediated, initiating air remediation in the first and second zones by an air handling unit associated with the first and second zones; and continuing air remediation within the first and second zones until a measurement of the first air parameter in the first zone is lower than a second value for a second duration. In some embodiments, the air handling unit associated with the first and second zones may remediate the air within the first zone by reconfiguring positions of first and second dampers located in the first and second zones, respectively, to allow airflow into the first zone and to restrict airflow into the second zone.

The method may further comprise receiving from a third sensor array a signal indicative of a measurement of a second air parameter in a third zone; determining if the measurement of the second air parameter in the third zone is above a third threshold value for a third duration; if the measurement of the second air parameter in the third zone is above the third threshold value for the third duration, determining if air within the third zone is currently being remediated; if the air within the third zone is not currently being remediated, initiating air remediation in the third and fourth zones by an air handling unit associated with the third and fourth zones; and continuing air remediation within the third and fourth zones a measurement of the second air parameter in the third zone is lower than a fourth threshold value for a fourth duration. In some embodiments, the air handling unit associated with the third and fourth zones may remediate the air within the third zone by reconfiguring positions of third and fourth dampers located in the third and fourth zones, respectively, to allow airflow into the third zone and to restrict airflow into the fourth zone.

The air handling units may remediate the air within the zones using at least one of fresh air exchange, particulate filtration, ionic filtration, activated carbon filtration, and ultraviolet air purification. The air parameters may be selected from the group consisting of carbon dioxide, particulate matter, volatile organic compounds (VOCs), radon, carbon monoxide, nitrogen dioxide, ozone, noxygen (NOx), and combinations thereof.

In some embodiments, the method may further include receiving a signal from the first sensor array indicating that levels of two air parameters in the first zone are above respective first threshold values for the first duration, initiating air remediation in the first and second zones by the air handling unit associated with the first and second zones, and continuing air remediation within the first and second zones until a measurement of the two air parameters in the first zone is lower than respective second predetermined threshold values for the second duration. In other embodiments, the method may further include receiving from the first sensor array a second signal indicative of a measurement of a second air parameter in the first zone, determining that a combined measurement of the first and second air parameters in the first zone is above a first combined threshold value for the first duration, initiating air remediation in the first and second zones by the air handling unit associated with the first and second zones, and continuing air remediation within the first and second zones until a combined measurement of the first and second air parameters is lower than a second combined threshold value for the second duration.

In some embodiments, the method may further include initiating operation of the air handling unit at a specific time of day or for a period prior to a predetermined time of day to reduce a measurement of the first air parameter below a threshold value that is lower than each of the first and second threshold values.

The method may further comprise receiving from an outdoor sensor a first outdoor signal indicative of a measurement of a first outdoor air parameter in the outdoor area; and determining if the measurement of the first outdoor air parameter is above a first outdoor threshold value for a first outdoor duration. In some embodiments, if the measurement of the first outdoor air parameter is above the first outdoor threshold value for the first outdoor duration, and if the air within the first and second zones is not currently being remediated, the method may further comprise initiating air remediation within the first zone by the air handling unit associated with the first and second zones without using fresh air exchange, and continuing air remediation in the first zone until the sooner of: a measurement of the first outdoor air parameter is lower than a second outdoor threshold value for a second outdoor duration; or a measurement of the first air parameter in the first zone is lower than the second threshold value for the second duration. In other embodiments, if the measurement of the first outdoor air parameter is above the first outdoor threshold value for the first outdoor duration, and if the air within the first and second zones is not currently being remediated, the method may further comprise delaying air remediation in the first zone by the air handling unit associated with the first and second zones until a measurement of the first outdoor air parameter is lower than the second threshold value for the second outdoor duration. In some embodiments, if the measurement of the first outdoor air parameter is above the first outdoor threshold value for the first outdoor duration, and if the air within the first and second zones is currently being remediated, the method may further comprise causing the air handling unit associated with the first and second zones to cease air remediation in the first and second zones until the measurement of the first outdoor air parameter is lower than a second outdoor threshold value for the second outdoor duration.

In another illustrative approach, a method of improving air quality in an indoor space may be summarized as including receiving from a first sensor array a signal indicative of a measurement of an air parameter in a first zone; receiving from a second sensor array a signal indicative of a measurement of an air parameter in a second zone; determining that the measurements of the air parameters in the first and second zones are above first respective threshold values for first respective durations; ranking the first and second zones as one of a highest ranked zone and a next highest ranked zone based on air remediation priority; initiating air remediation in the highest ranked zone by an air handling unit associated with the first and second zones; continuing air remediation in the highest ranked zone until a measurement of the respective air parameter in the highest ranked zone is lower than a respective second value for a respective second duration; initiating air remediation in the next highest ranked zone by the air handling unit; and continuing air remediation in the next highest ranked zone until a measurement of the respective air parameter in the next highest zone is lower than a respective second value for a respective second duration.

In some embodiments air remediation priority may be based on, for example, at least one of: (a) the type of elevated air parameter(s); (b) the respective measurements or scores of the air parameter(s); (c) comparison of which air parameter(s) exceeds its threshold value the most; (d) estimated, actual, or predicted occupancy of the zone (e.g., if one zone is occupied and the other is not, the occupied zone may be remediated first; the zone scheduled for occupancy first may be remediated first; etc.); (e) intended or expected use of the zone, the type of room/zone, etc. (e.g., a bedroom may be remediated before a kitchen, a child's bedroom may be remediated before an adult's bedroom, a meeting room may be remediated before a document storage room); (f) the zone that was remediated the longest time ago may be remediated first; (g) the zone that can be remediated the quickest may be remediated first; (h) time of day or year; (i) day of week; (j) the relative impacts of elevated air parameters on one or more people's health; (k) occupant or other user preference or need; (l) location; (m) external weather or other conditions (e.g., noise level); (n) group related preference or need; (o) power or energy availability; (p) noise level or other ramification created during remediation of a zone; (q) the length of time it might take to remediate a zone; or (r) one or more other factors (e.g., a room having food out in the open may be remediated before another room).

Occupants of an indoor space may want to continuously or otherwise regularly monitor indoor environmental quality parameters, including thermal and indoor air quality parameters, within the indoor space. Continuously or regularly monitoring an indoor environment allows for the environment to be more precisely and accurately controlled.

In one illustrative approach, an apparatus for sheltering occupants may summarized as including a built structure having an indoor environment; a sensor array configured to measure at least one of air quality, thermal quality, sound parameters, or lighting parameters; a central control circuit communicatively coupled to the sensor array. The central control circuit in the apparatus may be configured to delineate occupant zones based on an electronic floor plan; instruct allocation or installation of at least one sensor array for or in each delineated occupant zone; after delineation of the occupant zones, delineating at least one boundary zone and at least one air handling zone based on the electronic floor plan and an electronic HVAC plan; identify overlapping zones including at least one combined boundary-occupant zone, combined air handling-occupant zone, or combined boundary-occupant-air handling zone; and instruct allocation or installation of at least one sensor array for or in the identified overlapping zones. If the sensor arrays available are less than a total of the combined delineated occupant zones and identified overlapping zones, then allocation or installation of thermal sensor arrays may occur on the basis of the following order of preference: combined boundary-occupant-air handling zone first, then the combined air handling-occupant combined zones, and then the combined boundary-occupant combined zones and allocation or installation of air quality sensor arrays occurs on the basis of the following order of preference: the combined boundary-occupant zone, the combined boundary-occupant-air handling zone, and then the combined air handling-occupant zone.

In another illustrative approach, a system for monitoring indoor environmental quality may be summarized as including a built structure having a plurality of environmentally-controllable zones; a sensor array configured to measure at least one indoor environmental quality parameters; an environmental control system associated with the built structure; at least one electronic user device associated with a user; and a control circuit that is communicatively coupled to the sensor array, the electronic device, and the environmental control system. In the system, the environmentally-controllable zones may be delineated into one or more occupant zones, air handling zones, and boundary zones. The control circuit may be configured to detect a particular occupant having an occupant profile in an environment database, locate the particular occupant in a particular occupant zone, compare the sensor readings in the particular occupant zone with parameters of the occupant profile associated with the particular occupant, and, upon detection that the sensor readings in the particular occupant zone are not within the parameters of the occupant profile, instruct the environmental control system to adjust the parameters pursuant to the occupant profile.

In one embodiment, the system for monitoring indoor environmental quality may include a sensor array configured to measure at least one of air quality, thermal quality, sound parameters, or lighting parameters.

In another illustrative approach, a method of monitoring indoor air quality may be summarized as including delineating a plurality of occupant zones in a built structure based on an electronic floor plan; allocating or installing at least one of a plurality of sensor arrays for or in each delineated occupant zone; after delineation of the occupant zones, delineating at least one boundary zone and at least one air handling zone based on the electronic floor plan and an electronic HVAC plan; identifying overlapping zones including at least one combined boundary-occupant zone, combined air handling-occupant zone, or combined boundary-occupant-air handling zone; installing at least one of the plurality of sensor arrays in the identified overlapping zones; and operating an air handling system according to readings from the sensor arrays in the delineated occupant zones and the identified overlapping zones. If sensor arrays available for the identified occupant zones are less than the delineated occupant zones and the identified overlapping zones, then allocation or installation of thermal sensor arrays may occur on the basis of the following order of preference combined boundary-occupant-air handling zone first, then the combined air handling-occupant combined zones, and then the combined boundary-occupant combined zones.

BRIEF DESCRIPTION OF THE DRAWINGS

Disclosed herein are embodiments of systems, apparatus, and methods pertaining to assessing, monitoring, and improving the indoor air quality in a habitable environment and/or spaces therein. In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIGS. 15A and 15B are a flow diagrams of a method for monitoring indoor environmental quality in accordance with some embodiments.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with environmental control such as fans, blowers, heaters, coolers such as air conditioners or swamp coolers, compressors or other cooling systems, and control systems such as computing systems, as well as networks and other communications channels have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 1:
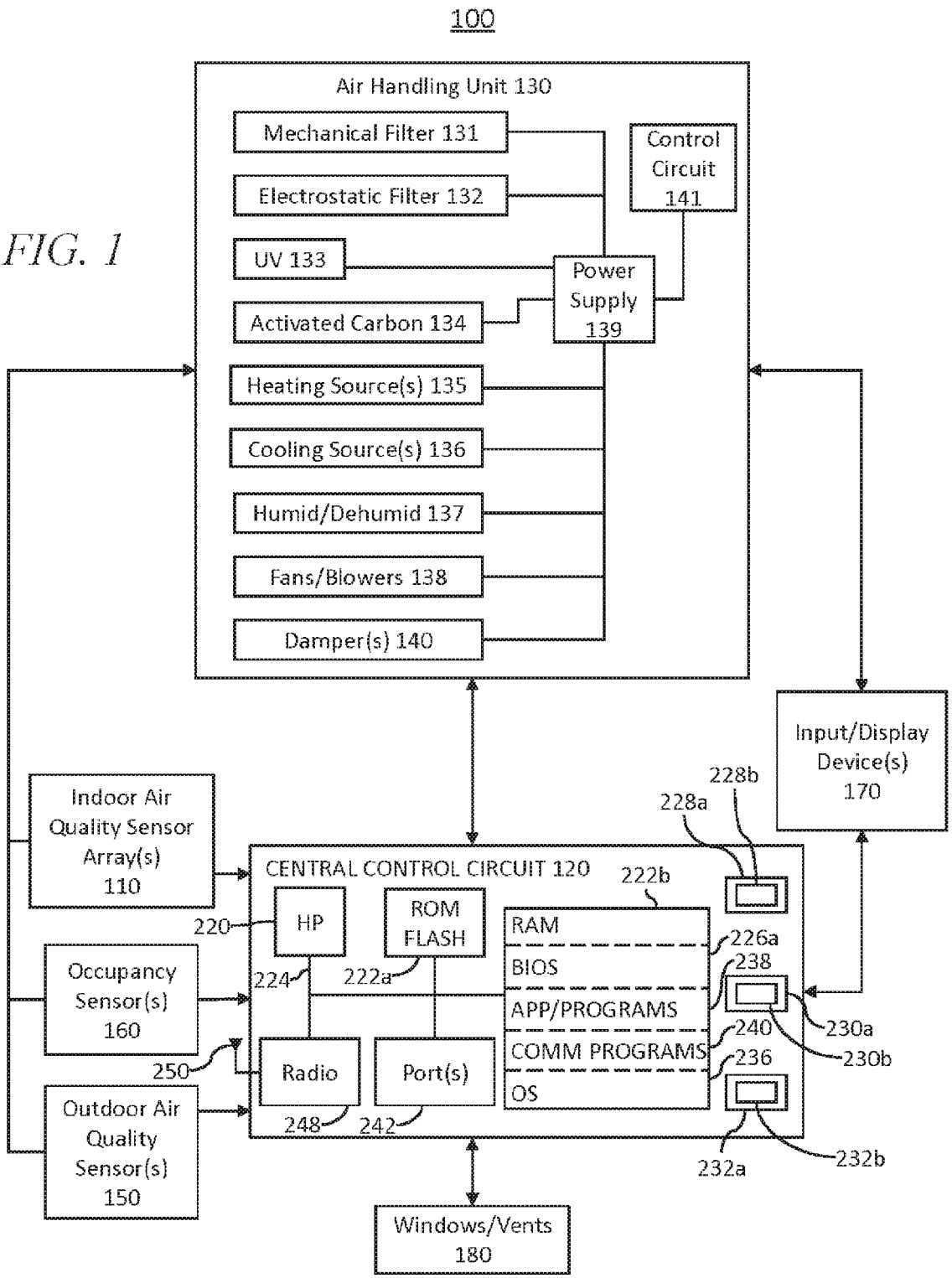
FIG. 1 is a block diagram of an air remediation system for improving air quality in an indoor space in accordance with some embodiments.

FIG. 1 illustrates an exemplary air remediation system 100 for improving air quality in a habitable environment or indoor space therein. In some approaches, the air remediation system 100 may be a standalone system for remediating air quality in a habitable environment. In other approaches, the air remediation system may form part of, or otherwise incorporate, one or more existing HVAC systems within a habitable environment. In some embodiments, the air remediation system 100 may form part of a home wellness and/or a "smart home" system in the habitable environment, which may also include other systems or components that contribute to a wellness or sense of wellness of the occupant of the habitable environment. For example, embodiments of the air remediation describe herein may be incorporated into systems for enhancing wellness in a habitable environment, and example of which is described in International Application No. PCT/US2017/048382, filed on Aug. 27, 2017, which published as WO/2018/039433 on May 1, 2018, the contents of which is hereby incorporated by reference.

As shown in FIG. 1, air remediation system 100 generally includes one or more indoor air quality (IAQ) sensor arrays 110. The sensor arrays 110 may comprise one or more indoor air quality sensors configured to sense, detect, or otherwise measure air pollutants in the habitable space or one or more zones therein. Examples of air pollutants that may be detected by sensors comprising sensor array 110 may include, but are not limited to, carbon dioxide ($CO_2$), carbon monoxide (CO), particulate matter (e.g., $PM_{2.5}$, $PM_{10}$), volatile organic compounds (VOCs), radon, nitrogen dioxide, ozone, and noxygen (NOx).

The air remediation system 100 may optionally include one or more outdoor air quality (OAQ) sensor arrays 150 to measure outdoor air pollutants. The outdoor air quality sensor arrays may include air quality standalone sensors located outside of the habitable environment and configured to send signals to the air remediation system 100, and may also include sensors associated with weather stations, which may broadcast air quality data, weather predictions or forecasts, or other information for public use. The system may also include one or more occupancy sensors, motion detectors, face or other visual recognition technologies, or other technology or devices located in the indoor space or zones therein 160 to sense, detect, or otherwise measure the occupancy of an indoor space of the habitable environment or zones therein.

The air remediation system 100 further may include one or more air handling units 130 communicatively coupled to a central control circuit 120, directly or indirectly. The one or more air handling systems 130 may form part of an existing HVAC system in the habitable environment and may include a variety of components to ensure that air supplied to one or more zones in the habitable environment is healthy and comfortable for the occupant(s). It should be noted that although air handling unit 130 as depicted in FIG. 1 may include a variety of components, as discussed below in further detail, it is not necessary for the air handling unit to include each and every component discussed below. Some components may be optional, depending on the geographical location of the habitable environment, the configuration of the habitable space, the number of rooms or other zones within the habitable space, the needs and/or desires of occupants, cost, external conditions, availability, etc. Various air pollutants and techniques for partial or complete remediation of them which may be utilized by air remediation system 100 are discussed in more detail below.

Good air quality is one of the most important features of a healthy environment. Stationary adults typically inhale 6 to 10 liters of air each minute. This amount may double with moderate activity and may double again with vigorous exercise. Approximately 15 cubic meters of air pass through the lungs of a moderately active adult each day.

Minute quantities of gaseous pollutants and particulates may be present in the air from both natural and anthropogenic sources, which can cause serious health problems. Reducing the sources of gases and particulates in the home will decrease their negative effects. Airborne contaminants generated by materials, and the presence of individuals in the home, require expulsion through ventilation to the outdoors, and filtration to ensure that they do not return to the indoor air supply.

The major health effects of poor air quality include lung cancer and cardio-pulmonary disease. Often a significantly greater number of deaths from these ailments can be attributed to periods of higher levels of particulate matter. Other effects of air quality are asthma attacks, emphysema, and interference with the immune system.

At the microscopic scale, natural laws concerning fluid dynamics and gravity work differently, allowing solids and liquids to float in the air almost indefinitely. Put broadly, this microscopic particulate matter can be divided into two categories: fine particles, smaller than 2.5 µm ($PM_{2.5}$); and coarse particles larger than 2.5 µm and smaller than 10 µm ($PM_{10}$-$PM_{2.5}$). Fine particles are inhalable particles that can lead to a number of health issues. Due to physical processes that govern their formation, fine particles are inherently more acidic and mutagenic than their larger counterparts. Fine particles are drawn deep into the lungs, maximizing damage. Most cases of mortality from inhalation of coarse particulate matter and larger contaminants arise from toxic chemicals they contain rather than the particles themselves.

Coarse particles usually do not penetrate as deeply into the lungs as fine particles, and therefore are the less dangerous of the two. However, many coarse particles are allergens. For example, dust mites are microscopic arachnids that feed on pet dander, dead human skin cells, and other biological matter. They thrive in carpets, mattresses, and curtains, and tend to dwell in synthetic fibers rather than natural materials. Mites are not inherently dangerous, but their droppings contain chemicals that trigger an immune response in some individuals. The resulting symptoms often include itchy eyes, runny nose, and wheezing, a reaction that can be particularly debilitating for asthmatics. Nearly one quarter of American homes have dust mite levels associated with symptomatic asthma, and almost half of them contain enough dust mites to cause allergic reactions in susceptible individuals.

Air constantly flows into homes and is subject to a wide range of pollutants both from outdoor air pollution and source contaminants within the home. Indoor air pollution is among the top five environmental health risks and has been shown to be 2-5 times higher than the pollution of outdoor spaces—up to 100 times higher in extreme cases. Therefore, effectively managing indoor air quality through the filtration of air drawn from outdoors and the circulation of indoor air can help reduce the concentration of contaminants in the home. To that end, air handling unit 130 may include one or more mechanical air filters (e.g., mesh, screen, woven, or piled material) 131, through which air passes to remove larger particulate. Suitable mechanical air filters may include an activated carbon air filter, high efficiency particulate (HEPA) air filter (i.e., MERV equivalent 17+), MERV 13-16 air filter, a quantity of Zeolite, or a porous material.

The air handling unit 130 may include one or more electrostatic filters or precipitators 132 to remove fine particulate in one or more zones. In particular, electrostatic filter(s) 132 trap particles that could contain allergens, toxins, and pathogens. In addition, the electrostatic filter(s) 132 are installed to reduce dust mites, pollen, carpet fibers, mold spores, bacteria, smoke, and diesel particulate matter from the air. The electrostatic filter(s) 132 attracts particles using an electrostatic charge and extracts them from the air into a wire mesh.

The electrostatic filters 132 may take a variety of forms, for instance ones which place a charge on particles and an opposite charge on a screen or other electrode element to attract the charged particles. An example of such is a corona discharge type of electrostatic filter. The electrostatic filter 132 may be supplied charge via an electrical power supply 139.

Various airborne pathogens may present problems, particular in enclosed spaces or habitable environments. This may be of particular concern with newer construction techniques which are employed to reduce the exchange of air with the exterior environment, for instance to reduce heat loss and thereby increase thermal efficiency. Although most airborne microbes are pervasive and generally harmless, some can be dangerous pathogens easily spread throughout a home's ventilation system.

Mold spores can induce skin, nose, throat, and eye irritation, and trigger asthma attacks. These fungi release volatile organic compounds that produce the characteristic "moldy" odor and have been linked to dizziness and nausea. Humidity control has been proven effective in reducing mold, and insulated windows reduce condensation so as to prevent mold from growing in nearby joints.

Individual microbes are very small and often can evade some filters if they are not attached to other particles. In order to reduce the probability of airborne pathogens from traveling through the indoor space or habitable environment, UVGI can be used to provide additional protection. UVGI is based on a specific frequency of UV light that specifically targets the DNA of microbes and viruses passing through the ventilation system. The growth and spread of health-threatening biotic agents is a primary concern for moisture buildup in HVAC systems. The use of ultraviolet germicidal irradiation (UVGI) lights installed on the upstream side of the coil in HVAC systems has been associated with a significant reduction in microorganism concentrations on irradiated cooling coils and drip pans. According to a study conducted with office workers, significantly fewer work-related respiratory, mucosal, and overall health symptoms were reported when a UVGI system was used; the use of UVGI also resulted in a 99% reduction in the concentrations of bacteria, fungi, and endotoxins on irradiated surfaces in the HVAC system.

The air handling unit 130 may include a UV air sanitizer designed to disinfect air via UV light within one or more components (e.g., ducts) of a ventilation system. The aim is to sterilize airborne bacteria, viruses, dust mites, and mold spores that may have escaped filtration.

Thus, the air handling unit 130 may include one or more UV illumination sources 133. The UV illumination source(s) 133 is positioned to illuminate air with UV illumination of a sufficient intensity for a sufficient time as to render pathogens non-harmful.

Various gaseous pollutants may produce harmful effects in humans, particularly where allowed to accumulate in habitable enclosed spaces. Volatile Organic Compounds (VOCs) are carbon-based chemicals that evaporate into gases at room temperature. Many paints, varnishes, cleaning products, and pest control chemicals emit VOCs, whose presence in buildings can be 2 to 5 times as high as outside levels. Wet applied products, such as paints, coatings, varnishes, adhesives, and sealants, can often be a significant source of VOCs if they are not low-VOC materials, especially when they are drying, but also after drying. Composite wood products, which may be included in some furniture, millwork, etc. typically contain high levels of formaldehyde, which, can emit significant off-gas following their production/installation. Vinyl, or polyvinyl chloride (PVC) is another chemical that is commonly found in gasketing, carpet backing, furniture and in the household, shower curtains, etc. Depending on the product, significant off-gas may be emitted specifically as a result of the PVC. In the short term, exposure can cause dizziness, nausea, headaches, throat irritation, and fatigue, while chronic effects include damage to the liver, kidneys, and central nervous system.

Nitrogen dioxide is a product of combustion and mainly found near burning sources. Indoor areas that contain gas stoves, fireplaces, and cigarette smoke often have a much higher concentration of nitrogen dioxide. Epidemiological studies have suggested that excessive nitrogen dioxide inhalation may decrease lung function, particularly in children. In the short term, it can also trigger allergic responses from the immune system, resulting in irritation of the eyes, nose, and throat.

Ozone is created by reactions between molecular oxygen, nitrogen oxides, and sunlight. It is the major catalyst in the formation of smog. Ozone impedes cellular respiration, resulting in reduced cell activity. High concentrations of inhaled ozone can result in an itchy throat and chest tightness; chronic exposure scars the lung tissue, which can lead to emphysema. In addition, ozone interferes with the body's immune system, which compounds the danger from air or water-borne pathogens. Under current standards, the U.S. Environmental Protection Agency expects ozone to cause more than 110,000 lost work days and 1,100,000 lost school days between 2008 and 2020. Thus, the air handling unit 130 may include one or more activated carbon air filters 134 in the flow path to reduce VOC/TVOC, nitrogen dioxide, and ozone that pass through activated carbon media filters designed to intercept gas molecules. Activated carbon air filters 134 can be very beneficial in zones or other areas with sources of fumes or odors.

Additionally, or alternatively, the electrostatic filter 132 or some other element may optionally include one or more catalysts selected to catalyze certain impurities in the air. For instance, the electrostatic filter 132 may include one or more catalysts (e.g., non-metal catalysts for instance: titanium dioxide, chromium oxide or aluminum oxide, or metal catalysts for instance: Fe, Co, Ni, Cu, Ru, Rh, Pd, Ag, Ir, Pt and Au, as well as combinations or alloys thereof, such as an alloy of Pt and Rh) to catalyze species of VOCs into more acceptable or less harmful forms.

The air handling unit 130 may include one or more heaters or heating systems 135 to heat air or provided heated air in one or more zones. The heaters 135 may take any of a large variety of forms. Heaters 135 may take the form of various electric heaters, which employ a resistive radiant element to heat air. Heaters 135 may take the form of forced air heaters which typically include burners that burn a fuel such as natural gas or propane. Heaters 135 may alternatively take the form of oil furnaces, gas furnaces, or the like. In some embodiments, hot water supplied from a boiler or other hot water source also may be included.

The air handling unit 130 may include one or more compressors or other cooling systems 136 which may form part of an air conditioner cooling unit. The cooling systems 136 may be fluidly coupled to control pressure of a fluid, coupled with one or more coils or other heat exchangers, and may operate in a similar fashion to standard air conditioner units to remove heat from the air. In some embodiments, chilled water supplied from a cooling system or other chilled water source also may be included.

Relative humidity is the measure of water vapor in the air compared to the total amount that can be held at a given temperature. In the spring and summer months, humidity levels can be high enough to cause discomfort. When cool air flows through central air systems, humidity in the air often is reduced, since cooler air holds less water vapor. However, as dry air is drawn in and heated within a building in the winter, relative humidity may fall, so the air feels may feel dry.

To maintain comfort, and prevent the establishment and growth of mold, dust mites, and bacteria, relative humidity in the habitable environment preferably is kept between 30% and 500%. Using high-temperature water within the ventilation system of the home suppresses bacteria growth. Humidity towards the bottom of this range usually is better in terms of air quality, but extremely low moisture levels may lead to dry skin and respiratory irritation.

Thus, the air handling unit may include a humidifier and/or dehumidifier 137 which may be used to control humidity in one or more zones or throughout the indoor habitable environment. This is particularly important when moisture levels in the air fall in winter, thus the air handling unit 130 may increase the moisture (i.e., humidify) during dry periods. Conversely, the air handling unit may lower moisture (i.e., dehumidifies) during humid periods. The humidifier and/or dehumidifier 137 may include a reservoir (not shown) that retains water to either be added to the air in a humidification mode or removed from the air in a dehumidification mode. The humidifier and/or dehumidifier 137 may include a compressor or other cooling system (not shown) used to, for example cool air as part of removing moisture from the air. The humidifier and/or dehumidifier 137 may optionally include a heating element to heat air as part of adding moisture to the air.

The air handling unit 130 may include one or more fans and/or blowers 138 coupled to one or more ducts and/or vents to facilitate air circulation and/or fresh air exchange in one or more zones. The fans and/or blowers 138 may circulate air within the air handling unit 130 and/or within the indoor habitable environment or zones therein. The fans and/or blowers 138 may expel air to an exterior environment and/or draw fresh air from the exterior environment, prior to treating the fresh air. In particular, a high flow ventilation system may expel indoor air to reduce the buildup of internally generated air impurities such as volatile organic compounds, dust mites, and pet dander. A heat exchanger may advantageously be employed to recover energy from the outgoing air.

The air handling unit 130 may further include a control circuit 141. Control circuit 141 may be communicatively coupled directly or indirectly to the air handling unit 130 and configured to control one or more components of the air handling unit 130.

The air remediation system 100 also may include a central control circuit 200. The central control circuit 200 may take the form of a programmed computer or other processor-based system or device. For example, the central control circuit 200 may take the form of a conventional mainframe computer, mini-computer, workstation computer, personal computer (desktop or laptop), or handheld computer.

The central control circuit 200 may include one or more processing units 220 (one illustrated), non-transitory system memories 222a-222b (collectively 222) and a system bus 224 that couples various system components including the system memory 222 to the processing unit(s) 220. The processing unit(s) 220 may be any logic processing unit, such as one or more central processing units (CPUs), digital signal processors (DSPs), application-specific integrated circuits (ASICs), field programmable gate arrays (FPGAs), programmable logic controllers (PLCs), etc. Non-limiting examples of commercially available computer systems include, but are not limited to, an 80x86, Pentium, or i7 series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation. The system bus 224 can employ any known bus structures or architectures, including a memory bus with memory controller, a peripheral bus, and a local bus. The system memory 222 includes non-transitory Flash or read-only memory ("ROM") 222a and non-transitory random-access memory ("RAM") 222b. A basic input/output system ("BIOS") 226a, which can form part of the ROM 222a or RAM 222b, contains basic routines that help transfer information between elements within the controller 200, such as during start-up.

The controller 200 may include a hard disk drive 228a for reading from and writing to a hard disk 228b, an optical disk drive 230a for reading from and writing to removable optical disks 230b, and/or a magnetic disk drive 232a for reading from and writing to magnetic disks 232b. The optical disk 230b can be a CD/DVD-ROM, while the magnetic disk 232b can be a magnetic floppy disk or diskette. The hard disk drive 228a, optical disk drive 230a and magnetic disk drive 232a may communicate with the processing unit 220 via the system bus 224. The hard disk drive 230a, optical disk drive 230a and magnetic disk drive 232 a may include interfaces or controllers (not shown) coupled between such drives and the system bus 224, as is known by those skilled in the relevant art. The drives 228a, 230a and 232a, and their associated computer-readable storage media 228b, 230b, 232b, may provide non-volatile and non-transitory storage of computer readable instructions, data structures, program engines and other data for the air remediation system 100. Although controller 200 is illustrated employing a hard disk 228a, optical disk 230a and magnetic disk 232a, those skilled in the relevant art will appreciate that other types of computer- or processor-readable storage media that can store data accessible by a computer may be employed, such as magnetic cassettes, flash memory, digital video disks ("DVD"), Bernoulli cartridges, RAMs, ROMs, smart cards, etc. The hard disk 228a may, for example, store instructions and data for controlling the air remediation system 100, as well as other for components of a home wellness and/or home automation system, for example based on specific aspects or characteristics detected in one or more indoor spaces or zones therein in the habitable environment, inputs by an occupant or user of the habitable environment, or events expected or occurring in the habitable environment, to improve indoor air quality in one more indoor spaces or zones therein to promote the wellness or wellbeing of the occupant(s).

Program engines can be stored in the system memory 222b, such as an operating system 236, one or more application programs 238, other programs or engines and program data. Application programs 238 may include instructions that cause the processor(s) 220 to automatically generate signals to control various of the other subsystems to achieve various environmental characteristics or scenes in the habitable environment, for example based on one or more aspects, characteristics or attributes of an occupant thereof. Application programs 238 may include instructions that cause the processor(s) 220 to automatically receive input and/or display output via various user operable input/output (I/O) devices 170 such as, for example, panels installed in the habitable environment, handheld mobile devices, kiosks, and the like.

Other program engines (not specifically shown) may include instructions for handling security such as password or other access protection and communications encryption. The system memory 220 may also include communications programs 240, for example, a server for permitting the central control circuit 200 to provide services and exchange data with the air remediation system 100 and, optionally, other subsystems or computer systems or devices via the Internet, corporate intranets, extranets, or other networks (e.g., LANs, WANs), as well as other server applications on server computing systems such as those discussed further herein. The server in the depicted embodiment may be markup language based, such as Hypertext Markup Language (HTML), Extensible Markup Language (XML) or Wireless Markup Language (WML), and operates with markup languages that use syntactically delimited characters added to the data of a document to represent the structure of the document. A number of servers are commercially available such as those from Microsoft, Oracle, IBM and Apple.

While shown in FIG. 1 as being stored in the system memory 222b, the operating system 236, application programs 238, other programs/engines, program data and communications applications (e.g., server, browser) 240 can be stored on the hard disk 228b of the hard disk drive 228a, the optical disk 230b of the optical disk drive 230a and/or the magnetic disk 232b of the magnetic disk drive 232a.

An operator can enter commands and information (e.g., configuration information, data or specifications) via various user operable input/output (I/O) devices, such as, for example, panels installed in the habitable environment, handheld mobile devices, kiosks, and the like, or through other input devices such as a dedicated touch screen or keyboard and/or a pointing device such as a mouse and/or via a graphical user interface. Other input devices can include a microphone, joystick, game pad, tablet, scanner, touch pad, etc. These and other input devices may be connected to one or more of the processing units 220 through an interface such as a serial port interface 242 that couples to the system bus 224, although other interfaces such as a parallel port, a game port or a wireless interface or a universal serial bus ("USB") can be used. A monitor or other display device may be coupled to the system bus 224 via a video interface, such as a video adapter (not shown). The central control circuit can include other output devices, such as speakers, printers, etc. Alternatively, or in addition, these and other input devices may be connected directly to the air handling unit 130, allowing a user to directly communicate with and/or control the air handling unit 130.

Figure 2:
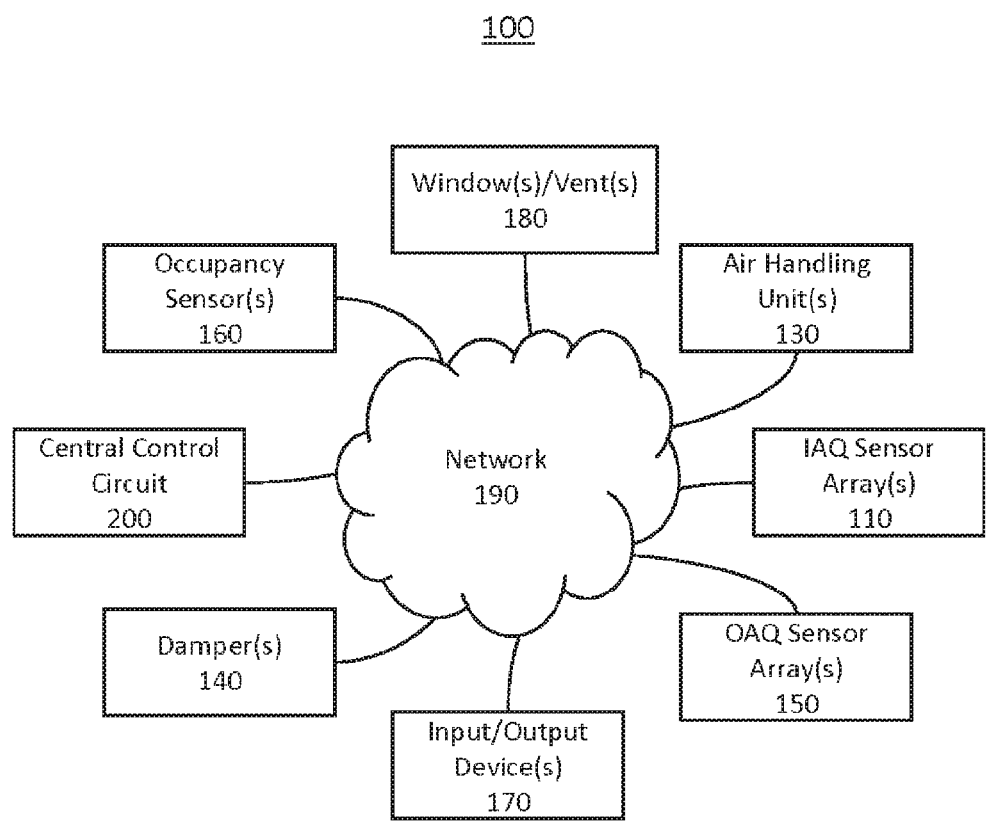
FIG. 2 is a block diagram of an air remediation system for improving air quality in an indoor space in accordance with some embodiments.

The central control circuit 200 can operate in a networked environment using logical connections to one or more remote computers and/or devices as described above with reference to FIG. 1. For example, the central control circuit 200 can operate in a networked environment using logical connections to one or more other subsystems 204-214, one or more server computer systems 244 and associated non-transitory data storage device 246. The server computer systems 244 and associated non-transitory data storage device 246 may, for example, be controlled and operated by a facility (e.g., hotel, spa, apartment building, condominium building, hospital) in which the habitable environment is located. Communications may be via wired and/or wireless network architectures (190 in FIG. 2), for instance, wired and wireless enterprise-wide computer networks, intranets, extranets, and the Internet. Thus, the central control circuit 200 may include wireless communications components, for example one or more transceivers or radios 248 and associated antenna(s) 250 for wireless (e.g., radio or microwave frequency communications, collected referred to herein as RF communications). Other embodiments may include other types of communication networks including telecommunications networks, cellular networks, paging networks, and other mobile networks.

The air remediation system 100 may further include one or more windows and/or vents 180 communicatively coupled, directly or indirectly, to central control circuit 200 such that the central control circuit 200 may control the opening and closing of the windows and/or vents in response to detected levels of various indoor and outdoor air pollutants.

As described above, the air remediation system 100 may include one or more wired or wireless user input/display devices 170 communicatively coupled to the central control circuit 200 and/or to air handling unit 130 directly, which allows a user to view and/or control functions of the air remediation system 100, as well as the air handling system 130 directly. The user input/display device 170 may include user actuatable controls (e.g., user selectable icons displayed on touch screen, keys, buttons) manipulation of which allows a user, for instance an occupant of the habitable environment, to select parameters or programs to control one or more components of the air remediation system 100 and/or the air handling unit 130. In some approaches, a mobile or handheld device may serve as the user input/display device 170 and may include a display (e.g., LCD) to display information and user actuatable controls (e.g., user selectable icons, keys, buttons) manipulation of which allows a user, for instance an occupant of the habitable environment, to select parameters or programs to execute to control one or more components of the air remediation system 100. The mobile or handheld device may execute a downloaded customized application or "APP" that communicatively interfaces via a wireless protocol (e.g., IEEE 802.11, BLUETOOTH®, WI-FI®, Zigbee, Z-Wave, LTE).

Figure 3:
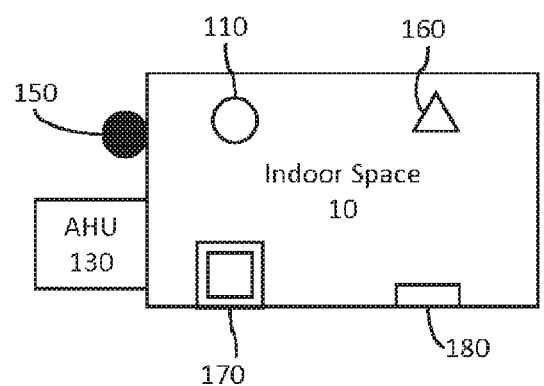
FIG. 3 is a schematic diagram of an indoor space in accordance with some embodiments.
Figure 4:
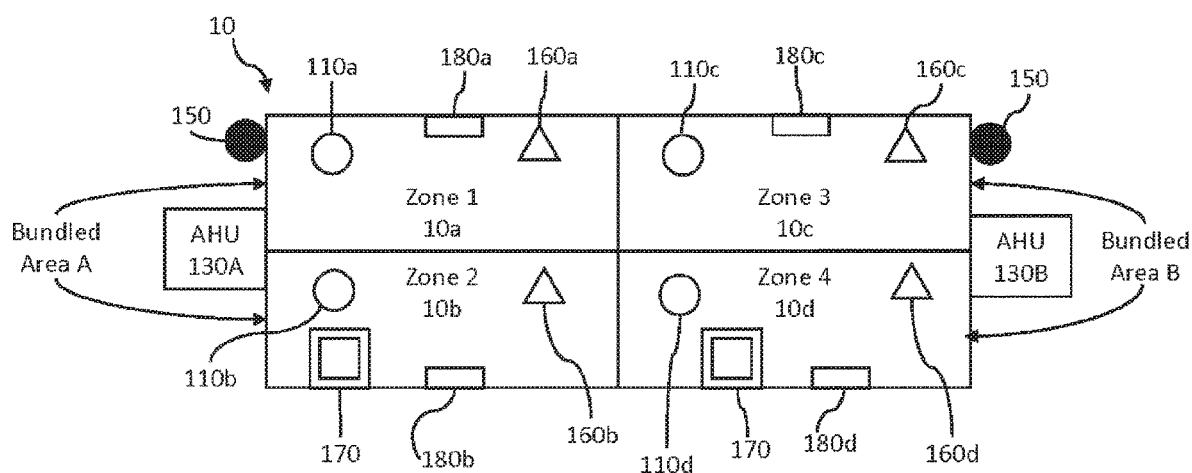
FIG. 4 is a schematic diagram of a multi-zone indoor space in accordance with some embodiments.
Figure 5:
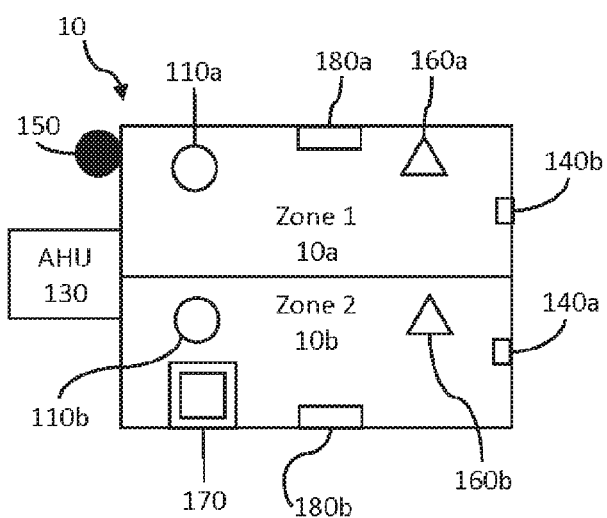
FIG. 5 is a schematic diagram of a multi-zone indoor space in accordance with some embodiments.

FIGS. 3 to 5 illustrates various scenarios in which air remediation system 100 may be utilized to improve the air quality of an indoor space 10 in a habitable environment. FIG. 3 illustrates a single-zone indoor space 10 (i.e., the space only has one conditioned zone), with one air handling unit 130. The indoor space 10 may be, for example, studio apartment, a small home, a small office space, a hotel room, or any other habitable environment in which a single air handling unit may be used.

The air remediation system utilized in the single-zone scenario illustrated in FIG. 3 may include some or all of the components described above with reference to FIG. 1. For example, the air remediation system may include one or more sensor arrays 110 comprising one or more sensors configured to measure at least one air parameter in the indoor space 10, including, but not limited to carbon dioxide, particulate matter, volatile organic compounds (VOCs), radon, carbon monoxide, nitrogen dioxide, ozone, noxygen (NOx), and combinations thereof. The sensors in the sensor array 110 may be positioned throughout indoor space 10 in any suitable location. In one approach, one or more sensors that form the sensor array may be positioned at the expected typical breathing level(s) and/or height(s) of an average adult. For example, in some approaches, one or more sensors that form the sensor array may be positioned at, for example, from about 3 to about 7 feet from the floor, or even more specifically from about 4 to about 6 feet above the floor where one or more people may be expected to be standing in the indoor space 10; from about 2 to about 5.5 feet, or even more specifically from about 2 to about 4.5 feet above the floor where one or more people may be expected to be sitting in the indoor space 10; and/or from about 1.5 to about 4.5 feet, or even more specifically about 1.5 to about 3.5 feet above the floor where one or more people may be expected to be laying down on a bed or a couch in the indoor space 10. One or more sensors may also be placed or otherwise adjusted to be positioned to accommodate spaces where children are expected to occupy. In some embodiments, two or more sensor arrays configured to measure the same or different air quality parameters, or multiple air quality parameters, may be placed at different heights within the indoor space 10. For example, if a person is using a desk that can raise and lower to enable the person to stand or sit while using the desk, one sensor may be placed at a lower height from the floor to measure one or more air quality parameters at a sitting height for the person and another sensor may be placed at a higher height from the floor to measure one or more air quality factors at a standing height for the person.

A sensor used in the sensor array 110 may be configured to measure one or more air parameters at defined detection intervals, for example, every set number of milliseconds, seconds, minutes, etc. In some approaches, the sensor detection interval for one or more of the sensor arrays may be 1 minute, in some approaches two minutes, in some approaches three minutes, in some approaches four minutes, etc. In some approaches, the sensor detection interval may be between 1 and 5 minutes or even longer (e.g., ten minutes, twenty minutes, thirty minutes, sixty minutes, four hours, twelve hours, twenty-four hours).

Air handling unit 130 is configured to remediate or otherwise improve the air quality in indoor space 10 using any suitable air remediation technique, including but not limited to fresh air exchange, particulate filtration, ionic filtration, activated carbon filtration, and ultraviolet air purification. In the single-zone scenario illustrated in FIG. 3, setting points regarding thermal comfort may be achieved with indoor air quality remediation simultaneously, and particulate matter can be reduced in default mode for most of the time, even without a heating/cooling load.

Sensor array 110 and air handling unit 130 are communicatively coupled, directly or indirectly, to a central control circuit, which may comprise central control circuit 200 described above with reference to FIG. 1. The central control circuit 200 is configured to receive from the sensor array 110 signals indicative one or more air parameter measurements in indoor space 10 and communicate with air handling unit 130 to cause air handling unit 130 to initiate air remediation when certain conditions are met. For example, when the central control circuit 200 receives a first signal indicative of a measurement of a first air parameter in indoor space 10, the central control circuit determines if the measurement of the first air parameter is above a first threshold value for a first duration.

In some approaches, the threshold values for various air pollutants may correspond to threshold values recommended by experts in the field. In some approaches, threshold values may be dependent and/or may otherwise change based on, for example, geographic region, season, location, user preference, month, day, and even time of day. Threshold values, detection intervals, and durations may be dependent on, or may otherwise change, based on intended or expected use of the space or an internal event such as, for example, when the occupant count in the space exceeds a normal range, the space has been unoccupied for a period of time, a window is opened, a person known to have severe allergies enters or leaves the indoor space, etc. In other approaches, threshold values, detection intervals, and durations may change based on an external event such as, for example, a local increase or decrease in local pollen count, external air pollution, etc. In some approaches, threshold values, detection intervals, and durations may change (e.g., may decrease) after air remediation is triggered a first time. In some approaches, thresholds, detection intervals, and durations may increase if air remediation is not triggered for a certain period of time, or may decrease if air remediation is being triggered with only short variations in between.

As one example, in one approach, a first threshold value for $PM_{2.5}$ may be 12 ug/m$^3$, a first threshold value for $PM_{10}$ may be 50 ug/m$^3$, and a first threshold value for $CO_2$ may be 800 ppm. In some approaches, the first duration may comprise at least one sensor detection interval, and in some approaches at least two detection intervals, in order to confirm the high measurement of the air parameter. For example, if a detection interval for a given sensor measuring a given air parameter is 2 minutes, the first and/or second duration may be 4 minutes.

If the measurement of the first air parameter is above the first threshold value for the first duration (e.g., two detection intervals), the central control circuit 200 determines if air within the indoor space 10 is currently being remediated. If the air within the indoor space 10 is not currently being remediated, the central control circuit 200 sends a signal to air handling unit, directly or indirectly, to cause the air handling unit 130 to remediate the air within the indoor space 10 until a measurement of the first air parameter is lower than a second threshold value for a second duration. Exemplary default threshold values, threshold value ranges, detection intervals, and durations for common air pollutants/air quality indicators are listed in Table 1 below.

TABLE 1

| Pollutant | Default threshold value | Value range | Detection interval | Duration |
|---|---|---|---|---|
| $CO_2$ | 800 ppm | 600-1000 ppm | 1-5 min | 2 intervals |
| $PM_{2.5}$ | 15 ug/m$^3$ | 12-35 ug/m$^3$ | 1-5 min | 2 intervals |
| $PM_{10}$ | 50 ug/m$^3$ | 20-150 ug/m$^3$ | 1-5 min | 2 intervals |
| CO | 9 ppm | 6-30 ppm | 1-5 min | 2 intervals |
| TVOC | 500 ug/m$^3$ | 200-1000 ug/m$^3$ | 1-5 min | 2 intervals |
| Radon | 4 pCi/L | 2-8 pCi/L | 1-5 min | 2 intervals |
| $NO_2$ | 21 ppb | 15-100 ppb | 1-5 min | 2 intervals |
| $O_3$ | 51 ppb | 25-70 ppb | 1-5 min | 2 intervals |

As discussed above, any suitable air remediation technique may be used to remediate the air in the indoor space, and may often depend on the particular air pollutant detected. For example, when the system determines a measurement of $CO_2$ that is above, for example, 800 ppm for at least one detection interval, and in some approaches at least two detection intervals, the air remediation technique employed by the system to improve air quality in indoor space 10 may include fresh air exchange. When the system determines a measurement of $PM_{10}$ is above, for example, 150 ug/m$^3$, the, the air remediation technique employed by the system to improve air quality in indoor space 10 may include mechanical air filtration and/or fresh air exchange. As discussed below, fresh air exchange may not be a suitable air remediation technique in scenarios where outdoor air quality may be poorer than the air quality in indoor space 10.

Regardless of the air parameter being measured, air remediation by the air handling unit 130 may not begin with an instant concentration peak. Generally, only a high level of the detected air parameter which lasts more than at least one detection interval, and in some approaches at least two detection intervals, may trigger remediation (a delay loop may be included to execute this feature before sending a command to the air handling unit). Even if the detected air parameter is above a set threshold value for a set duration, in some approaches air remediation may not begin unless or until the system determines that no remediation is occurring in any other areas or zones of the indoor space. In some approaches, air remediation may be triggered by the occurrence of an external event such as, for example, an increase in local pollen count, external air pollution, etc. In other approaches, air remediation may be triggered by the occurrence of an internal event such, as for example, within a designated time period after a fire is started in a fireplace or a stove is started in a kitchen, even if the threshold has not been met in the room containing the fireplace or the stove.

As another example, air remediation may be triggered by a sudden increase in room occupancy.

Additionally, the remediation process will not cease instantly when the concentration drops below the second threshold. In some approaches, the same delay loop mentioned above may be applied when the concentration drops below the second threshold. For example, the detected air parameter should be below the threshold value for more than at least one detection interval for air remediation to cease.

In some approaches, the first and second threshold values for a given air parameter are substantially the same. In other words, air remediation might be triggered when a detected level of an air parameter is above a particular threshold value and then may cease when the detected level of the air parameter falls below the same threshold value. In other approaches, the second threshold value for ceasing air remediation may be lower than the first threshold value for a given air parameter. For example, the second threshold value may be about half of the first threshold value.

In some approaches, each of the first and second durations comprise at least one sensor detection interval. In some approaches, the first and second durations may be substantially similar. In other words, air remediation might be triggered when a detected level of an air parameter is above a particular threshold for a set duration (e.g., at least one detection interval) and then may cease when the detected level of the air parameter falls below the threshold value for at least the same set duration. In other approaches, the second duration may be longer than the first duration.

In some embodiments, the sensor array 110 may be configured to measure at least two different air parameters at defined detection intervals. For example, the sensor array 110 may be configured to measure both $PM_{2.5}$ and $CO_2$ using on or more sensors. In this approach, the central control circuit 200 may be further configured to receive from the sensor array 110 both the first and second signals indicative measurements of a first and second air parameter in the space 10. The central control circuit 200 may then determine if the measurement of one or both of the first and second air parameters are above set threshold values for a set duration for each air parameter, and if one or both measurements are above the set threshold value(s) for the set duration(s), the central control circuit may cause the air handling unit 130 to remediate the air within the space 10 until a measurement of both the first and second the second air parameters are lower than respective second thresholds for second durations for each given air parameter. In other embodiments, the central control circuit may calculate a combined measurement (e.g., an air quality score) of at least two air parameters and determine that the combined measurement of the first and second air parameters in the indoor space 10 is above a first combined threshold value for the first duration. The central control circuit may then send a signal to air handling unit 130, directly or indirectly, to cause the air handling unit 130 to remediate the air within the space 10 until a combined measurement of the first and second air parameters is lower than a second combined threshold value for the second duration.

The combined measurement, which may also be referred to as an air quality score, may be represented by S(i) to indicate the contamination level, where i is the type of contaminant. The higher the score, the more polluted the air. The score may be calculated per the following equation: Most pollutants found indoors have the minimum concentration at 0 or instrument detect limit (like PM, NOx)

$$\begin{cases} S(i) = \frac{C(i)}{t(i)}, & \text{if } C(i) < t(i) \\ S(i) = 1, & \text{if } C(i) \geq t(i) \end{cases}$$

Where:
S(i) is the score of the contamination level of pollutant i, which is a real number in 0~1;
t(i) is the health threshold of the pollutant i. The value of thresholds can be referred to WELL Building Standard.
C(i) is the concentration of pollutant i.
For pollutants that the minimum concentration in the indoor environment is not 0 (like $CO_2$):

$$\begin{cases} S(i) = 0, & \text{if } C(i) \leq C_{min}(i) \\ S(i) = \frac{C(i) - C_{min}(i)}{t(i) - C_{min}(i)}, & \text{if } C_{min}(i) \leq C(i) < t(i) \\ S(i) = 1, & \text{if } C(i) \geq t(i) \end{cases}$$

Where:
$C_{min}(i)$ is the minimum concentration of pollutant i that can be achieved in the normal environment. The typical value of $C_{min}(i)$ is 350-450 ppm
The overall score of the air quality is determined by the highest score of different pollutants:

$$S_{IAQ} = \max_i (S(i))$$

The threshold of $S_{IAQ}$ is 1 in normal scenario. The threshold of $S_{IAQ}$ can be adjusted according to, but not limited to, the following reasons:
Season: In summer, the relative humidity may relatively higher than it in winter. The higher humidity will reduce the efficiency and effectiveness of the filtration system. As a result, to ensure the performance of the air remediation system, the threshold for $S_{IAQ}$ will be adjusted to a, $0.8 \leq a < 1$.
Space type of the system: Different spaces have different functionalities. The threshold of $S_{IAQ}$ will be adjusted according to these designated functionalities to avoid potential air pollution. For example, in a kitchen area, the most common activity often is cooking. Most of cooking operation will generate much more combustion related pollutant than the other activities that happens in the residential homes. Thus, to ensure the performance of the system, the threshold for $S_{IAQ}$ will be reduced from the value in the building standard by multiplying a factor, b. Some example values for b is listed below:

| Type of spaces | Value of b |
|---|---|
| Kitchen | 0.75-1 |
| Garage (when people occupied) | 0.8-1 |
| Printing/copying room | 0.8-1 |

Occupancy: Human beings are the dominant source of $CO_2$ and major source of PM in the indoor space. The $CO_2$ and PM level may increase rapidly when a space has been squeezed in many people. To address the potential pollution issue, the practical threshold for $S_{IAQ}$ will be reduced when the room is over-occupied.

Sensor Array Location: Sensor array location will influence the measurement of the level of pollutants. If a sensor array is installed in a place that always has a lower reading compared with the real concentration of the pollutant in the breathing zone, e.g., ceiling mount, the threshold of $S_{IAQ}$ can be reduced to ensure the performance of air remediation.

As discussed above, when one of the air quality parameters includes $CO_2$, the air handling unit 130 may remediate the air within the space 10 by fresh air exchange. For example, wherein when the measurement of $CO_2$ in the indoor space 10 is above a first threshold value (e.g., 800 ppm) for a first duration (e.g., two detection cycles), the central control circuit 200 may initiate fresh air exchange. However, some habitable environments might not have fresh air intake capability. In such scenarios, the central control circuit 200 may be configured to communicate with one or more windows 180, which are communicatively coupled to the central control circuit, to cause the one or more windows 180 in the indoor space 10 to open a predetermined amount to facilitate fresh air exchange by the air handling unit 130. Alternatively, or in addition, the central control circuit 200 may be configured to provide an alert to occupants, for example a sound alert or and alert to the occupant's or another person's handheld mobile device, to open one or more windows to facilitate fresh air exchange, or to take another action.

The indoor space 10 may further include one or more occupancy sensor arrays 160 communicatively coupled to the central control circuit 200 and configured to detect an occupancy in the indoor space 10 or zones therein. The one or more occupancy sensor arrays 160 may be positioned throughout the indoor space 10 and configured to send signals to the central control circuit 200 indicative of an occupancy in one or more areas of the indoor space 10. In some approaches, the central control circuit 200 may be configured to receive occupancy data from the occupancy sensor array(s) 160 and to adjust one or more threshold values and/or durations for various air parameters based on a detected occupancy in the indoor space 10. For example, the central control circuit may reduce the thresholds for $CO_2$ and/or particulate matter (PM) when indoor space 10 is over-occupied. In some approaches, the central control circuit may automatically reduce the threshold(s) of one or more air parameters when detected occupancy is above a set threshold and/or when occupancy increases at a faster rate than expected.

The central control circuit 200 may be further configured to initiate operation of the air handling unit 110 at a specific time of day or for a period prior to a predetermined time of day to reduce a measurement of the first air parameter below a threshold value that is lower than each of the first and second threshold values. In other words, the system may be configured to pre-remediate an indoor space or zones therein. For example, if indoor space 10 is a bedroom within a house, and the bedroom belongs to a child suffering from asthma, the central control circuit 200 may be configured to begin remediating the air within the child's bedroom to a lower threshold than in the rest of the house on hour before the child's expected bedtime.

The air remediation system 100 may further include one or more outdoor air sensor arrays communicatively coupled to the central control circuit, such as the outdoor air sensor arrays 150 described above with reference to FIG. 1. The outdoor air sensor(s) 150 are located in an outdoor area outside of the indoor space 10 and are configured to measure at least one air outdoor parameter in the outdoor area. The central control circuit 200 may receive from the outdoor sensor array 150 a first outdoor signal indicative of a measurement of a first outdoor air parameter in the outdoor area and determine if the measurement of the first outdoor air parameter is above a first outdoor threshold value for a first outdoor duration. The outdoor air sensor measurement may be used to determine if the air quality outside the indoor space is poorer than the air quality inside the indoor space (e.g., in polluted cities), in which case the system may determine that fresh air exchange should not be used for air remediation until certain conditions are met.

For example, in some embodiments, if the measurement of the first outdoor air parameter is above the first outdoor threshold value for the first outdoor duration (indicative of high external air pollution), and if the air within the space is not currently being remediated, the central control circuit may cause the air handling unit 110 to remediate the air within the indoor space 10 without using fresh air exchange until the sooner of (1) a measurement of the first outdoor air parameter is lower than a second outdoor threshold value for a second outdoor duration; or (2) a measurement of the first air parameter in the indoor space 10 is lower than the second threshold value for the second duration. In this example, the system remediates air in the indoor space without using fresh air exchange until levels of one or more outdoor air pollutants fall below a set threshold.

In some embodiments, if the measurement of the first outdoor air parameter is above the first outdoor threshold value for the first outdoor duration, and if the air within the space is not currently being remediated, the central control circuit may delay air remediation in the indoor space by the air handling unit 130 until a measurement of the first outdoor air parameter is lower than the second threshold value for the second outdoor duration. In this example, the system delays air remediation in the indoor space until levels of one or more outdoor air pollutants fall below a set threshold. Such a scenario may occur in an apartment or condo where fresh air exchange is the only air remediation technique available for reducing certain air pollutants in the indoor space.

In some embodiments, if the measurement of the first outdoor air parameter is above the first outdoor threshold value for the first outdoor duration, and if the air within the space is currently being remediated, the central control circuit may cause the air handling unit 130 to cease air remediation in the indoor space 10 until the measurement of the first outdoor air parameter is lower than a second outdoor threshold value for the second outdoor duration. Indoor space 10 may also include one or more networked or remote user input/display devices 170, described above with reference to FIG. 1, which may allow a user or occupant to view and/or control functions of the air remediation system governing indoor space 10.

As discussed above, the air remediation system 100 may be configured to provide various alerts or notifications based on certain conditions. For example, in some approaches, the system may provide an alert or notification when a determination is made that the measurement of the first air parameter is above the first threshold value for the first duration, a determination is made that the measurement of the first air parameter is lower than the second threshold value for the second duration, air remediation in the indoor space is initiated due to the first parameter being above the first threshold for the first duration and the air within the space is not currently being remediated, air remediation in the indoor space has ceased, and/or a change to at least one of the first air parameter, the first threshold value, the first duration, the second threshold value, the second duration is made, requested, or approved. In some approaches, the system may provide an alert or notification when, for example, a determination is made that the measurement of the first air parameter is above the first threshold value for the first duration and the system determines that the room currently is occupied and/or a determination is made that the measurement of the first air parameter is above the first threshold value for the first duration and the system determines that the room currently is not occupied.

In another approach, the system may provide an alert or notification when at least one error in or damage to the sensor array or the air handling system is detected, when the sensor array is out of calibration, when the sensor or air handling unit have exceeded their expected lifespan, the sensor is no longer positioned at the best place within a zone or room, when maintenance to the air handling system is scheduled or overdue, or when relocation of the sensor is scheduled or overdue.

In yet another approach, the system may provide an alert or notification when activation of air remediation in the indoor space due to a measurement of the first parameter exceeds a designated number of times during a designated time period. For example, the system may provide an alert or notification if air remediation is triggered in the space more than twice in an hour, more than ten times during a twenty-four hour period, etc., due to the measurement of the first air parameter in the space exceeding the first threshold value for the first duration.

Any suitable alert or notification technology may be used. For example, alerts or notifications may include, but are not limited to, text or SMS messages, MMS messages, email messages, radio signals, automated voice messages, sound notifications, or any other audio or visual alert or signal, which may be sent to (or emitted by) one or more components, electronic devices, or displays associated with the indoor space, the occupant(s), or selected persons associated with the space. In some approaches, the alert or notification may be sent to one or more persons associated with the indoor space (e.g., someone who lives in an apartment or house but who is not there at the apartment or house), someone who is responsible for the space (e.g., a landlord, a maintenance person, an owner), a current occupant of the space who is not in the specific space, a database that stores information relevant to the operation of the space, an automation control device or application, or a parent or caregiver (e.g., if a child or other family member is in the space).

In some approaches, air remediation may not necessarily begin automatically when the first air parameter is determined to be above the first threshold value for the first duration. Instead, in some approaches, the system may send an alert, notification, or other signal to a device or a person who must approve initiation of the remediation by, for example, sending a designated approval message back to the system, selecting a designated button or icon on a device communicatively coupled to the system, etc. In some approaches, if an approval signal is not received by the system within a certain period of time (e.g., 60 seconds, 10 minutes, one hour), air remediation may begin automatically. In other approaches, remediation in a particular area or zone of the indoor space may not begin unless or until the central control circuit 200 determines that no remediation is occurring in any other areas or zones of the indoor space.

For an indoor space that has more than one conditioned zone, the flexibility of remediation is further enhanced by employing multiple air handling units in the indoor space, as illustrated in FIG. 4. In a multi-zone multi-AHU scenario, as described below, some rooms or other zones may be bundled together as a single area or zone for remediation, which can address the problem of crossover of air pollutants from one zone to another due to pressure. The air handling unit associated with each area or zone will generally, but not necessarily, be triggered by the worst detection reading in the room or space associated with that area or zone. Spatially close rooms may be bundled together as one area for remediation, and if any room in this bundled area has confirmed contamination, all the rooms or other zones near the contaminated room may be cleaned as well. In this scenario, setting points regarding thermal comfort may be achieved with indoor air quality remediation simultaneously, and particulate matter and $CO_2$ can be reduced in default mode for most of the time, even without a heating/cooling load.

In some embodiments a zone may include one or more rooms or other spaces that are largely or completely walled off or otherwise separated from each other, or which may be otherwise isolatable from each other by doors, windows, partitions, walls, etc., that can be opened, closed, moved, etc. For example, one zone may encompass multiple bedrooms in a house, while another zone may encompass the kitchen and dining room. In other embodiments, a zone may include one or more rooms or other spaces that are not completely walled off or otherwise separated from each other, as is common in homes, offices, and other indoor environments using open plan design. In some embodiments, a zone may include one or more rooms bundled together based on the type of room (e.g., bedrooms), the expected use(s) of the room (e.g., cooking), the expected occupancy of the room, thermal aspects, air handling system configuration, sizes of the room, materials used in the room, furniture used in the room, etc. In some embodiments, a single room may comprise more than one zone. For example, a large open space that includes a kitchen area, a dining room area and a living room area may be considered a single room having multiple distinct zones.

In scenarios involving multiple zones (as described in more detail below), each zone may include a plurality of indoor air quality sensor arrays located in each zone (in some cases in each room of the zone). The sensor arrays in each zone may be configured to detect one or more air quality parameters in their respective zone. The sensor arrays in the multiple zones and/or rooms within the multiple zones may be configured to detect the same or different parameters and may have the same or different detection intervals, durations, and/or threshold values, and may be located at the same or different heights relative to the floor.

In one example, a first zone in a house may comprise bedrooms, a second zone may comprise a kitchen, and a third zone may comprise a home office. Sensor arrays located in the bedrooms may be located at a sleeping height and may be configured to measure particulate matter, sensor arrays in the kitchen may be located at a standing height of an adult and may be configured to measure particulate matter and CO, and sensor arrays in the home office may be located at a seated height of an adult and may be configured to measure particulate matter and VOCs. The detection intervals, durations, and/or threshold values for particulate matter in the bedrooms may be the same or different than in the kitchen and home office, while the detection intervals and durations for CO and VOCs in the kitchen and home office, respectively, may be the same of different than those for particulate matter in those areas.

In another example, in a bedroom used by a person who suffers from asthma or other allergies the threshold value for particulate matter may be lower and the duration and the detection interval may be shorter compared to a bedroom used by a person who does not suffer from asthma or other allergies. In rooms that are less frequently used, such as a formal dining room, threshold values may be higher, and durations and detection intervals may be longer compared to more frequently used rooms, such as a family room.

FIG. 4 illustrates an air remediation system utilized in an indoor space 10 that is divided into multiple zones bundled into remediation areas. Zones 1 and 2 are bundled together as bundled area A and are served by air handling unit 130A. Zones 1 and 2 may comprise, for example, bedrooms in a house or apartment. Zones 3 and 4 are bundled together as bundled area B and are served by air handling unit 130B. Zones 3 and 4 may comprise, for example, a living room and kitchen in a house or apartment. Air handling units 130A and 130B may comprise air handling unit 130 described above with reference to FIGS. 1 to 3.

Each of zones 1, 2, 3, and 4 may include an indoor air quality sensor arrays 110a, 110b, 110c, and 110d, respectively, configured to sense, detect, or otherwise measure air pollutants such as, for example, carbon dioxide ($CO_2$), carbon monoxide (CO), particulate matter (e.g., $PM_{2.5}$, $PM_{10}$), volatile organic compounds (VOCs), radon, nitrogen dioxide, ozone, and noxygen (NOx) in zones 1, 2, 3, and 4, respectively. Air sensor arrays 110a, 110b, 110c, and 110d may comprise air sensor array 110 described above with reference to FIGS. 1 to 3. Although FIG. 4 shows only one sensor array 110 in each of the four zones, each of the zones may include a plurality of indoor air quality sensor arrays.

In the scenario illustrated in FIG. 4, air handling unit 130A will generally be triggered by the worst indoor air quality reading from sensor arrays 110a and 110b in bundled area A (zones 1 and 2), while air handling unit 110B will generally be triggered by the worst indoor air quality reading from sensor arrays 110c and 110c in bundled area B (zones 3 and 4). One or more of the threshold values, durations, and detection intervals for bundled area A may be the same as or different from the threshold values, durations, and detection intervals for bundled area B. One or more of the threshold values, durations, and detection intervals for zone 1 in bundled area A may be the same as or different from the threshold values, durations, and detection intervals for zone 2 in bundled area A or the zones 3 and 4 in bundled area B. Similarly, one or more of the threshold values, durations, and detection intervals for zone 3 in bundled area B may be the same as or different from the threshold values, durations, and detection intervals for zone 4 in bundled area B or the zones 1 and 2 in bundled area A.

For example, the central control circuit communicatively coupled to sensor arrays 110a, 110b, 110c, and 110d and air handling units 130A and 130B receive a signal from sensor arrays 110a and 110b indicative measurements of an air parameter in zones 1 and 2, respectively, and determines if at least one of those measurements is above a first threshold value for a first duration for that given air parameter. Threshold values and durations may correspond to the threshold values and durations described above with reference to FIG. 3. If the measurement of the air parameter in zone 1 is above the first threshold value for the first duration for that given air parameter, the central control circuit determines if air within bundled area A is currently being remediated. If the air within bundled area A is not currently being remediated, the central control circuit 200 sends a signal to air handling unit 130A, directly or indirectly, to cause air handling unit 130A to remediate the air within the positive zone (e.g., zone 1) and its adjacent zone (zone 2) in bundled area A until a measurement of the air parameter is lower than a second value for a second duration in the positive zone (zone 1) and the adjacent zone (zone 2) in bundled area A.

An example of the above scenario may occur in a home comprising two bedrooms (zone 1) adjacent to a home office and a den (zone 2), these four rooms forming bundled area A, with each room having at least one air quality sensor. If a sensor in one of the bedrooms of zone 1 detects an air quality parameter above a set threshold for longer than a set duration, the system initiates air remediation in the two bedrooms (zone 1) and the adjacent home office and den (zone 2) forming bundled are A until the level of the air parameter falls below a set threshold for a set duration in both zones of bundled area A (the threshold and duration may be the same or different than the threshold and duration used to initiate air remediation).

The central control circuit 200 also may be further configured to receive from sensor arrays 110c and 110d signals indicative of measurements of one or more air parameters in bundled area B. The central circuit may determine that an air parameter in zone 3 is above a first threshold value for a first duration for that given air parameter. If the measurement of the air parameter is above the first threshold value for the first duration for that given air parameter, the central control circuit determines if air within bundled area B is currently being remediated. If the air bundled area B is not currently being remediated, the central control circuit sends a signal, directly or indirectly, to air handling unit 130B to cause air handling unit 130B to remediate the air within the positive zone (e.g., zone 3) and its adjacent zone (zone 4) in bundled area B until a measurement of the air parameter is lower than a second value for a second duration in the positive zone (zone 3) and the adjacent zone (zone 4) in bundled area B.

Continuing with the home example discussed above, the home may further comprise a kitchen and a dining room (zone 3) adjacent to a living room and a play room (zone 4), the four rooms forming bundled area B, with each room having at least one air quality sensor. If a sensor in the kitchen of zone 3 detects an air quality parameter above a set threshold for longer than a set duration, the system initiates air remediation in the kitchen and dining room (zone 3) and the adjacent family room and play room (zone 4) forming bundled are B until the level of the air parameter falls below a set threshold for a set duration in both zones of bundled area B (the threshold and duration may be the same or different than the threshold and duration used to initiate air remediation).

As discussed above, air remediation by the air handling units 130A and 130B might not begin with an instant concentration peak. Generally, only a high level of the detected air parameter which lasts more than at least one detection interval (for example, at least two detection intervals) may trigger remediation (a delay loop may be included to execute this feature before sending a command to the air handling unit). Additionally, the remediation status might not cease instantly when the concentration drops below the second threshold. In some approaches, the same delay loop mentioned above may be applied when the concentration drops below the second threshold.

In some embodiments, sensor arrays 110a, 110b, 110c, and 110d may be configured to measure at least two different air parameters at defined detection intervals in their respective zones. For example, the sensor arrays may be configured to measure both $PM_{2.5}$ and $CO_2$. In this approach, the central control circuit 200 may determine if the measurement of one or both of the first and second air parameters are above set threshold values for a set duration for each air parameter, and if one or both measurements are above the set threshold value(s) for the set duration(s), the central control circuit 200 may cause the air handling unit associated with the bundled area to remediate the air within the bundled area until a measurement of the first and second air parameters are lower than a set threshold value for a set duration for each air parameter. In other embodiments, the central control circuit 200 may calculate a combined measurement (e.g., an air quality score) of two air parameters in the bundled area and determine that the combined measurement of the first and second air parameters in the bundled area is above a first combined threshold value for the first duration. The central control circuit 200 may then cause the air handling unit associated with that bundled area to remediate the air within the bundled area until a combined measurement of the first and second air parameters is lower than a second combined threshold value for the second duration in the bundled area. The combined measurement, which may also be referred to as an air quality score, may be represented by $S(i)$ to indicate the contamination level, and may be calculated as described above.

In some embodiments, the sensor arrays associated with one zone or bundled area of zones may measure one or more different air parameters than the sensor arrays associated with another zone or bundled area of zones. For example, one or more sensor arrays located in a bedroom might measure CO level, $CO_2$ level, $PM_{2.5}$ particles, $PM_{10}$ particles and the presence of one or more VOCs, while one or more sensor arrays in a kitchen might measure only the presence of smoke and $PM_{2.5}$ and $PM_{10}$ particles. The bedroom and the kitchen may be in the same or different zones or the same or different bundled areas.

When one of the air quality parameters includes $CO_2$, the air handling unit associated with a bundled area may remediate the air within the bundled area by fresh air exchange. For example, with reference to FIG. 4, when the measurement of $CO_2$ in zones 1 or 2 of bundled area A is above the first threshold value (e.g., 800 ppm) for the first duration (e.g., two detection cycles), the central control circuit 200 may cause one or more windows or vents 180 in bundled area A to open a predetermined amount to facilitate fresh air exchange by air handling unit 130A. Similarly, when the measurement of $CO_2$ in zones 3 or 4 of area B is above the first threshold value (e.g., 800 ppm) for the first duration (e.g., two detection cycles), the central control circuit 200 may cause one or more windows or vents 180 in bundled area B to open a predetermined amount to facilitate fresh air exchange by air handling unit 130B. Alternatively, or in addition, the central control circuit 200 may be configured to provide an alert to occupants, for example a sound alert or and alert to the occupant's handheld mobile device or to another person's mobile device, to open one or more windows to facilitate fresh air exchange.

The indoor space may further include one or more occupancy sensor arrays 160 in one or more zones of the bundled areas. For example, with reference to FIG. 4, zones 1 and 2 in bundled area A and at zones 3 and 4 in bundled area B may include one or more occupancy sensor arrays 160 communicatively coupled to a central control circuit and configured to detect an occupancy in the zones in which the occupancy sensor arrays are located. The central control circuit may be configured to receive occupancy data from the occupancy sensor(s) 160 and to adjust one or more of the first and second threshold values and the first and second durations based on a detected occupancy in one or more zones and/or bundled areas. For example, the central control circuit may reduce the thresholds for $CO_2$ and/or particulate matter (PM) in bundled area A if zones 1 and/or 2 are over-occupied or are more frequently occupied. In some approaches, the central control circuit may automatically reduce the threshold(s) of one or more air parameters in on or more zones and/or bundled areas when detected occupancy is above a set threshold and/or when occupancy increases at a faster rate than expected for that zone and/or bundled area.

The central control circuit may be further configured to initiate operation of one or more air handling units associated with a bundled area at a specific time of day or for a period prior to a predetermined time of day to reduce a measurement of the first air parameter in a zone of the bundled area below a threshold value that is lower than each of the first and second threshold values. For example, in a bedroom belonging to a child suffering from asthma (e.g., zone 1 in FIG. 4), the central control circuit may be configured to begin remediating the air within the child's bedroom and one or more rooms adjacent to the child's bedroom (e.g., zone 2 in FIG. 4.) to a lower threshold than in the rest of the house one hour before the child's expected bedtime.

One or more outdoor air sensor arrays 150 may also be associated with at least one of the bundled areas or zones in the indoor area 10 and may be communicatively coupled to the central control circuit. As shown in FIG. 4, each of bundled area A and B may include an associated occupancy sensor array 150 located in an outdoor area outside of the indoor space 10 and configured to measure at least one air outdoor parameter in the outdoor area adjacent to bundled areas A and B. The outdoor air sensor arrays may comprise outdoor air sensors described above with reference to FIG. 1. The central control circuit may receive from, for example, outdoor sensor array 150 associated with bundled area A, a first outdoor signal indicative of a measurement of a first outdoor air parameter in the outdoor area and determine if the measurement of the first outdoor air parameter is above a first outdoor threshold value for a first outdoor duration.

In some embodiments, if the measurement of the first outdoor air parameter is above the first outdoor threshold value for the first outdoor duration, and if the air within bundled area A is not currently being remediated, the central control circuit may cause air handling unit 130A to remediate the air within the bundled area A without using fresh air exchange until the sooner of (1) a measurement of the first outdoor air parameter is lower than a second outdoor threshold value for a second outdoor duration; or (2) a measurement of the first air parameter in one or both bundled areas A and B or zones therein is lower than the second threshold value for the second duration.

In some embodiments, if the measurement of the first outdoor air parameter is above the first outdoor threshold value for the first outdoor duration, and if the air within bundled area A is not currently being remediated, the central control circuit may delay air remediation in bundled area A until a measurement of the first outdoor air parameter is lower than the second threshold value for the second outdoor duration. In this example, the system remediates air in bundled area A without using fresh air exchange until levels of one or more outdoor air pollutants fall below a set threshold.

In some embodiments, if the measurement of the first outdoor air parameter is above the first outdoor threshold value for the first outdoor duration, and if the air within bundled area A is currently being remediated, the central control circuit may cause air handling unit 130A to cease air remediation until the measurement of the first outdoor air parameter is lower than the second outdoor threshold value for the second outdoor duration. In this example, the system delays air remediation in bundled area A until levels of one or more outdoor air pollutants fall below a set threshold.

Each bundled area may also include one or more networked or remote user input/display devices 170, described above with reference to FIG. 1, which may allow a user or occupant to view and/or control functions of the air remediation system governing one or both bundled areas.

FIG. 5 illustrates a multi-zone scenario with one air handling unit 130 and a plurality of dampers 180a and 180b. In this scenario, zoning is achieved by controlling the flow rate introduced to each of zones 1 and 2 zone through PID damper systems. For example, the flow rate may be set or controlled to be within 200-800 cubic feet per minute (CFM), but in some settings the CFM may depend on the room size, room type, or other factors. Thus, in some settings the CFM may be set to be 100, 200, 300, 400, 500, 600, 700, 800, 900, 1000 or other level, or to be within a range of levels.

During remediation, the central control circuit sends commands to the air handling unit requiring a higher flow rate to clean the polluted room, while the dampers in the other rooms are closed so the flow rate will not be weakened. In this scenario, particulate matter and $CO_2$ can be reduced with default mode for most of the time, even without heating/cooling load.

A control circuit communicatively coupled to sensor arrays 110a and 110b and air handling unit 130 receives from a first sensor array (e.g., sensor array 110a in zone 1) a first signal indicative of a measurement of a first air parameter in the first zone. The central control circuit then determines if the measurement of the first air parameter in the first zone is above a first threshold value for a first duration, as described above with reference to FIG. 4. If the measurement of the first air parameter is above the first threshold value for the first duration, the control circuit determines if air within the first zone (zone 1) is currently being remediated. If the air within the first zone is not currently being remediated, the central control circuit causes the air handling unit to remediate the air within the first zone by determining the relative configurations of the dampers communicatively coupled to the central control circuit and reconfiguring positions of the first damper (damper 180a) and the second damper (damper 180b) to allow airflow into the first zone (zone 1) and to restrict airflow into the second zone (zone 2). For example, central control circuit may (re)configure the dampers so that the damper in the polluted zone (e.g., damper 180a in zone 1) may be open a sufficient amount and the other dampers (e.g., damper 180b in zone 2) closed a sufficient amount to achieve at least a 20% fresh air exchange. In some embodiments, the central control circuit may (re)configure the dampers so that the damper in the polluted zone (e.g., damper 180a in zone 1) may be fully open, while the other dampers (e.g., damper 180b in zone 2) may be fully or partially closed.

In this scenario, indoor air quality remediation may result in an increase of the total enthalpy introduced to the target zone, which may result in a transient deviation from thermal comfort status. However, the thermal comfort level can recover quickly after remediation, and the heating/cooling coil temperature should compensate the heating/cooling load.

The multi-zone scenario with one air handling unit illustrated in FIG. 5 may also include one or more occupancy sensor arrays (160a, 160b), outdoor air sensor arrays (150), user display/output devices (170) and windows (180b, 180c) described above with reference to FIGS. 1 to 4.

It should be understood that the multi-zone scenario with one air handling unit described above with reference to FIG. 5 may be incorporated into a habitable environment having a plurality of bundled areas. For example, the scenario described above with reference to FIG. 5 can be incorporated into the scenario described above with reference to FIG. 4, where each bundled area in FIG. 4 may be considered a separate multi-zone indoor space serviced by one air handling unit.

Figure 6:
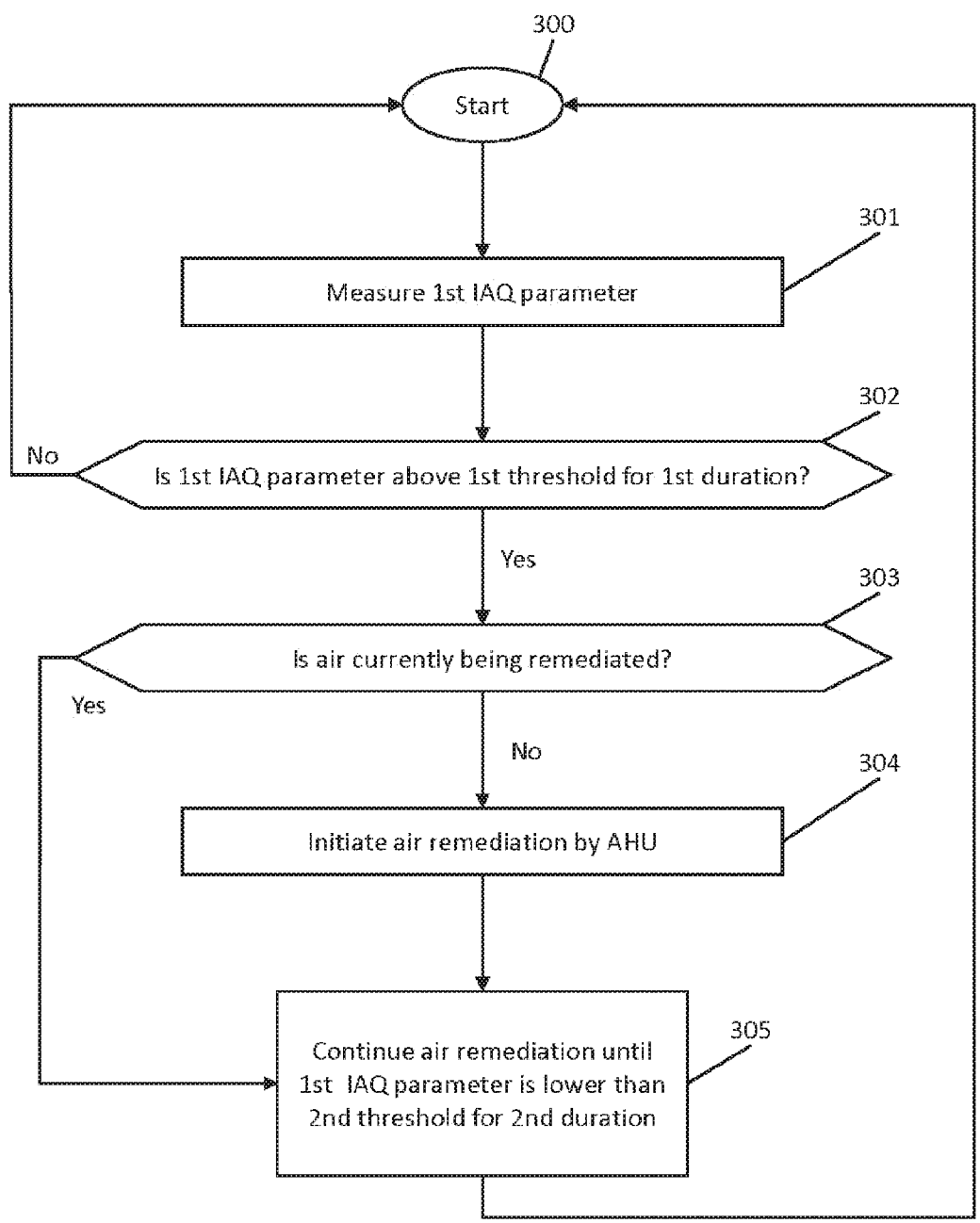
FIG. 6 is a flow diagram of a method for improving air quality in an indoor space in accordance with some embodiments.

FIG. 6 illustrates a method for improving air quality in an indoor space in accordance with some embodiments, which may be executed by air remediation system 100 described above with reference to FIGS. 1 to 5. The method begins at start step 300. In step 301, one or more indoor air quality (IAQ) parameters are measured by a sensor array having one or more sensors located in an indoor space. In step 302, the system determines if a first air parameter is above a first threshold for a first duration. If the first air parameter is not above a first threshold for a first duration, the system may then proceed back to start step 300.

If the first air parameter is above the first threshold for the first duration, in step 303 the system determines if the air within the indoor space is currently being remediated. If the air is not currently being remediated, in step 304 the system initiates air remediation by an air handling unit (AHU) and in step 305 the system continues air remediation until the first air parameter is lower than a second threshold for a second duration. If at step 303 the system determines that the air within the space is currently being remediated, the system proceeds to step 305 and continues to remediate the air within the space until the first air parameter is lower than a second threshold for a second duration. Once the first air parameter is lower than the second threshold for the second duration at step 305, the system may then proceed back to start step 300.

Figure 7:
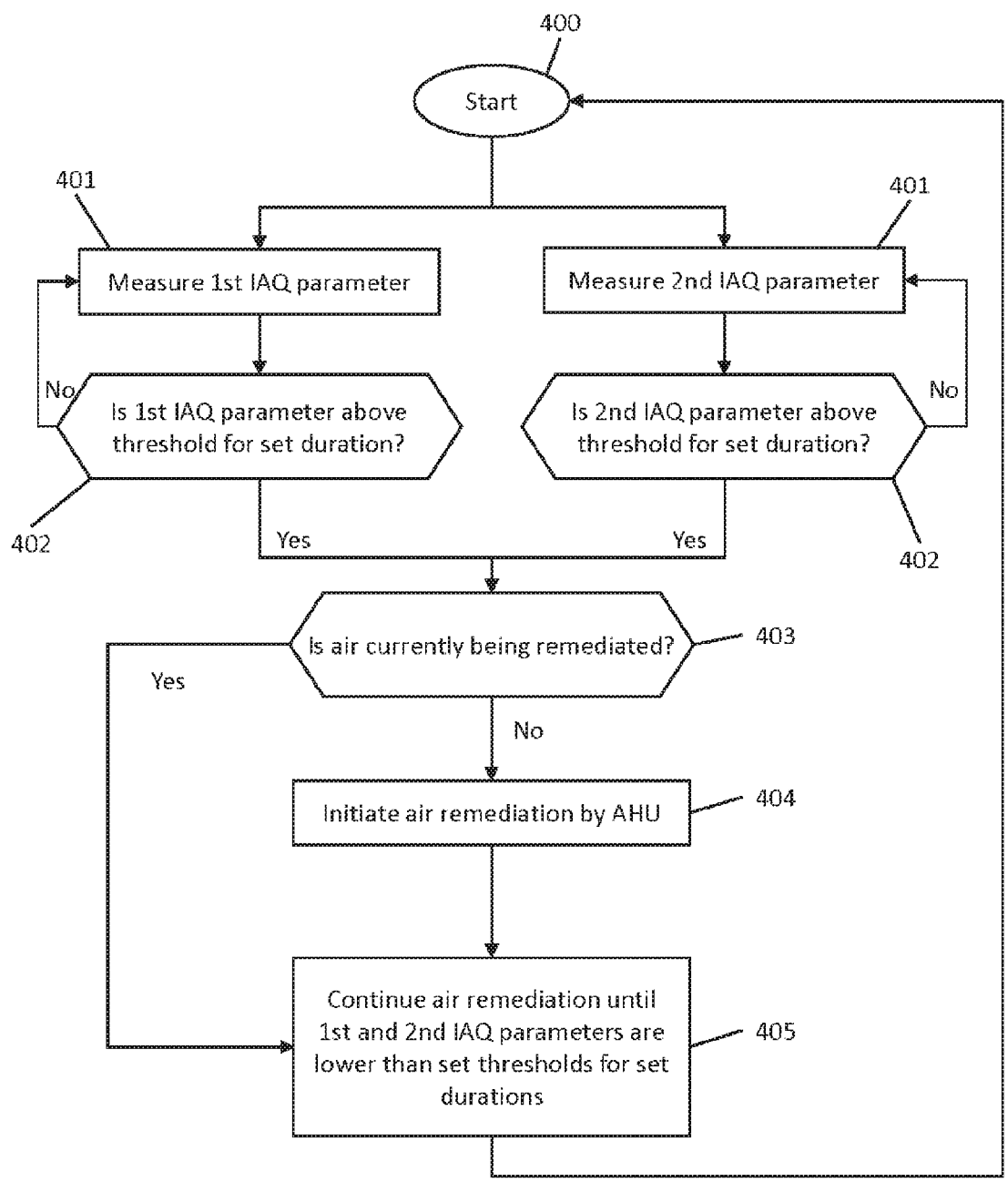
FIG. 7 is a flow diagram of a method for improving air quality in an indoor space in accordance with some embodiments.

FIG. 7 illustrates a method for improving air quality in an indoor space in accordance with some embodiments, which may be executed by air remediation system 100 described above with reference to FIGS. 1 to 5. The method begins at start step 400. In step 401, first and second indoor air quality (IAQ) parameters are measured by a sensor array located in an indoor space. In step 402 the system determines if the first and second measured air parameters are above set thresholds for set durations for that given air parameter. If at least one of the first and second air parameters is above a set threshold for a set duration, in step 403 the system determines if the air is currently being remediated in the indoor space. If the air is not currently being remediated, in step 404 the system initiates air remediation by an air handling unit (AHU) and in step 405 the system continues air remediation until both the first and second air parameters are lower than set thresholds for set durations. If at step 403 the system determines that the air within the space is currently being remediated, the system proceeds to step 405 and continues air remediation until both the first and second air parameters are lower than set thresholds for set durations. Once the first and second air parameters are lower than the set thresholds for the set durations at step 405, the system may then proceed back to start step 400.

Figure 8:
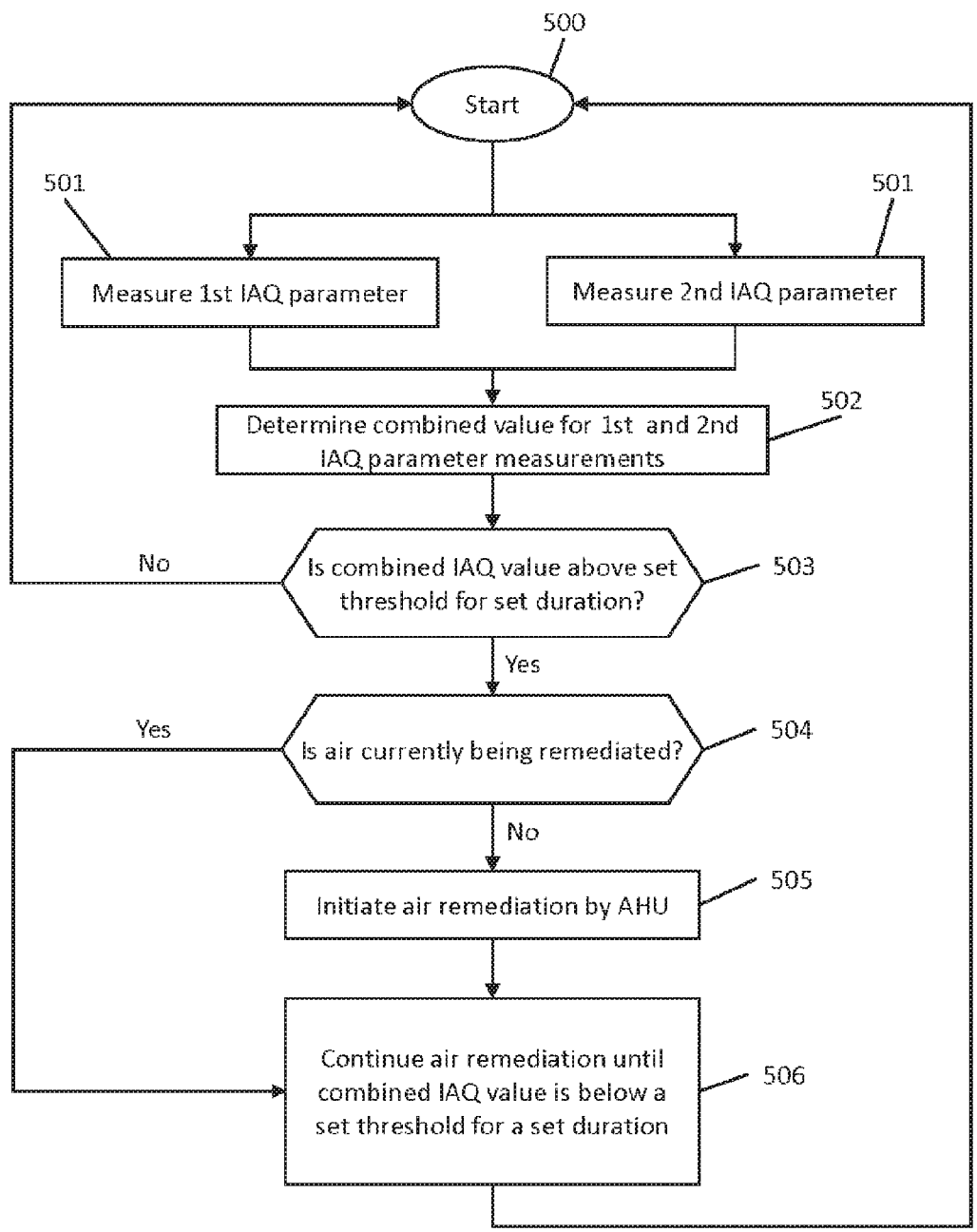
FIG. 8 is a flow diagram of a method for improving air quality in an indoor space in accordance with some embodiments.

FIG. 8 illustrates a method for improving air quality in an indoor space in accordance with some embodiments, which may be executed by air remediation system 100 described above with reference to FIGS. 1 to 5. The method begins at start step 500. In step 501, first and second indoor air quality (IAQ) parameters are measured by a sensor array located in an indoor space. In step 502 the system determines a combined value for the first and second air parameters. In step 503, the system determines if a combined value for the first and second air parameters is above a set threshold for a set duration. If the combined value for the first and second measured air parameters is not above a set threshold for a set duration, the system may then proceed back to start step 500.

If the combined value for the first and second measured air parameters is above a set threshold for a set duration, in step 504 the system determines if the air is currently being remediated in the indoor space. If the air is not currently being remediated, in step 505 the system initiates air remediation by an air handling unit (AHU) and in step 506 the system continues air remediation until the combined value for the first and second measured air parameter is lower than a set threshold for a set duration. If at step 504 the system determines that the air within the space is currently being remediated, the system proceeds to step 506 and continues air remediation until the combined value for the first and second measured air parameter is lower than a set threshold for a set duration. Once the combined value for the first and second measured air parameter is lower than the set threshold for the set duration step 506, the system may then proceed back to start step 500.

Figure 9:
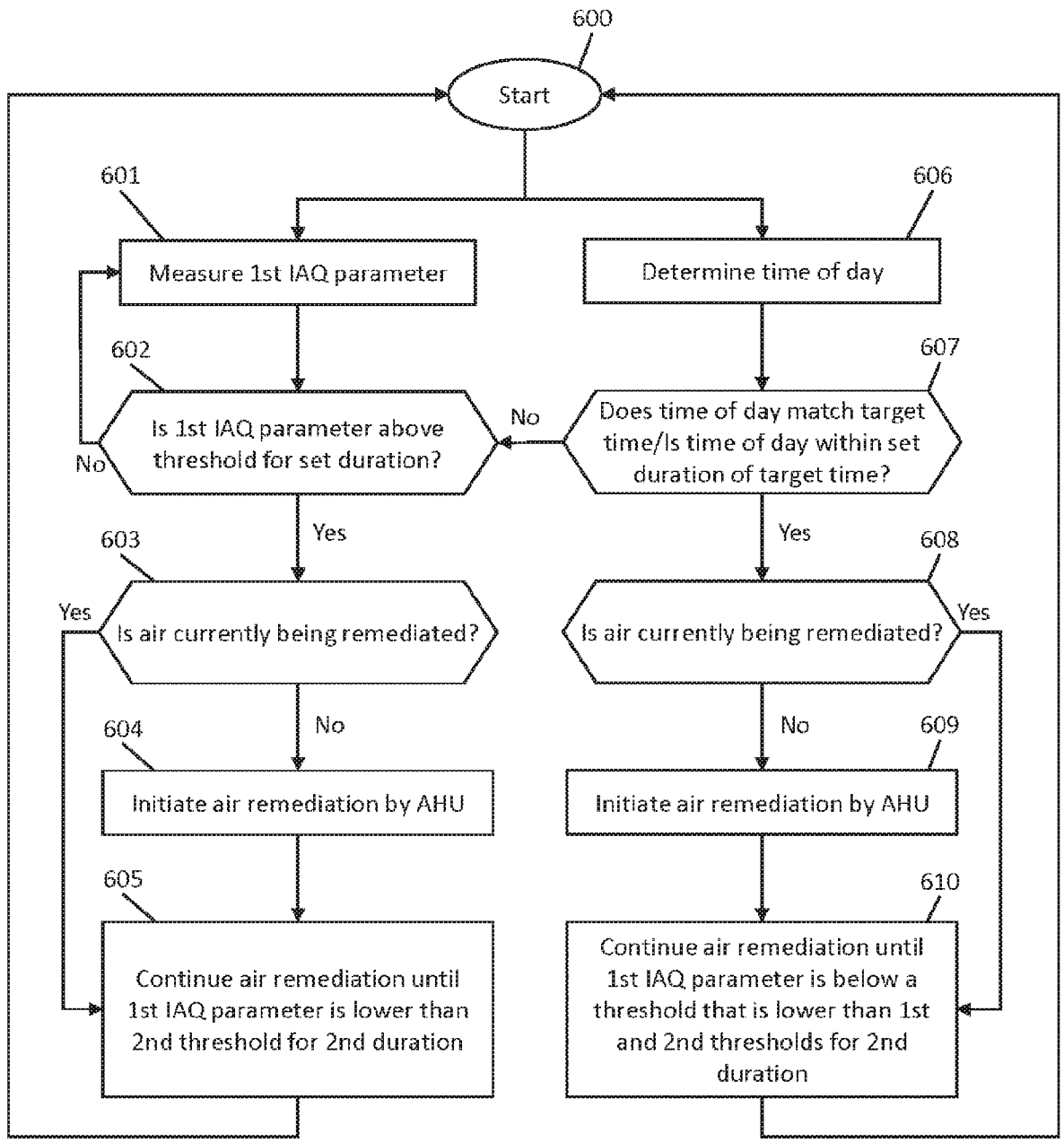
FIG. 9 is a flow diagram of a method for improving air quality in an indoor space in accordance with some embodiments.

FIG. 9 illustrates a method for improving air quality in an indoor space in accordance with some embodiments, which may be executed by air remediation system 100 described above with reference to FIGS. 1 to 5. The method begins at start step 600. In step 601, one or more indoor air quality (IAQ) parameters are measured by a sensor array located in an indoor space. In step 602, the system determines if a first air parameter is above a first threshold for a first duration. If a first air parameter is above a first threshold for a first duration, in step 603 the system determines if the air within the indoor space is currently being remediated. If the air is not currently being remediated, in step 604 the system initiates air remediation by an air handling unit (AHU) and in step 605 the system continues air remediation until the first air parameter is lower than a second threshold for a second duration. If at step 603 the system determines that the air within the space is currently being remediated, the system proceeds to step 605 and continues to remediate the air within the space until the first air parameter is lower than a second threshold for a second duration. Once the first air parameter is lower than the second threshold for the second duration at step 605, the system may then proceed back to start step 600.

At step 606, which may or may not occur concurrently with step 601, the system determines the current time of day. In step 607, the system determines whether the current time of day matches a target time of day and/or is within a set duration of a target time of day. If not, the system may proceed to step 602. If so, in step 608 the system determines if the air within the indoor space is currently being remediated. If the air is not currently being remediated, in step 609 the system initiates air remediation by an air handling unit (AHU) and in step 610 the system continues air remediation until the first air parameter is below a threshold that is lower than the first and second thresholds for a second threshold. Once the first air parameter is lower than the second threshold for the second duration at step 605, the system may then proceed back to start step 600.

Figure 10:
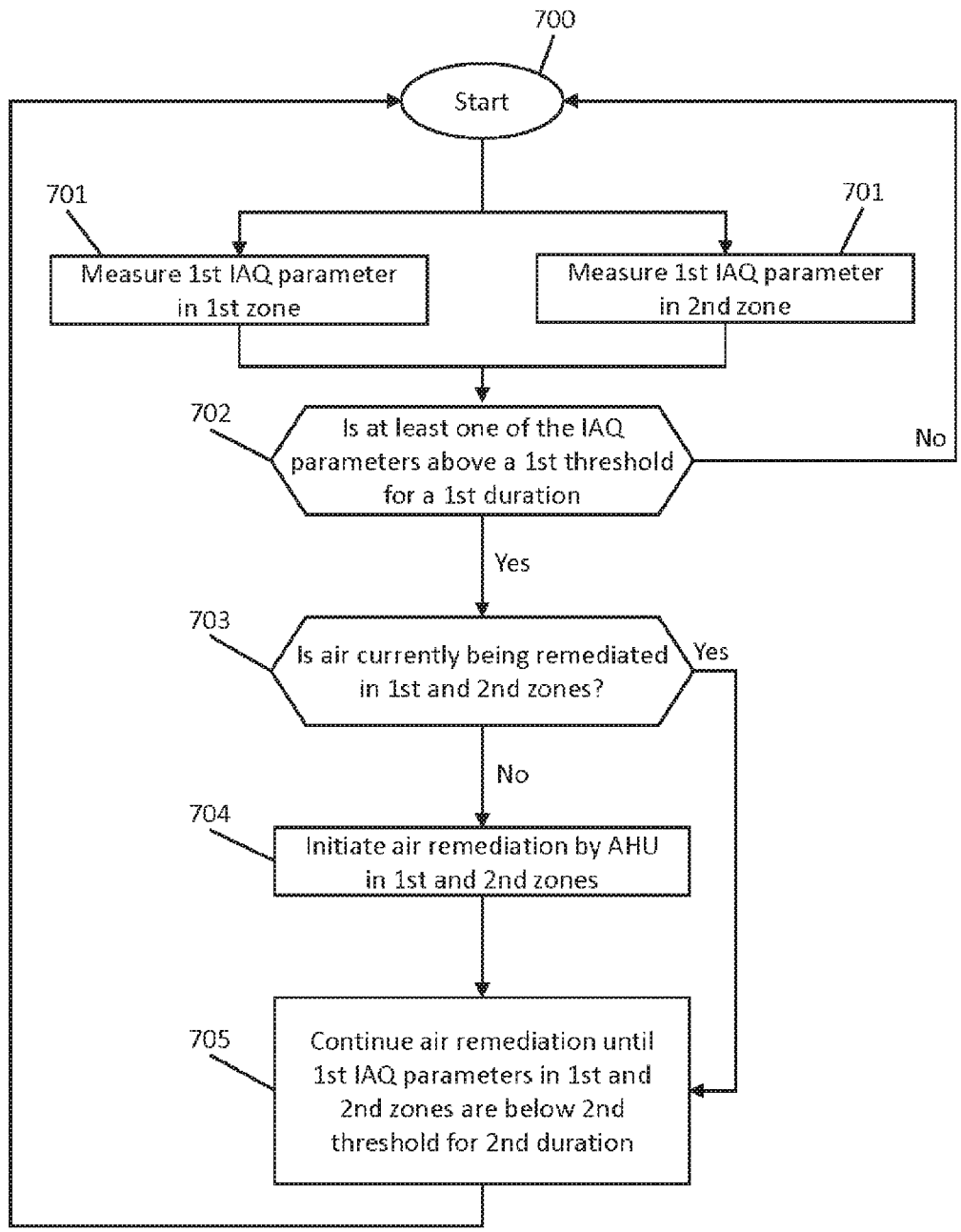
FIG. 10 is a flow diagram of a method for improving air quality in an indoor space in accordance with some embodiments.

FIG. 10 illustrates a method for improving air quality in an indoor space in accordance with some embodiments, which may be executed by air remediation system 100 described above with reference to FIGS. 1 to 5. The method described with reference to FIG. 10 may be especially useful in multi-zone scenarios, such as those described above with reference to FIGS. 4 and 5. The method begins at start step 700. In step 701, a first indoor air quality (IAQ) parameter is measured by a sensor array located in a first zone in an indoor space and a first indoor air quality (IAQ) parameter is measured by a sensor array located in a second zone in an indoor space, the first and second zones being adjacent. In step 702 the system determines if at least one of the first air parameters from the first or second zones is above a first threshold for a first duration. If at least one of the first air parameters from the first or second zones is not above a first threshold for a first duration, the system may then proceed back to start step 700.

If at least one of the first air parameters from the first or second zones is above a first threshold for a first duration, in step 703 the system determines if the air is currently being remediated in the first and second zones. If the air is not currently being remediated in the first and second zones, in step 804 the system initiates air remediation by an air handling unit (AHU) in the first and second zones and in step 705 the system continues air remediation in the first and second zones until the first air parameter in both the first and second zones are lower than a second threshold for a second duration. If at step 703 the system determines that the air within the space is currently being remediated, the system proceeds to step 705 and continues air remediation in the first and second zones until the first air parameter in both the first and second zones are lower than a second threshold for a second duration. Once the first air parameter in both the first and second zones are lower than the second threshold for the second duration at step 705, the system may then proceed back to start step 700.

Figure 11:
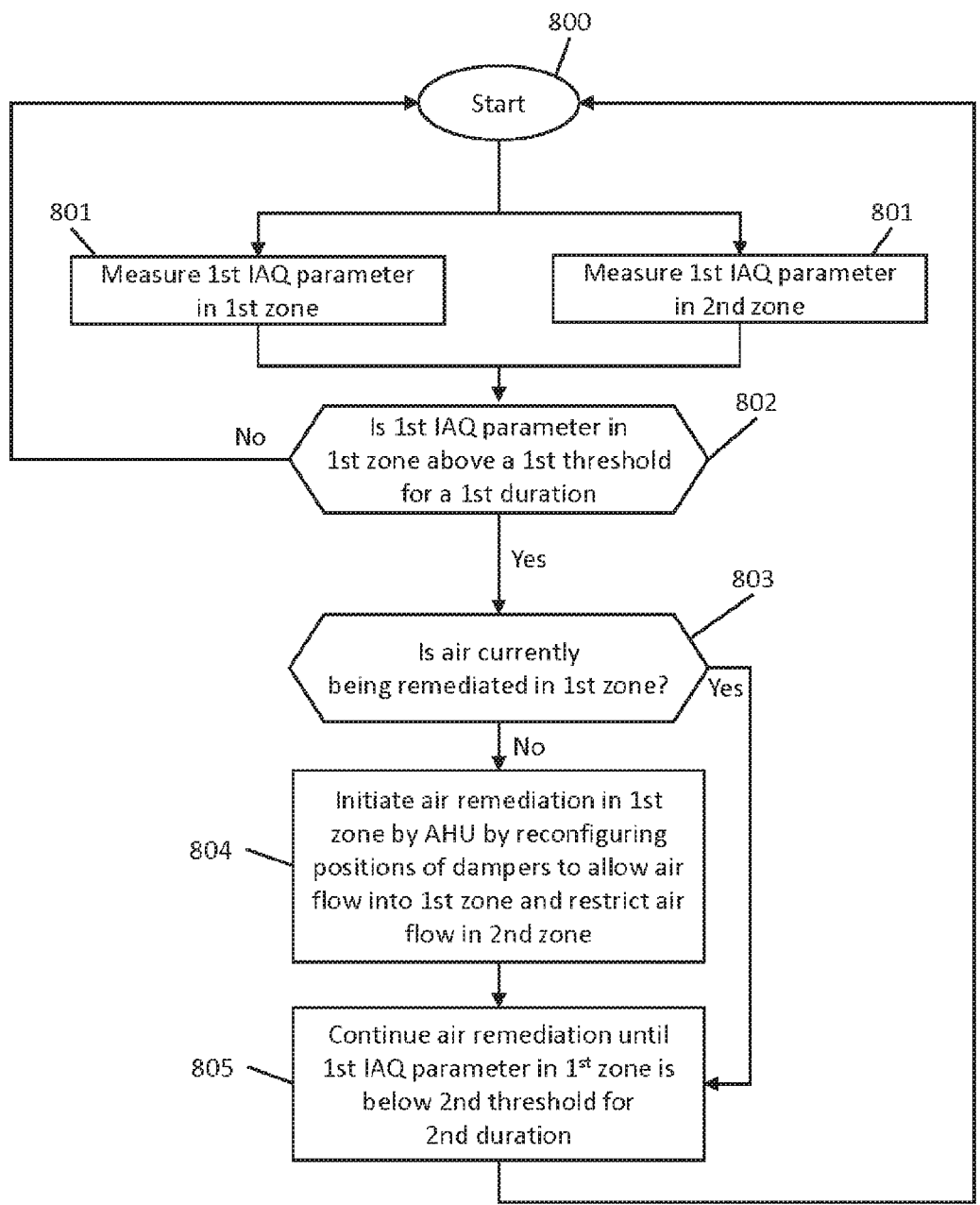
FIG. 11 is a flow diagram of a method for improving air quality in an indoor space in accordance with some embodiments.

FIG. 11 illustrates a method for improving air quality in an indoor space in accordance with some embodiments, which may be executed by air remediation system 100 described above with reference to FIGS. 1 to 5. The method described with reference to FIG. 11 may be especially useful in multi-zone scenarios, such as those described above with reference to FIGS. 4 and 5. The method begins at start step 800. In step 801, a first indoor air quality (IAQ) parameter is measured by a sensor array located in a first zone in an indoor space and a first indoor air quality (IAQ) parameter is measured by a sensor array located in a second zone in an indoor space, the first and second zones being adjacent. In step 802 the system determines if at least one of the first air parameters from the first or second zones is above a first threshold for a first duration. If at least one of the first air parameters from the first or second zones is not above a first threshold for a first duration, the system may then proceed back to start step 800.

If at least one of the first air parameters from the first or second zones is above a first threshold for a first duration, in step 803 the system determines if the air is currently being remediated in the first and second zones. If the air is not currently being remediated in the first and second zones, in step 804 the system initiates air remediation by an air handling unit (AHU) in the first and second zones by reconfiguring positions of dampers in the first and second zones to allow air into the first zone and restrict air into the second zone. In step 805 the system continues air remediation in the first and second zones until the first air parameter in both the first and second zones are lower than a second threshold for a second duration. If at step 803 the system determines that the air within the space is currently being remediated, the system proceeds to step 805 and continues air remediation in the first and second zones until the first air parameter in both the first and second zones are lower than a second threshold for a second duration. Once the first air parameter in both the first and second zones are lower than a second threshold for a second duration at step 805, the system may then proceed back to start step 800.

Figure 12:
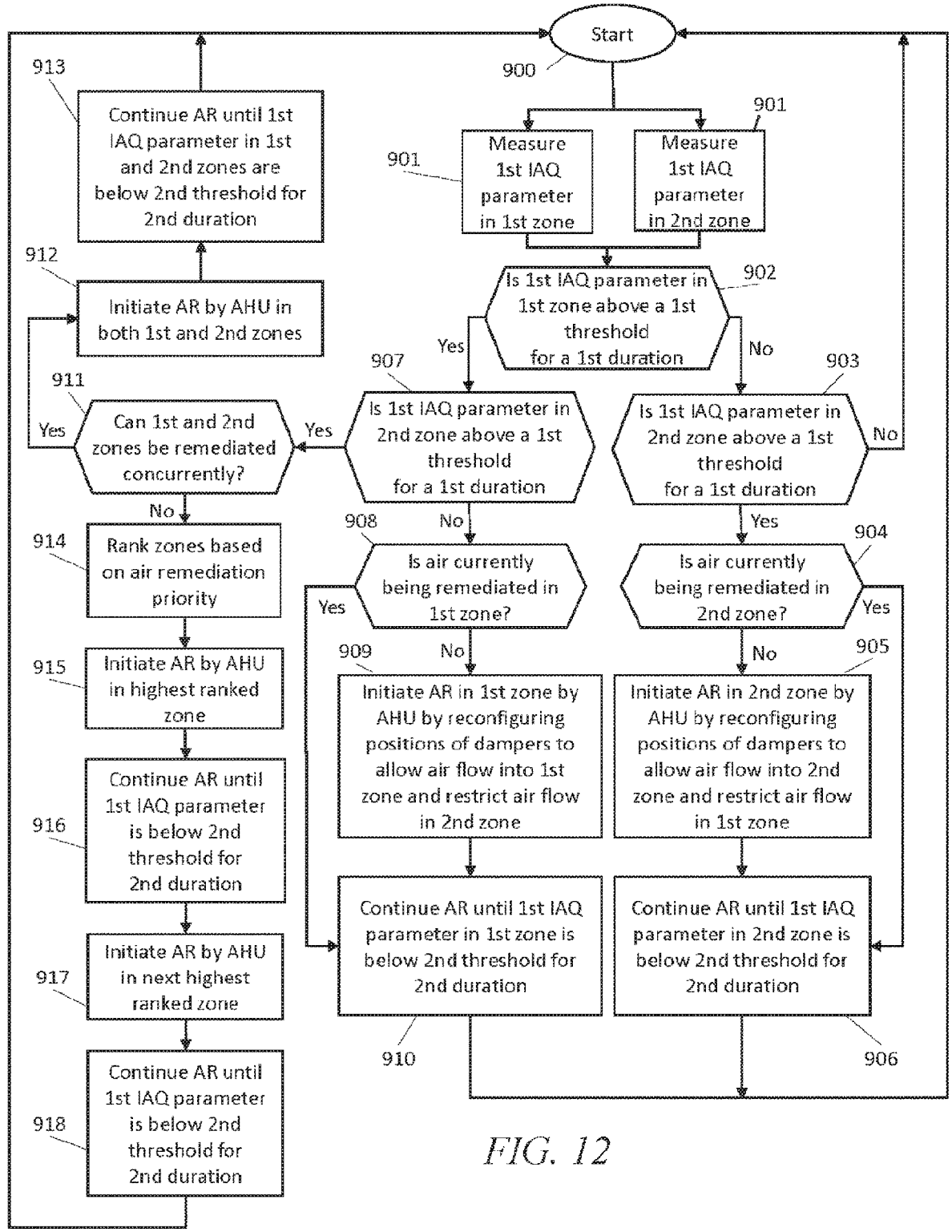
FIG. 12 is a flow diagram of a method for improving air quality in an indoor space in accordance with some embodiments.

FIG. 12 illustrates a method for improving air quality in an indoor space in accordance with some embodiments, which may be executed by air remediation system 100 described above with reference to FIGS. 1 to 5. The method described with reference to FIG. 12 may be especially useful in multi-zone scenarios, such as those described above with reference to FIGS. 4 and 5, and especially in scenarios where poor indoor air quality may create a need for remediation in more than one zone. The method begins at start step 900. In step 901, a first indoor air quality (IAQ) parameter is measured by a sensor array located in a first zone in an indoor space and a first indoor air quality (IAQ) parameter is measured by a sensor array located in a second zone in an indoor space, the first and second zones being adjacent. While FIG. 12 describes the indoor air sensor arrays in both zones measuring a "1st IAQ [indoor air quality] parameter," it should be understood that the indoor air quality parameter(s) measured by sensor arrays in the first and second zones do not necessarily have to be the same parameter. Indeed, the measured indoor air quality parameters in the different zones can be the same or different indoor air quality parameters, which may have the same or different threshold values, durations, and detection intervals. For example, an air sensor array in the first zone may measure carbon dioxide, while an air sensor array in the second zone may measure volatile organic compounds. In such a scenario, the threshold values would likely differ, but the detection intervals and/or durations for the two zones may be the same or different.

In another example, the air sensor arrays in the first and second zones may both be configured to measure carbon dioxide levels. In such a scenario, the threshold values, durations, and detection intervals for the first zone may be the same or different from those for the second zone. Threshold values, durations, and detection intervals, may be determined based on, for example, one or more of: location(s) of the zone(s), intended or expected use of the zone(s), estimated, actual, or predicted occupancy of the zone(s), time of day or year, user preference or need, location, elevation, etc.

In step 902 the system determines if the first air parameter in the first zone is above a first threshold for a first duration. If the first air parameter in the first zone is not above the first threshold for a first duration, in step 903 the system determines if the first air parameter in the second zone is above a first threshold for a first duration. If the first air parameter in the second zone is not above the first threshold for a first duration, the system may then proceed back to start step 900.

If the first air parameter in the second zone is above the first threshold for a first duration, in step 904 the system determines if the air is currently being remediated in the second zone. If the air is not currently being remediated in the second zone, in step 905 the system initiates air remediation by an air handling unit (AHU) in the second zone by reconfiguring positions of dampers in the first and second zones to allow air into the second zone and restrict air into the first zone. In step 906 the system continues air remediation in the second zone until the first air parameter in the second zone is lower than a second threshold for a second duration. If at step 904 the system determines that the air within the second zone is currently being remediated, the system proceeds to step 906 and continues air remediation in second zone until the first air parameter in the second zone is lower than a second threshold for a second duration. Once the first air parameter in the second zone is lower than the second threshold for the second duration in step 906, the system may then proceed back to start step 900.

If at step 902 the system determines that the first air parameter in the first zone is above a first threshold for a first duration, in step 907 the system determines if the first air parameter in the second zone is above a first threshold for a first duration. If the first air parameter in the second zone is not above the first threshold for a first duration, in step 908 the system determines if the air is currently being remediated in the first zone. If the air is not currently being remediated in the first zone, in step 909 the system initiates air remediation by an air handling unit (AHU) in the first zone by reconfiguring positions of dampers in the first and second zones to allow air into the first zone and restrict air into the second zone. In step 910 the system continues air remediation in the first zone until the first air parameter in the first zone is lower than a second threshold for a second duration. If at step 908 the system determines that the air within the first zone is currently being remediated, the system proceeds to step 910 and continues air remediation in first zone until the first air parameter in the first zone is lower than a second threshold for a second duration. Once the first air parameter in the first zone is lower than the second threshold for the second duration in step 910, the system may then proceed back to start step 900.

The steps described above with reference to FIG. 12 relate to scenarios where either the first zone or second zone (but not both) experiences an above-threshold indoor air quality measurement that triggers air remediation in zone with the above-threshold measurement. The steps described below with reference to FIG. 12 encompass scenarios where both the first and second zones experience above-threshold indoor air quality measurements, triggering either concurrent or consecutive air remediation in the first and second zones.

If at step 902 the system determines that the first air parameter in the first zone is above a first threshold for a first duration, and if at step 907 the system determines that the first air parameter in the second zone is above a first threshold for a first duration, the system determines whether the first and second zones can or otherwise should be remediated concurrently. This determination may be made based on, for example, at least one of the type of elevated air parameter(s), the measurement(s) of the air parameter(s), configurations of the zones, efficiency, locations of the zones, intended or expected use of the zones, estimated, actual, or predicted occupancy of the zones, time of day or year, day of week, location, elevation, user preference or need, etc.

If at step 911 the system determines that the first and second zones can or otherwise should be remediated concurrently, at step 912 the system initiates air remediation by an air handling unit (AHU) in the first and second zones. For example, if two bedrooms are occupied and each has a different elevated air quality parameter needing remediation, the system may initiate air remediation concurrently in both rooms. In some approaches, the air handling unit may remediate the air in both zones by reconfiguring positions of dampers in the first and second zones to allow sufficient airflow into both zones. Additionally, or alternatively, in some approaches the air handling unit may remediate air in one or both zones using fresh air exchange, particulate filtration, ionic filtration, activated carbon filtration, ultraviolet air purification, and combinations thereof. In step 913 the system continues air remediation in the first and second zones until the first air parameter in both the first and second zones are lower than a second threshold for a second duration. Once the first air parameter in both the first and second zones are lower than the second threshold for the second duration in step 913, the system may then proceed back to start step 900.

If at step 911 the system determines that the first and second zones cannot or otherwise should not be remediated concurrently, at step 914 the system ranks the zones based on air remediation priority. Air remediation priority or other ranking may be based on, for example, at least one of: (a) the type of elevated air parameter(s); (b) the respective measurements or scores of the air parameter(s); (c) comparison of which air parameter(s) exceeds its threshold value the most or by the highest percentage; (d) estimated, actual, expected, or predicted occupancy of the zone (e.g., if one zone is occupied and the other is not, the occupied zone may be remediated first; the zone scheduled for occupancy first may be remediated first; the zone having or expected to have the highest occupancy level may be remediated first etc.); (e) current, intended or expected use of the zone, the type of room/zone, etc. (e.g., a bedroom may be remediated before a kitchen, a sick person's bedroom may be remediated before another room, an office for a person with asthma may be remediated before another office, a meeting room may be remediated before a storage room); (f) the zone that was remediated the longest time ago may be remediated first; (g) the zone that can be remediated the quickest may be remediated first; (h) time of day, time of year, or day of week; (i) location; (j) external weather or other conditions: (k) the relative impacts of elevated air parameters on one or more people's health: (l) occupant or other user preference or need; (m) group related preference or need; (n) power or energy availability; (o) noise level or other ramification created during remediation of a zone; (p) the length of time it might take to remediate a zone; or (q) other factor(s).

In step 915, the system initiates air remediation by an air handling unit (AHU) in the highest ranked zone. In step 916 the system continues air remediation in the highest ranked zone until the first air parameter in this zone is lower than a second threshold for a second duration. In step 917 the system then initiates air remediation by the air handling unit (AHU) in the next highest ranked zone. In step 918 the system continues air remediation in the next highest ranked zone until the first air parameter in this zone is lower than a second threshold for a second duration. The system may then proceed back to start step 900.

Figure 13:
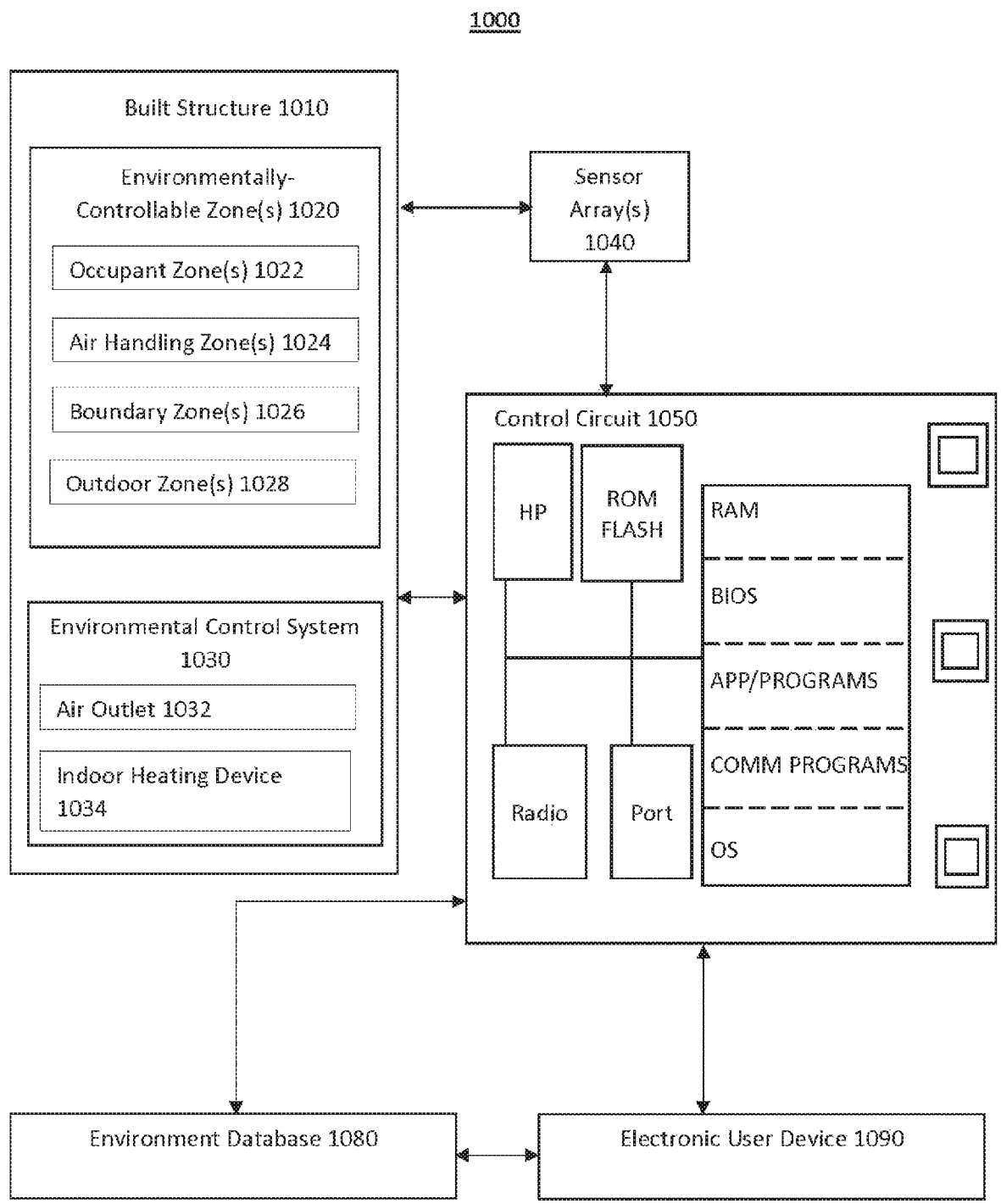
FIG. 13 is a block diagram of a system for monitoring indoor environmental quality.

FIG. 13 illustrates a system for monitoring indoor air quality in accordance with some embodiments. A lack of adequate data on an indoor environment makes it difficult for occupants to understand and improve their indoor environmental conditions. Implementing an indoor air quality monitoring system provides occupants of a built structure more information on their indoor environment such that the environment may be more precisely and accurately tailored to occupants. Installing or otherwise using a system that obtains accurate information on indoor environment quality parameters improves the ability of an environmental control system to control the indoor environment and improve occupant health and comfort. For example, the air quality monitoring system can provide information on the thermal environment or indoor air quality parameters in the built structure. Information on the thermal environment and indoor air quality parameters may instruct occupants how to effectively control those parameters.

Furthermore, with a system installation that provides access to precise and accurate real-time data on indoor environmental quality parameters, occupants may reliably evaluate their indoor environment and intervene to control indoor environmental parameters as necessary. Spatial and temporal variation of parameters related to indoor environmental quality, especially thermal and indoor air quality parameters, may impact the quality of data collected by sensor arrays in an indoor air quality monitoring system. As such, sensor array placement impacts the performance of an indoor air quality monitoring system. Installing an indoor air quality monitoring system with optimal sensor array placement ensures that system operates more precisely and accurately. In order to enhance performance of the indoor air quality monitoring system 1000, the delineation of zones within an indoor environment may help to determine optimal sensor array placement.

As shown in FIG. 13, the indoor air quality monitoring system 1000 may include, be associated with, or be part of a built structure 1010. In one embodiment, the built structure is an office space. The indoor air quality monitoring system 1000 may further include an environmental control system 1030, at least one sensor array 1040, a control circuit 1050, and an electronic user device 1090.

The control circuit 1050 is communicatively coupled to the sensor arrays 1040, the electronic device 1090, the environmental control system 1030, and the environment database 1080. The central control circuit 1050 may take the form of a programmed computer or other processor-based system or device. For example, the central control circuit 1050 may take the form of a conventional mainframe computer, mini-computer, workstation computer, personal computer (desktop or laptop), or handheld computer. The control circuit 1050 may be similar to the central control circuit 120 that is described above with reference to FIG. 1.

The control circuit 1050 can operate in a networked environment using logical connections to one or more remote computers and/or devices as described above with reference to FIG. 13. For example, the control circuit 1050 can operate in a networked environment using logical connections to one or more other subsystems, one or more server computer systems and associated non-transitory data storage device. The server computer systems and associated non-transitory data storage device may, for example, be controlled and operated in full or in part by a facility (e.g., hotel, spa, apartment building, condominium building, hospital) in which the habitable environment is located. In some embodiments, the server computer systems and associated non-transitory data storage device also may provide one or more other functions, services, or support for all or part of a facility such as, for example, accounting, security, energy expenditure management, scheduling, resource management, inventory management, etc.

Communications may be via wired and/or wireless network architectures, for instance, wired and wireless enterprise-wide computer networks, intranets, extranets, and the Internet. Thus, the control circuit 1050 may include wireless communications components, for example one or more transceivers or radios 1061 and associated antenna(s) for wireless (e.g., radio or microwave frequency communications, collected referred to herein as RF communications). Other embodiments may include other types of communication networks including telecommunications networks, cellular networks, paging networks, and other mobile networks.

In operation, in one embodiment the control circuit 1050 may delineate occupant zones based on an electronic floor plan. The control circuit may then instruct installation of at least one sensor array 1040 in each delineated occupant zone. After delineating occupant zones, the control circuit 1050 delineates at least one boundary zone and at least one air handling zone based on the electronic floor plan and an electronic HVAC plan. Once occupant zones, boundary zones, and air handling zones have been delineated, the control circuit identifies overlapping zones including at least one combined boundary-occupant zone, combined air handling-occupant zone, or combined boundary-occupant-air handling zone. The control circuit then instructs the installation of at least one sensor array 1040 in the identified overlapping zones. If the number of sensor arrays available are less than a total of the combined delineated occupant zones and identified overlapping zones, then installation of thermal sensor arrays may occur on the basis of the following order of preference: combined boundary-occupant-air handling zone first, then the combined air handling-occupant combined zones, and then the combined boundary-occupant combined zones and installation of air quality sensor arrays occurs on the basis of the following order of preference: the combined boundary-occupant zone, the combined boundary-occupant-air handling zone, and then the combined air handling-occupant zone.

An environment database 1080 may be in communication with the control circuit 1050 and the electronic user device 1090. The environment database 1080 may be stored, for example, on a server. The environment database 1080 may include a profile associated with an occupant of the built structure. In the environment database 1080, temperature parameter data, light parameter data, sound parameter data, and environmental air quality data may be associated with an occupant in the user profile.

In operation, the environment database 1080 may store occupant profiles associated with particular occupants within the built structure. In one embodiment, the control circuit 1050 detects a particular occupant within an occupant zone, the occupant having an occupant profile in the environment database 1080. By another approach, the control circuit may be configured to detect multiple occupants within the occupant zones and in some configurations may identify the particular occupant. The control circuit then locates the particular occupant in an occupant zone within the built structure and analyzes sensor array readings in the occupant zone. Next, the control circuit compares sensor readings with the thermal and indoor air quality parameters stored in the occupant profile. Upon detection that the sensor readings in the particular occupant zone are not within the parameters of the occupant profile, the control circuit 1050 instructs the environmental control system to adjust the parameters pursuant to the occupant profile. Upon detecting that sensor readings in a particular occupant zone are not within the parameters of the occupant profile, the control circuit may also send a notification to a user via an electronic user device regarding the reading and adjustment of parameters pursuant to the occupant profile.

In some embodiments, the environment database 1080 also may include information related to one or more occupants such as, for example, allergies or other health conditions that occupants may have, schedule of occupancy by hour, day, week, etc. for one or more zones, preferred air temperatures, etc.

Figure 15A:
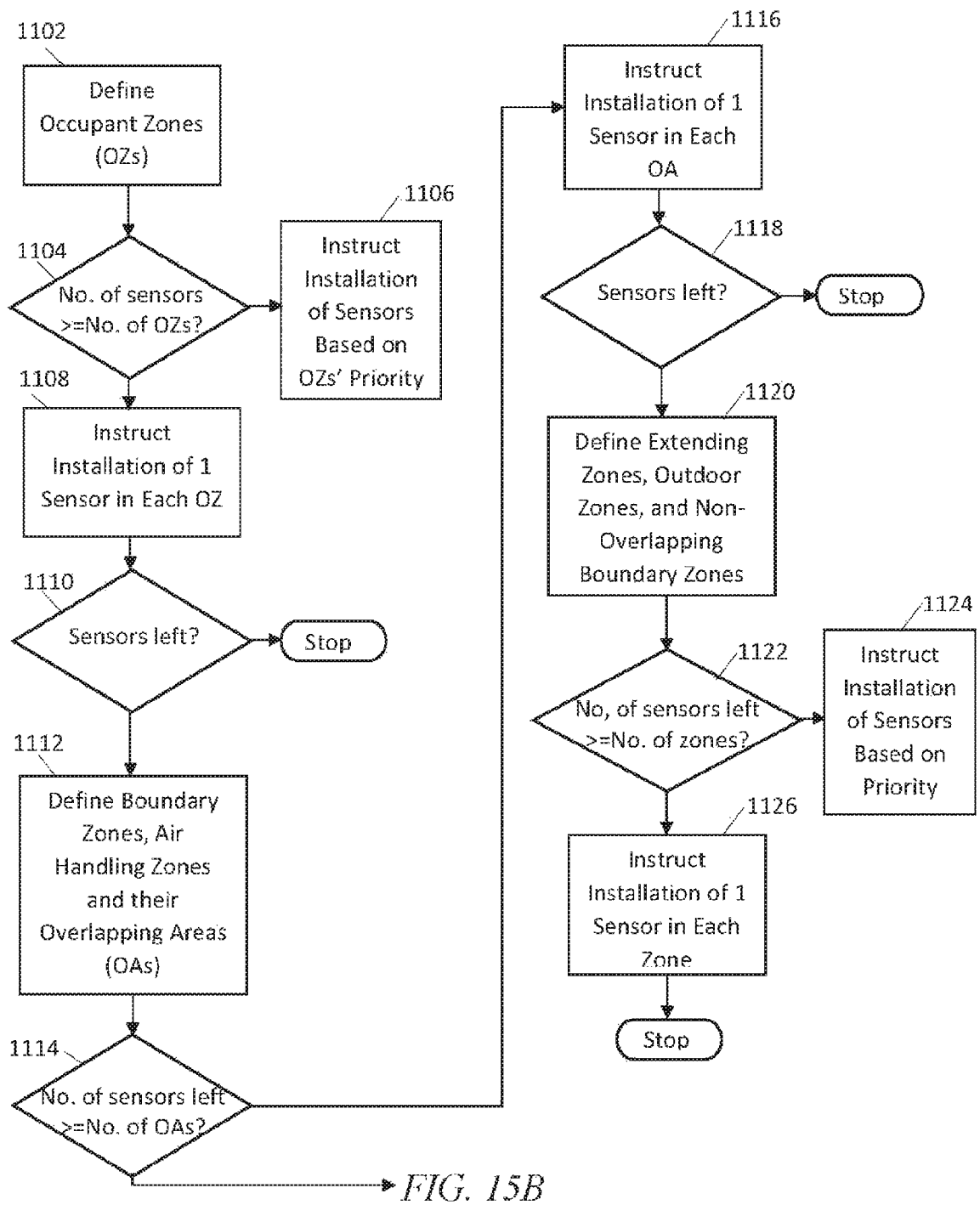

In one embodiment, the system 1000 and the control circuit 1050 may be employed with the method of FIGS. 15A and 15B.

The electronic user device 1090 may be configured to receive one or more instructions regarding the allocation of or the installation location of one or more sensor arrays 1040 which may be allocated or installed pursuant to the following methodology: delineate occupant zones based on an electronic floor plan; instruct installation of at least one sensor array in each delineated occupant zone; after delineation of the occupant zones, delineating at least one boundary zone and at least one air handling zone based on the electronic floor plan and an electronic HVAC plan; identify overlapping zones including at least one combined boundary-occupant zone, combined air handling-occupant zone, or combined boundary-occupant-air handling zone; and instruct installation of at least one sensor in the identified overlapping zones. If the sensor arrays available are less than a total of the combined delineated occupant zones and identified overlapping zones, then allocation or installation of thermal sensor arrays occurs on the basis of the following order of preference: combined boundary-occupant-air handling zone first, then the combined air handling-occupant combined zones, and then the combined boundary-occupant combined zones and allocation or installation of air quality sensor arrays occurs on the basis of the following order of preference: the combined boundary-occupant zone, the combined boundary-occupant-air handling zone, and then the combined air handling-occupant zone. Additionally, the electronic user device 1090 may be configured to send allocation or installation configuration information, HVAC plans, and floor plan updates for the built structure to the control circuit 1050.

In addition to having an installer receive instructions on a user device, the device 1090 also may be employed to gather information about the space, such as for example, capturing electronic images of a space, portion thereof, or one or more of the environmental control systems. Obtaining accurate information in the space during sensor array installation can help account for late changes to the building design During operation, the control circuit 1050 may send notifications to the user of the electronic device 1090 upon detection of particular measurements by the sensor arrays 1040 in the built structure. For example, the control circuit may send a user of an electronic user device a notification the user has not been exposed to natural light within a predetermined period of time. In another example, the control circuit may send a user of an electronic user device a notification that the user has been exposed to certain indoor air pollutants.

The built structure 1010 generally includes environmentally-controllable zones 1020. The environmentally-controllable zones may include, for example, occupant zones 1022, air handling zones 1024, boundary zones 1026, and outdoor zones 1028. The occupant zones 1022 designate the areas in the built structure 1010 where occupants spend the greatest fraction of their time in the built structure. See FIG. 14A and FIG. 14B for further description of occupant zones. If two occupant zones are of similar size, share boundaries, and are adjacent then the two occupant zones may be combined in to a single occupant zone. Air handling zones 1024 designate the area in the built structure 1010 that is easily affected by the components of the environmental control system 1030, including the air outlets 1032 and indoor heating devices 1034. See FIG. 14E for further description of air handling zones 1024. Boundary zones 1026 designate the area in the built structure 1010 that is directly impacted by potential factors that affect the thermal environment and indoor air quality within the built structure, excluding the areas impacted by components of the indoor environmental control system 1030. See FIG. 14D for further illustration of boundary zones 1026. See FIG. 14G for further illustration of outdoor zones 1028 designate the are in the built structure 1010 that is not in direct contact with the occupant zones 1022 but can still influence the indoor air quality of the occupant zones and the comfort of occupants in the built structure. Occupant zones, air handling zones, and boundary zones may overlap with each other.

Air quality monitoring system 1000 generally includes at least one sensor array 1040. The sensor arrays 1040 may comprise one or more indoor air quality sensors configured to sense, detect, or otherwise measure air quality, thermal quality, sound quality, or lighting parameters. For example, with respect to thermal quality, the sensor arrays may be configured to measure ambient temperature levels, air humidity, and relative humidity. With respect to air quality, parameters that may be monitored by the sensor array 1040 include, for example, carbon dioxide, particulate matter, total volatile organic compounds, and ozone.

Choosing optimal or near optimal installation type for sensor arrays 1040 within the indoor space of a built structure may be important for delivering reliable data and constructive feedback for occupants. Due to the spatial heterogeneity of indoor environments, the installation type for sensor arrays 1040 may affect measurement results. Possible sensor array installation types include work-station mounted, wall-mounted, ceiling-mounted, self-mounted, and wearable configurations.

In one exemplary configuration, workstation-mounted sensor arrays are installed on the work surface of a workstation within a built structure or similar location. For example, a workstation-mounted sensor array may be installed on a desk. In one approach, a workstation-mounted sensor array may be positioned in a location where the sensor array is unlikely to be affected by occupants, indoor air pollutant sources, or heating or cooling sources. For example, a workstation-mounted sensor array may be positioned so that air exhaled by an occupant does not affect the reading. In another example, a workstation-mounted sensor array may be positioned to avoid indoor air pollutant sources such as computers, monitors, printers, or air humidifiers. By one approach, a workstation-mounted sensor array is not installed in an area that receives direct exposure to sunlight. In some embodiments, workstation-mounted sensor arrays are used because the can directly monitor the indoor environment around occupants. Other sensor array installation types present drawbacks to monitoring of the thermal environment and indoor air quality.

Wall-mounted sensor arrays may be installed on the walls or partitions in a built structure. By one approach, a wall-mounted sensor array may be installed at the height of seated occupants. By one approach, a wall-mounted sensor array is installed between 3-6 feet above the floor. More specifically, a wall-mounted sensor array may be installed between about 4 feet and 5 feet above the floor on interior walls or partitions. By another approach, wall-mounted sensor arrays may be installed to avoid direct sunlight, open windows, air intakes or exhausts, and areas where air could be exhaled directly onto the sensor array by occupants. If there is displacement ventilation or floor heating within the indoor space, an additional temperature sensor may be installed in an area between 8 inches and 1 foot 8 inches above the floor on an interior wall or partition. Wall-mounted sensor arrays may be inaccurate at measuring the thermal environment in built structure due to the influence of the building envelope. For example, in the summer the temperature of the interior surface of an exterior wall of the built structure will be higher than the indoor air temperature. Therefore, the temperature measured by a wall-mounted sensor array will be higher than the perceived indoor air temperature. The opposite effect occurs during the winter. Wall-mounted sensor arrays can also be affected by air infiltration from the building envelope, which may result in underestimation of the concentration of indoor air pollutants. By one approach, a wall-mounted sensor array may be positioned about 2 to 5 feet away from indoor air pollutant sources such as photocopiers or printers. In another approach, such installation is about 3.25 feet from indoor air pollutant sources.

Ceiling-mounted sensor arrays face similar drawbacks to wall-mounted sensor delays. Ceiling-mounted sensor arrays do not capture pollutant levels that occupants are exposed to at lower levels of an indoor space. By one approach, ceiling-mounted sensor arrays are not used to measure indoor air quality parameters or temperature. Additionally, the accuracy of ceiling-mounted sensor arrays is dependent on the air distribution equipment within the built-structure. For example, when a displacement ventilation system or under floor air distribution system is installed, the air in an indoor space tends to become stratified. When air within an indoor space becomes stratified, the air temperature measured by a ceiling-mounted sensor array may be higher than the air temperature perceived by occupants. In another example, if an indoor space has a ceiling air distribution device, such as a ceiling diffuser, the indoor environment measured by a ceiling-mounted sensor array may be strongly affected by the intensive turbulence of air. As a result, the measurements from ceiling mounted sensor arrays may have a larger variation than that of, for example, a workstation-mounted sensor array.

In one illustrative configuration, self-mounted sensor arrays mount a connection part of one sensor of a sensor array directly on the ceiling with a portion of the sensor array extending into an occupant breathing zone. A connection part for a sensor array may be, for example, a hanger. A self-mounted sensor array may avoid impeding daily office work but may also affect the overall appearance of the indoor space and arrangement. By one approach, the location of hangers may be positioned to minimize interference with daily office work and the impact to the appearance of the indoor space. By one approach, the self-mounted sensor array has a consistent power supply. Wearable sensor arrays may be positioned on an occupant or associated with an occupant of a built structure. Wearable sensor arrays are accurate in measuring certain parameters for which the human body is not a major influencing factor, like total volatile organic compounds. However, for some parameters that are highly affected by the human body in the indoor environment, like carbon dioxide and temperature, the position of the sensor array on the occupant may affect the measurements. For example, if a wearable sensor array is in contact with an occupant's skin or is very close to the skin of the occupant, the measured temperature may be higher than the indoor air temperature since the surface of a human body is usually higher than the surrounding air temperature. Similarly, if the wearable sensor array is located at a position in the breathing zone of an occupant, the measured relative humidity and the concentration of carbon dioxide may be higher due to the impact of exhalation. A wearable sensor array may, like self-mounted sensor arrays, avoid impeding daily office work. However, if a wearable sensor array cannot be connected via a cable power supply, a durable battery may be useful.

Figure 14A:
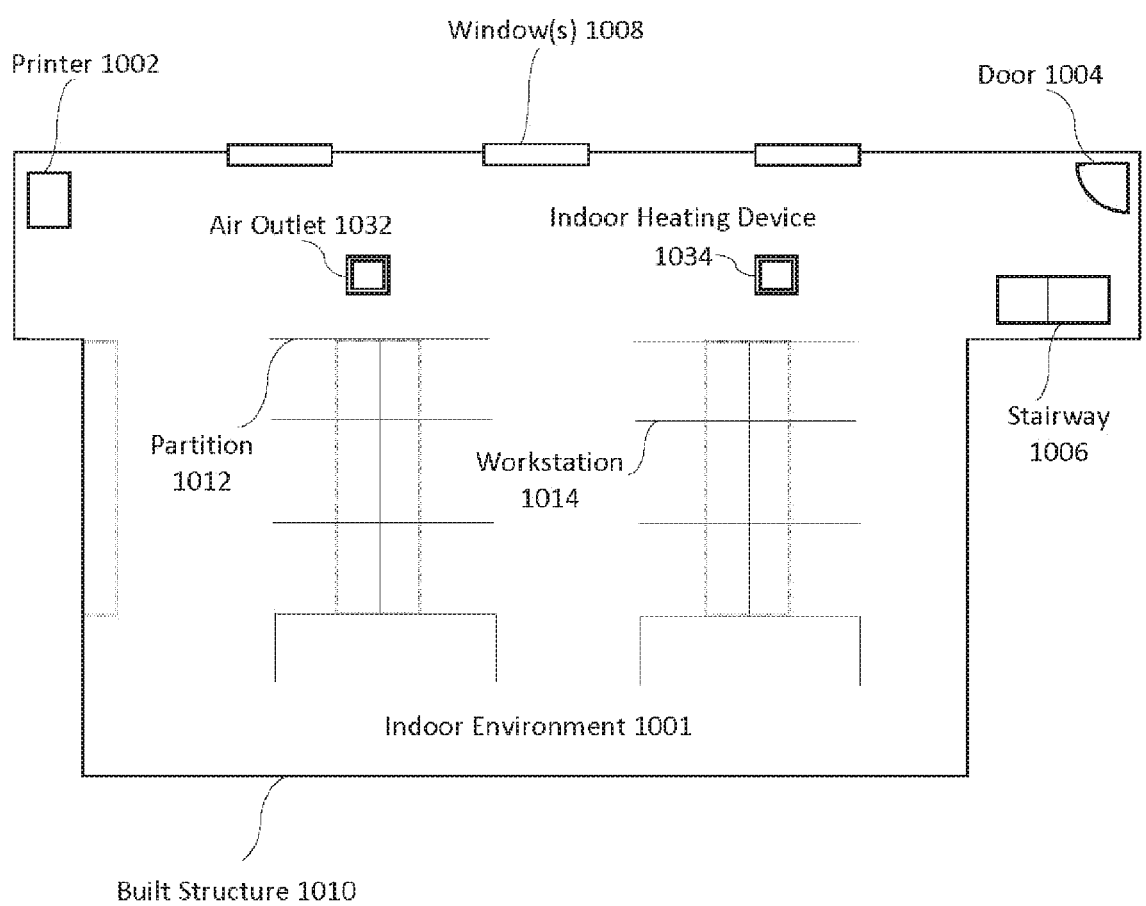
FIG. 14A and FIG. 14B are schematic diagrams of an exemplary indoor environment with multiple occupant zones.
Figure 14B:
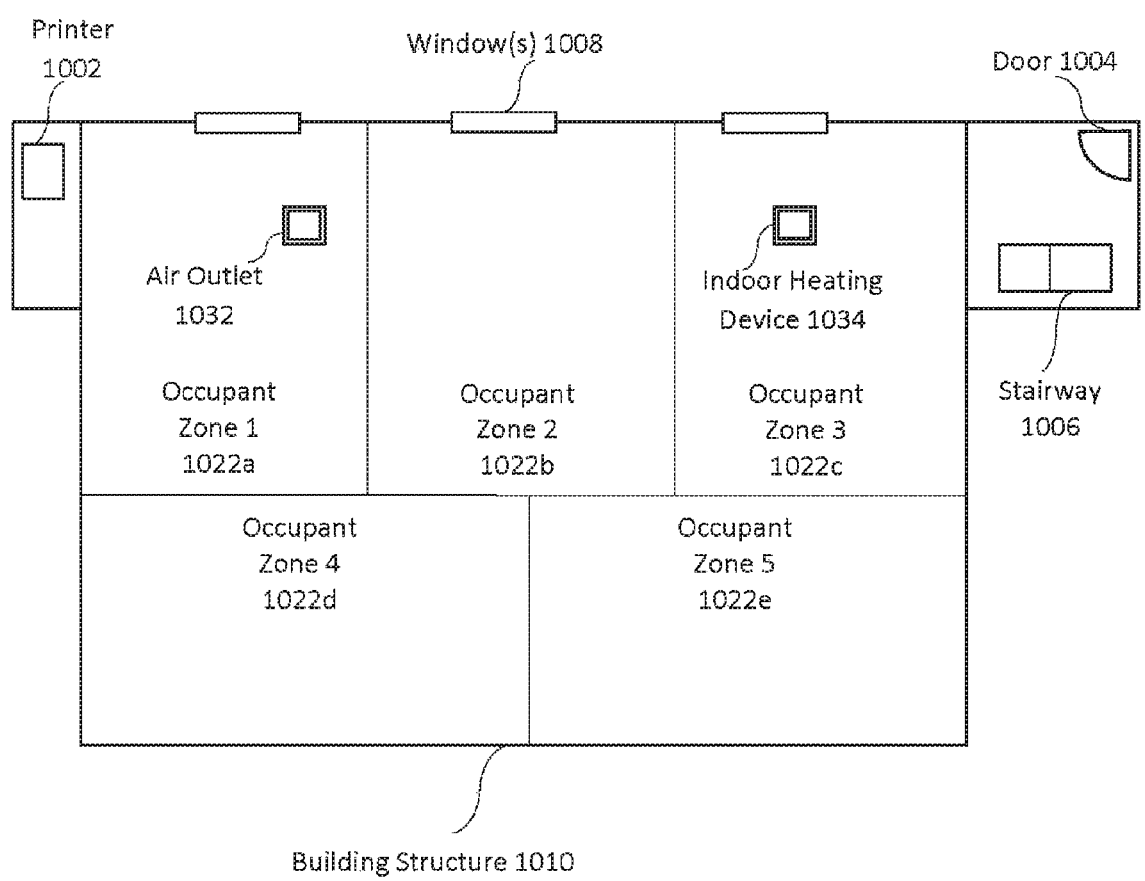

FIG. 14A and FIG. 14B illustrate an exemplary layout of an indoor environment 1001 with multiple occupant zones.

By one approach, the indoor environment 1001 is an office space and occupant zones 1022 designate the area where occupants spend a majority of their time during working hours. FIG. 14A illustrates the layout of an office space with vertical segmental partitions 1012 and workstations 1014 positioned within the indoor environment. FIG. 14B illustrates the corresponding occupant zones 1022 within the indoor environment of FIG. 14A.

An occupant zone 1022 is delineated by vertical segmental partitions 1012 within the office space and by the horizontal layout of the indoor environment 1001. Vertical segmental partitions 1012 may include, for example, interior decorative partitions and partitions attached to workspaces. Vertical segmental partitions 1012 may delineate occupant zones since partitions impact air motion in office areas. Certain office spaces may have high segmental partitions to separate working areas and provide visual and acoustic privacy. When the height of a vertical segmental partition is higher than about 1.9 meters (6 feet 3 inches), air distribution in the indoor environment 1001 forms a unique pattern. If the height of a vertical segmental partition 1012 is greater than about 1.9 meters (6 feet 3 inches), the vertical segmental partitions 1012 are considered "effective" and the vertical segmental partition 1012 may be used to divide occupant zones. However, when the vertical segmental partition 1012 is lower than about 1.9 meters (6 feet 3 inches) it is not considered to be an "effective" barrier and cannot fully separate occupant zones.

In the horizontal layout of the indoor environment 1001, the boundary of occupant zones 1022 may be delineated based on the offset from the edges of workstations 1014. More specifically, the boundary of an occupant zone 1022 may be delineated by a about 1.5 meter (4 foot 11 inch) offset from the edge of a workstation 1014. When two occupant zones overlap, they can be merged into a single occupant zone. For example, two workstations with a about 2.0 meter (6 foot 7 inch) gap between each other are considered a single occupant zone because there are overlaps between the occupant zones delineated by each workstation in one embodiment. However, four occupant zones delineated by workstations with a about 4.0 meter (13 foot 1 inch) horizontal distance are considered to be four separate occupant zones.

In FIG. 14B, occupant zones 1022a to 1022e designate each occupant zone in the exemplary indoor environment 1001. The environment within each occupant zone (1022a-1022) can be assumed to be uniform if there is no overlap with other zones.

Figure 14C:
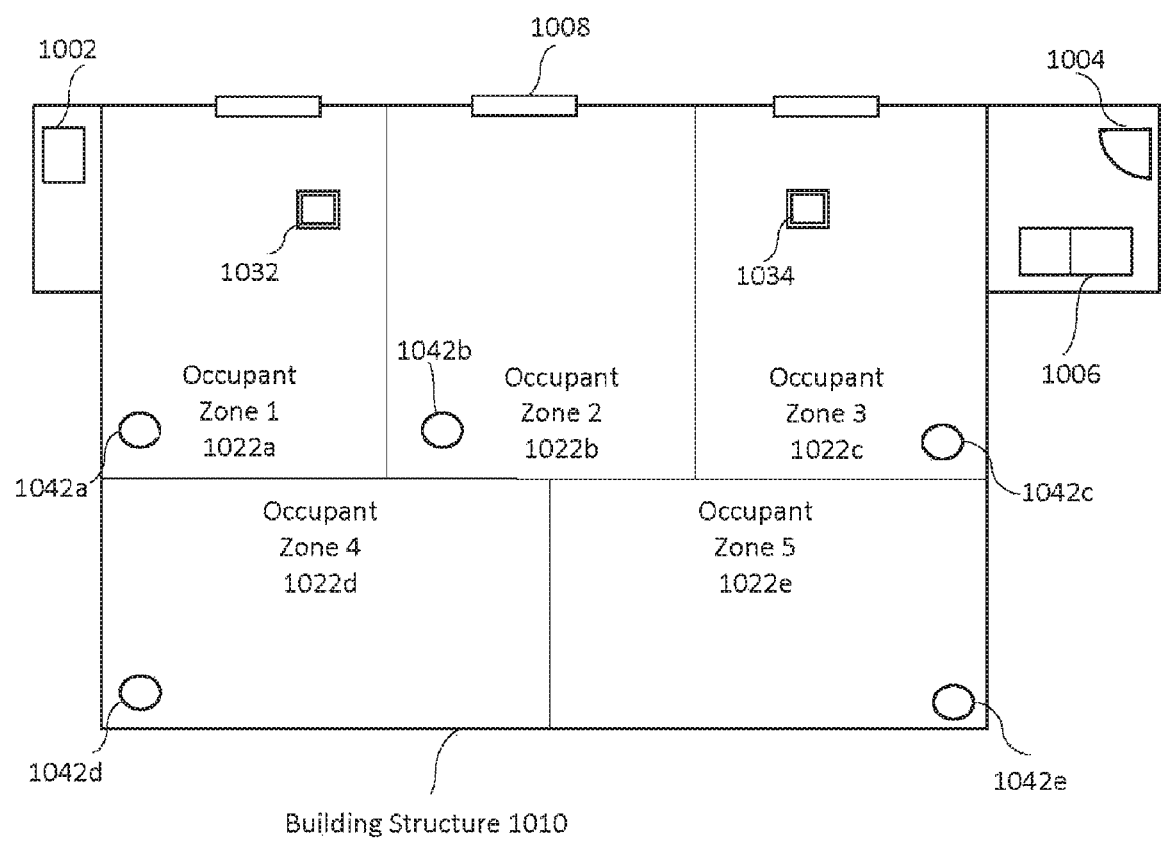
FIG. 14C is a schematic diagram of the location of sensor packages in an exemplary indoor environment with multiple occupant zones.

FIG. 14C illustrates an exemplary layout of sensor packages in an indoor environment with multiple occupant zones. In one approach, at least one sensor array 1040 is installed in each of the occupant zones 1022. A method for sensor installation is further detailed in FIGS. 15A and 15B.

Figure 14D:
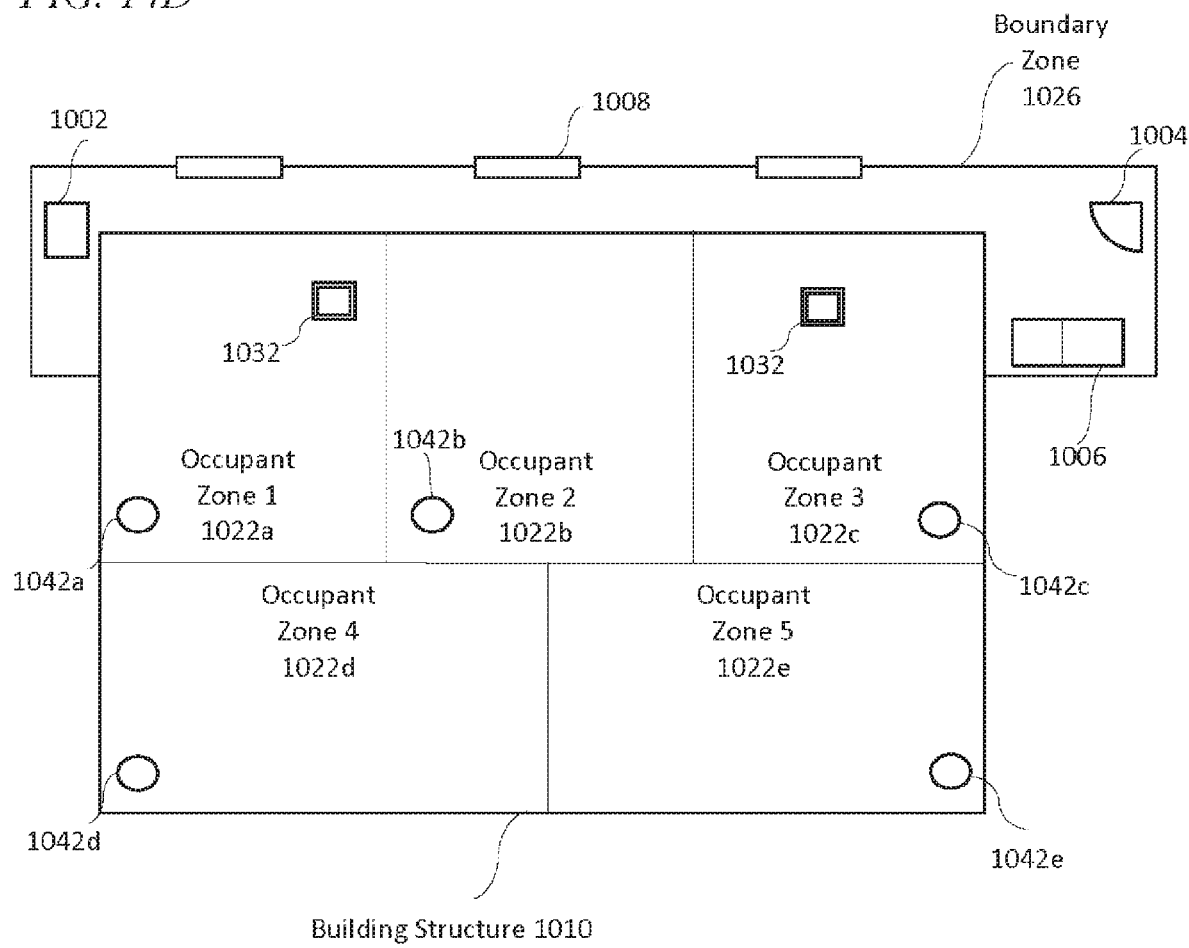
FIG. 14D is a schematic diagram of boundary zones an exemplary indoor environment.

FIG. 14D illustrates an exemplary layout of a boundary zone in an indoor environment. Boundary zones are the area of the indoor environment that is directly impacted by potential factors that affect thermal environment and indoor air quality, excluding the air handling zones. Potential factors that affect thermal environment and indoor air quality include envelope-related factors and interior environment-related factors. Envelope-related factors may include fenestrations such as windows or doors and the opaque envelope of the built structure. The opaque envelope of the built structure includes, for example, external building walls. Interior environment-related factors include indoor pollutant sources, kitchen appliances, water heaters, coffee machines, and other major indoor heating sources. Indoor pollutant sources may include, for example, printers, copy machines, gas stoves, space heaters, fireplaces, and woodstoves. Further, the environment within a boundary zone typically varies due to the temporal characteristics of potential factors. The area influenced by potential factors is determined by the influencing distance from those factors. Table 2 provides examples of the influencing distance associate with potential factors that may be present in a typical office space. Determining the area impacted by potential factors calls for detailed information on the built structure and its interior spaces. By one approach, an accurate delineation of the boundary zones may be determined by the integrated utilization of floor plans and on-site examinations.

TABLE 2

| Factor Type | | Approximate Influencing Distance from Factors |
|---|---|---|
| Envelope-related | Fenestrations: windows, doors | 0.5-1 m (1'8"-3'3") |
| | Opaque envelope | 0.5 m (1'8") |
| Interior environment-related | Kitchen, including water heater, coffee machines, etc. | 1.5 m (4'11") |
| | Printer, copying machines | 1.5 m (4'11") |
| | Other major indoor heating sources | 1.5 m (4'11") |

Based on the exemplary building structure 1010 from FIG. 14A, FIG. 14D illustrates the position of boundary zone 1026 for the indoor environment 1001. Boundary zone 1026 is defined based on the location of potential factors within building structure 1010. The potential factors in building structure 1010 includes a printer 1002, a door 1004, a stairway 1006, and multiple windows 1008. Accordingly, boundary zone 1026 designates the area influenced by those potential factors.

Figure 14E:
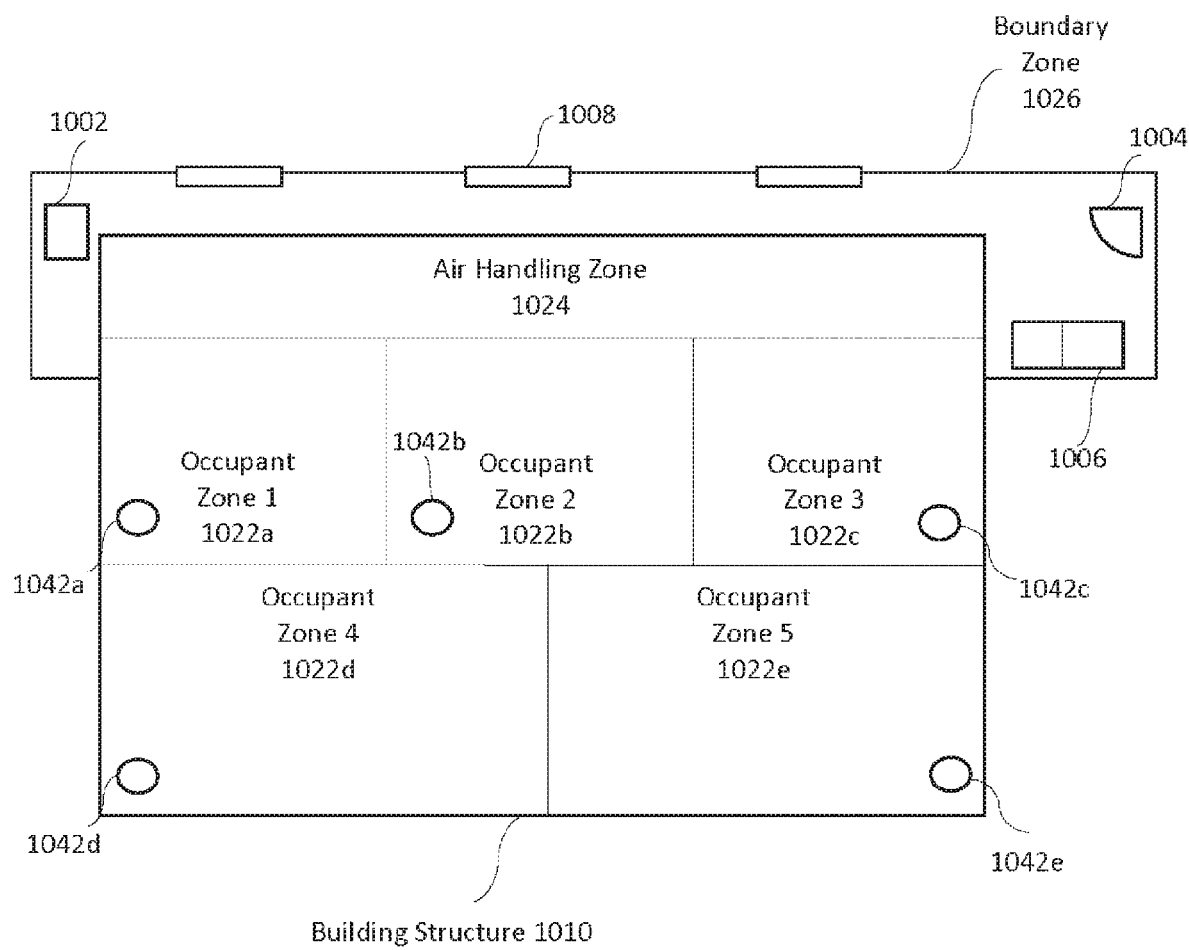
FIG. 14E is a schematic diagram of air handling zones an exemplary indoor environment.

FIG. 14E illustrates the layout of air handling zones an indoor space with multiple occupant zones. Air handling zones designate the areas within an indoor environment that are easily affected by components of an air handling system. In an indoor environment, components of an air handling system can significantly affect thermal environment and indoor air quality. The effect of the air handling system may be taken into consideration when determining the location of sensor arrays for measuring them and indoor air quality parameters. For further description of how to determine the location of sensor arrays, see. FIG. 15. Components of an air handling system include, for example, air outlets, air diffusers, radiators, portable heating or cooling sources, and vents. Table 3 provides example instructions for delineating air handling zones based on various components of an air handling system. The area impacted by components of the air handling system is determined by both the location and the properties of the components. By one approach, an accurate delineation of the air handling zone may be determined by an integrated utilization of floor plans and on-site examination, which may include capturing the space via electronic image via the electronic user device.

TABLE 3

| | Types | Suggested Air Handling Zone |
|---|---|---|
| Air Outlet | Group A1*: Outlets mounted on or near the ceiling that discharge air horizontally. | 360° horizontal diffusers: 1.0 m (3'3") around the diffuser. Four-way diffusers, little spread: 3.0 m (9'10") around the diffuser. |
| | Group A2*: Outlets discharging horizontally that are not influenced by an adjacent surface (free jet). | Side wall grills, no deflection: a rectangle space staring from the grill length: 4.0 m (13'1"), width: twice the horizontal length of the grill. Side wall grills, wide deflection: a rectangle space starting from the grill, length: 3.0 m (9'10"), width: twice the horizontal length of the grill. |
| | Group B*: Outlets mounted on or near the floor that discharge air vertically in a linear jet. | 3.0 m (9'10") around the outlet. |
| | Group C*: Outlets mounted on or near the floor that discharge air vertically in a spreading jet. | 3.0 m (9'10") around the outlet. |
| | Group D*: Outlets mounted on or near the floor that discharge air horizontally. When used in fully stratified systems, these outlets use low discharge velocities; in mixed systems, they use higher discharge velocities. | Low sidewall, no spread: a rectangle space starting at the outlet, length: 4.0 m, width: twice the horizontal length of the outlet. Low sidewall, wide spread: a rectangle space starting at the outlet, length: 3.0 m (9'10"), width: twice the horizontal length of the outlet. |
| | Group E*: Outlets that project supply air vertically downward. When used in partially satisfied systems, these outlets use low discharge velocities; in mixed systems, they use higher discharge velocities. | Air curtain: 3.0 m (9'10") around the outlet. |
| | Underfloor air distribution system. | All areas. |
| Return Air Outlet | Return air diffuser. | 3.0 m (9'10") around the diffuser. |
| Indoor Heating/Cooling Sources | Portable heating/cooling source. Heating/cooling surface integrated with the air handling system. | Electric heater: 1.5 m (4'11"). Chilled ceiling, radiant heating floor: All areas. |

*The group number is based on the grouping in Section 20 of the ASHRAE handbook-Fundamentals.

Based on the exemplary building structure 1010 from FIG. 14A, FIG. 14E illustrates the position of air handling zone 1024 for the indoor environment 1001. The air handling system in indoor environment 1001 includes air outlet 1032 and indoor heating device 1034.

Figure 14F:
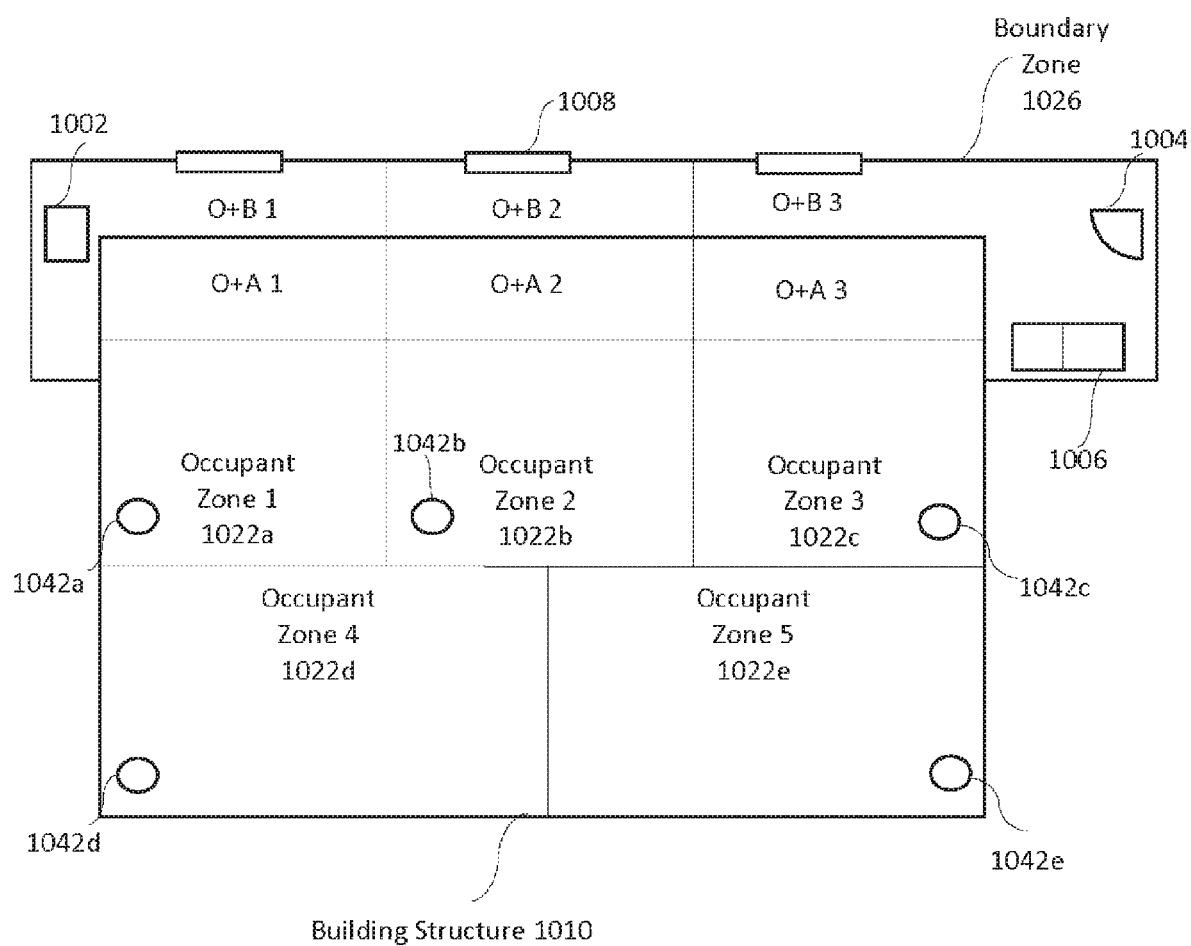
FIG. 14F is a schematic diagram of overlapping areas an exemplary indoor environment.

FIG. 14F illustrates the layout of overlapping areas in an indoor space with multiple occupant zones. Overlapping areas represent occupant zones that overlap with other zones, including boundary zones and/or air handling zones. The overlapping area defines the portion of the indoor environment which interacts with occupants and is also directly affected by other factors such as air handling components and envelope-related aspects of the built structure. The overlapping areas are the most complicated with respect to achieving thermal comfort for occupants and acceptable indoor air quality parameters. Overlapping areas may be areas where an occupant and boundary zones overlap. FIG. 14F shows an exemplary indoor environment with three overlapping occupant and boundary zones (O+B). Specifically, with reference to FIG. 14F, overlapping occupant and boundary zones are designated by O+B 1, O+B 2, and O+B 3. As shown in FIG. 14D, the indoor environment includes three occupant zones Overlapping areas may also be areas where occupant and air handling zones overlap. FIG. 14F shows an exemplary indoor environment with three overlapping occupant and air handling (O+A) zones. Specifically, with reference to FIG. 14F, overlapping air handling and occupant zones are designated by O+A 1, O+A 2, and O+A 3.

Figure 14G:
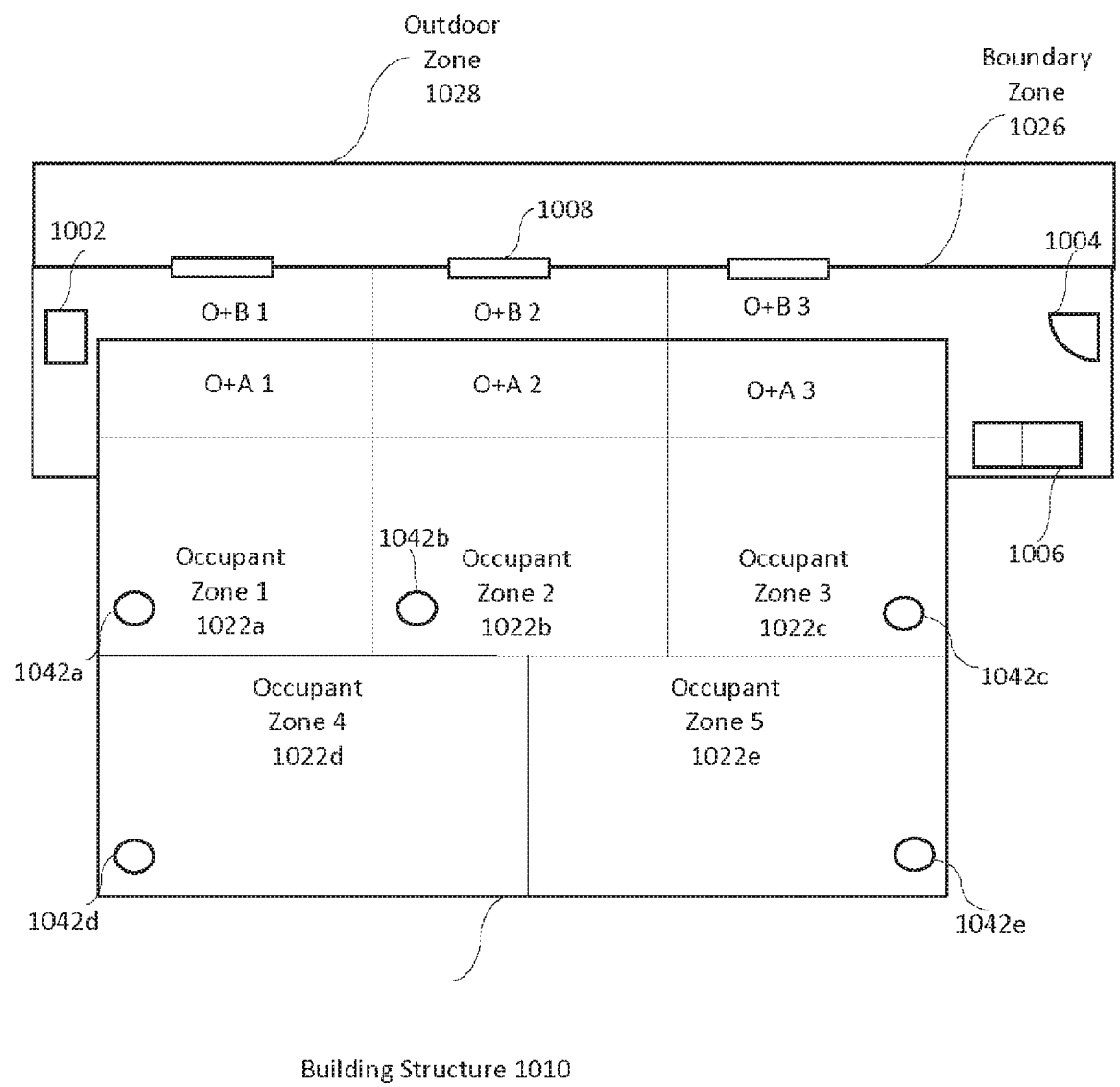
FIG. 14G is a schematic diagram of outdoor zones adjacent to an exemplary indoor environment.

FIG. 14G illustrates a schematic diagram of outdoor zones near a built structure. Outdoor zones delineate the area that may not be in direct contact with the occupant zones but can still influence the comfort of occupants and the indoor environmental quality in the occupant zones. The outdoor zone includes spaces such as stairways, elevator areas, and outdoor environments. Table 4 provides examples of spaces in an outdoor zone and impacted environmental variables.

TABLE 4

| Spaces | Example Impacted Environmental Variables |
|---|---|
| Outdoor Environment | Temperature, Relative Humidity, Ozone, $PM_{2.5}$ |
| Elevator | $PM_{2.5}$, $CO_2$ |
| Stairway/Stairwell | Temperature, Relative Humidity, $PM_{2.5}$ |

FIGS. 15A and 15B illustrate a method for monitoring indoor environmental quality in accordance with some embodiments. The method of FIGS. 15A and 15B may be deployed by the indoor air quality monitoring system 1000 or portions thereof as described above with reference to FIG. 13. The method includes steps for sensor installation within the indoor environment. Spatial and temporal variation of parameters related to indoor environmental quality, especially in the thermal environment and air quality, impact the quality of data collected by sensor arrays. In order to enhance performance of the indoor air quality monitoring system 1000, the method also includes zoning of the indoor environment to determine optimal sensor placement. By one approach, the method is primarily executed by the control circuit 1050 of indoor air quality monitoring system 1000.

The method begins at step 1102. In step 1102, the system defines occupant zones (OZs). Occupant zones may be delineated as illustrated in FIGS. 14A and 14B. By one approach, the floor plan detailing the layout of the indoor space and drawings of the interior layout of the indoor space may be used for this step. Onsite examination of the indoor space may also be used to delineate occupant zones in step 1102. For example, the arrangement of the indoor space may be modified during the process and onsite examination of the indoor space may detect changes to the arrangement. In the exemplary indoor environment in FIG. 14A, five occupant zones may be delineated based on the office layout, locations of workstations, and types and height of partitions. FIG. 14B illustrates the boundaries of the five occupant zones in this exemplary indoor environment.

In some embodiments, the number of delineated occupant zones is less than or equal to the total number of sensor arrays. In step 1104, the system determines whether the number of available or usable sensor arrays is greater than or equal to the number of occupant zones. If the total number of sensor arrays is less than the number of occupant zones, then the system proceeds to step 1106. At step 1106, the system instructs the installation of sensor arrays based on the priority of occupant zones.

Criteria for determining the priority of occupant zones may include the current, expected, intended, or predicted number of occupants in occupant zones and the similarity of occupant zones with respect to size, boundaries, and position. By one approach, more sensor arrays may be allocated to or installed in occupant zones which have more occupants. If two occupant zones are of similar size, share boundaries, and are adjacent then the two occupant zones may be combined in to a single zone which includes a single sensor array. If the total number of sensor arrays is greater than the number of occupant zones, then the system proceeds to step 1108. At step 1108, the system instructs the allocation or installation of one sensor package for or in each occupant zone. For example, considering the exemplary layout of occupant zones in FIG. 14B, the total number of sensor arrays is 9 and the number of occupant zones is 5. Because the total number of sensor arrays (9) is greater than the total number of occupant zones (5), the system may instruct the allocation or installation of one sensor array for or in each occupant zone as shown in FIG. 14C.

After the system has instructed the allocation or installation of sensor arrays, the system proceeds to step 1110. At step 1110 the system determines whether there are any sensor arrays left (i.e., sensor arrays that have not yet been allocated or installed). The system may determine whether there are sensor arrays left by subtracting the number of sensor arrays installed at step 1108 from the total number of sensor arrays. If there are no sensor arrays left, the process stops. If there are sensor arrays left, which have not been yet installed, the system proceeds to step 1112.

At step 1112, the system defines boundary zones, air handling zones, and their overlapping areas (OAs). Boundary zones may be delineated as described in FIGS. 14D and 14E. By one approach the floor plan and air handling system drawings may be used to delineate boundary zones and air handling zones. Onsite examination of the indoor space may also be used to delineate boundary zones and air handling zones in step 1112. For example, onsite examination of the indoor space may assist in determining the areas affected by indoor air pollutant sources, heating sources, and cooling sources. At step 1112, the system may delineate the overlapping areas of boundary zones, air handling zones, and occupant zones as described in FIG. 14F.

After defining overlapping areas at step 1112, the system proceeds to step 1114. At step 1114, the system determines whether the number of sensor arrays left is greater than or equal to the number of overlapping areas (OAs). If the number of overlapping areas is greater than or equal to the number of sensor arrays left, then the system proceeds to step 1116. At step 1116, the system instructs the installation of one sensor array in each overlapping area. If the number of overlapping areas is less than the number of sensor arrays left, then the system proceeds to the method described in FIG. 15B, staring with step 1128. By one approach, if there are no occupants in an overlapping area the system may skip step 1116. For example, if there are not seats in an overlapping area in an office space, step 1116 may be skipped.

After sensor arrays have been installed according to step 1116, the system proceeds to step 1118. At step 1118 the system determines whether there are any sensor arrays left (i.e., sensor arrays that have not yet been installed). The system may determine whether there are sensor arrays left by subtracting the number of sensor arrays allocated or installed at step 1108 and the total number of sensor arrays installed at step 116 from the total number of sensor arrays. If there are no sensor arrays left, the process stops. If there are sensor arrays left, which have not been yet installed, the system proceeds to step 1120.

At step 1120, the system defines extending zones, outdoor zones, and non-overlapping boundary zones. The system may delineate outdoor zones as described in FIG. 14G. Non-overlapping boundary zones designate the area of boundary zones that do not overlap with occupant zones. The system may delineate non-overlapping boundary zones based on the area remaining in the boundary zone after defining overlapping areas at step 1112. Outdoor zones and boundary zones that are not overlapping with occupant zones are less important for sensor installation because occupants are not present in these areas for a substantial amount of time. Therefore, outdoor zones and non-boundary zones are only considered for sensor array installation after sensor arrays have been installed in occupant zones and overlapping areas.

After defining the outdoor zones and non-overlapping boundary zones at step 1120, the system continues to step 1122. At step 1122, the system determines whether the number of sensor arrays left (i.e., sensor arrays that have not yet been allocated or installed) is greater than or equal to the number of outdoor zones and non-overlapping boundary zones. The system may determine the number of sensor arrays left based on the calculation at step 1118. The system may determine the number of outdoor zones and non-overlapping boundary zones by counting the number of zones defined at step 1120. If the number of sensor arrays left is less than the number of outdoor zones and boundary zones, the system proceeds to step 1124. If the number of sensor arrays left is greater than or equal to the number of outdoor zones and non-overlapping boundary zones, the system proceeds to step 1126.

At step 1124, the system instructs the installation of the remaining sensor arrays based on priority considerations with respect to the outdoor zones and non-overlapping boundary zones. Outdoor zones may impact the thermal and indoor air quality parameters in the indoor environment. Thus, installing sensor arrays in outdoor zones to measure outdoor environmental parameters may serve as an indicator of the relationship between the indoor and outdoor environment. Additionally, non-overlapping boundary zones have an impact on indoor air quality parameters. For example, areas near indoor air pollution sources, such as printers, have an impact on indoor air quality parameters. Installing sensor arrays in non-overlapping boundary zones may establish the impact of indoor air pollution sources on indoor environmental quality. More specifically, installing sensor arrays in indoor air pollution related areas may help determine potential risks to indoor environmental quality.

At step 1126, the system instructs the installation of one sensor array in each outdoor zone and each non-overlapping boundary zone. After instructing the installation of the remaining sensor arrays at step 1126, the process stops.

The method of FIG. 15B begins with step 1128. At step 1128, the system determines whether indoor air quality (IAQ) or thermal parameters should be given priority. The system selects either a thermal path or an IAQ path depending on which parameters should be given priority. By one approach, the control circuit 1050 may be configured to select either the thermal path or IAQ path depending on a preset for the particular indoor environment. By another approach, an occupant may select a thermal path using an electronic user device 1090 that is in communication with the control circuit 1050. For the thermal path and IAQ path, areas for sensor installation are prioritizes as follows:

Thermal Path: O+A+B>O+A>O+B
IAQ Path: O+B>O+A+B>O+A
Where:
O+B represents the overlapping area resulted from an occupant zone and a boundary zone.
O+A represents the overlapping area resulted from an occupant zone and an air handling zone.
O+A+B represents the overlapping area resulted from an occupant zone, a boundary zone, and an air handling zone.

For the IAQ path, after step 1128, the system proceeds to step 1130. At step 1130, the system determines whether the number of sensor arrays left is greater than or equal to the number of overlapping occupant and boundary (O+B) zones. If the number of sensor arrays is less than or equal to the number of O+B zones, then the system proceeds to step 1138. At step 1138, the system prioritizes sensor installation based on the occupant density within each O+B zone and instructs the installation of sensor arrays starting with the highest priority O+B zones first. By one approach, the system instructs sensor arrays to be installed in O+B zones with the highest number of occupants first. If the number of sensor arrays is greater than or equal to the number of O+B zones, the system instructs the installation of one sensor array in each O+B zones at step 1142. Next, at step 1146, the system determines whether there are sensor arrays left. To determine the number of arrays left, the system may subtract the number of sensor arrays installed in occupant zones and the number of sensor arrays installed in O+B zones from the total number of sensor arrays. If there are no sensor arrays left, the process stops.

If the system determines that there are sensor arrays left at step 1146, the system proceeds to step 1150. At step 1150, the system determines whether the number of sensor arrays left is greater than or equal to the number of overlapping occupant and air handling and boundary (O+A+B) zones. The system may determine the number of sensor arrays left from the calculation at step 1146. The system may determine the number of O+A+B zones from the process described at step 1112. If the number of sensor arrays is less than or equal to the number of O+A+B zones, then the system proceeds to step 1154. At step 1154, the system prioritizes sensor installation based on the occupant density within each O+A+B zone and instructs the installation of sensor arrays starting with the highest priority O+A+B zones first. By one approach, the system instructs sensor arrays to be allocated or installed in O+A+B zones with the highest number of occupants first. If the number of sensor arrays is greater than or equal to the number of O+A+B zones, then the system instructs the installation of one sensor array in each O+A+B zone at step 1158. Next, at step 1162, the system determines whether there are sensor arrays left. To determine the number of sensor arrays left, the system may subtract the number of sensor arrays installed in occupant zones and the number of sensor arrays installed in O+B and O+A+B zones from the total number of sensor arrays. If there are sensor arrays left, the system instructs the installation of remaining sensor arrays in overlapping occupant and air handling (O+A) zones at step 1166. At step 1166, the system prioritizes installation of sensor arrays based on the occupant density in each O+A zone and instructs installation of sensor arrays starting with the highest priority O+A zones. By one approach, the system instructs sensor arrays to be installed in O+A zones with the highest number of occupants first. If there are no sensor arrays left, the process stops.

For the thermal path, after step 1128, the system proceeds to step 1132. At step 1132 the system determines whether the number of sensor arrays left is greater than or equal to the number of overlapping occupant and air handling and boundary (O+A+B) zones. If the number of sensor arrays is less than or equal to the number of O+A+B zones, then the system proceeds to step 1140. At step 1140, the system prioritizes sensor installation based on the occupant density within each O+A+B zone and instructs the installation of sensor arrays starting with the highest priority O+A+B zones first. By one approach, the system instructs sensor arrays to be allocated to or installed in O+A+B zones with the highest number of occupants first. If the number of sensor arrays is greater than or equal to the number of O+A+B zones, the system instructs the installation of one sensor array in each O+A+B zone at step 1144. Next, at step 1148, the system determines whether there are sensor arrays left. To determine the number of sensor arrays left, the system may subtract the number of sensor arrays installed in occupant zones and the number of sensor arrays installed in O+A+B zones from the total number of sensor arrays. If there are no sensor arrays left, the process stops.

If the system determines that there are sensor arrays left at step 1148, the system proceeds to step 1152. At step 1152, the system determines whether the number of sensor arrays left is greater than or equal to the number of overlapping occupant and air handling (O+A) zones. The system may determine the number of sensor arrays left from the calculation at step 1148. The system may determine the number of O+A zones from the process described at step 1112. If the number of sensor arrays is less than or equal to the number of O+A zones, the system proceeds to step 1156. At step 1156, the system prioritizes sensor installation based on the occupant density within each O+A zone and instructs the installation of sensor arrays starting with the highest priority O+A zones first. By one approach, the system instructs sensor arrays to be allocated to or installed in O+A zones with the highest number of occupants first. If the number of sensor arrays is greater than or equal to the number of O+A zones, then the system instructs the installation of one sensor array in each O+A zone at step 1160. Next, at step 1164, the system determines whether there are sensor arrays left. To determine the number of sensor arrays left, the system may subtract the number of sensor arrays installed in occupant zones and the number of sensor arrays installed in O+A zones and O+A+B zones from the total number of sensor arrays. If there are sensor arrays left, the system instructs the installation of remaining sensor arrays in overlapping occupant and boundary (O+B) zones at step 1168. At step 1168, the system prioritizes installation of sensor arrays based on the occupant density in each O+B zone and instructs installation of sensor arrays starting with the highest priority O+B zones. By one approach, the system instructs sensor arrays to be installed in O+B zones with the highest number of occupants first. If there are no sensor arrays left, the process stops.

The method of FIGS. 15A and 15B may also further include sampling intervals for the measurement of indoor environmental quality parameters by installed sensor arrays. In addition to spatial considerations for sensor installation, temporal considerations for sensor measurements are also important for the accuracy of an environmental monitoring system. Temporal variations occur for example in air temperature and in the concentration of air pollutants. By one approach, the sampling interval for parameters for the thermal environment and indoor air quality may be a 5-minute frequency. A 5-minute frequency allows the environmental monitoring system to sufficiently capture transient changes in the thermal environment and indoor air quality.

In one illustrative approach, an apparatus for sheltering occupants may summarized as including a built structure having an indoor environment; a sensor array configured to measure at least one of air quality, thermal quality, sound parameters, or lighting parameters; a central control circuit communicatively coupled to the sensor array. The central control circuit in the apparatus may be configured to delineate occupant zones based on an electronic floor plan; instruct installation of at least one sensor in each delineated occupant zone; after delineation of the occupant zones, delineating at least one boundary zone and at least one air handling zone based on the electronic floor plan and an electronic HVAC plan; identify overlapping zones including at least one combined boundary-occupant zone, combined air handling-occupant zone, or combined boundary-occupant-air handling zone; and instruct installation of at least one sensor in the identified overlapping zones. If the sensor arrays available are less than a total of the combined delineated occupant zones and identified overlapping zones, then allocation or installation of thermal sensor arrays occurs on the basis of the following order of preference: combined boundary-occupant-air handling zone first, then the combined air handling-occupant combined zones, and then the combined boundary-occupant combined zones and allocation or installation of air quality sensor arrays occurs on the basis of the following order of preference: the combined boundary-occupant zone, the combined boundary-occupant-air handling zone, and then the combined air handling-occupant zone.

In another illustrative approach, a system for monitoring indoor environmental quality may be summarized as including a built structure having a plurality of environmentally-controllable zones; a sensor array configured to measure at least one indoor environmental quality parameters; an environmental control system associated with the built structure; at least one electronic user device associated with a user; and a control circuit that is communicatively coupled to the sensor array, the electronic device, and the environmental control system. In the system, the environmentally-controllable zones may be delineated into one or more occupant zones, air handling zones, and boundary zones. The control circuit may be configured to detect a particular occupant having an occupant profile in an environment database, locate the particular occupant in a particular occupant zone, compare the sensor readings in the particular occupant zone with parameters of the occupant profile associated with the particular occupant, and, upon detection that the sensor readings in the particular occupant zone are not within the parameters of the occupant profile, instruct the environmental control system to adjust the parameters pursuant to the occupant profile. In one embodiment, the system for monitoring indoor environmental quality may include a sensor array configured to measure at least one of air quality, thermal quality, sound parameters, or lighting parameters.

In another illustrative approach, a method of monitoring indoor air quality may be summarized as including delineating a plurality of occupant zones in a built structure based on an electronic floor plan; installing at least one of a plurality of sensor arrays in each delineated occupant zone; after delineation of the occupant zones, delineating at least one boundary zone and at least one air handling zone based on the electronic floor plan and an electronic HVAC plan; identifying overlapping zones including at least one combined boundary-occupant zone, combined air handling-occupant zone, or combined boundary-occupant-air handling zone; allocating or installing at least one of the plurality of sensor arrays in the identified overlapping zones; and operating an air handling system according to readings from the sensor arrays in the delineated occupant zones and the identified overlapping zones. If sensor arrays available for the identified occupant zones are less than the delineated occupant zones and the identified overlapping zones, then allocation or installation of thermal sensor arrays occurs on the basis of the following order of preference combined boundary-occupant-air handling zone first, then the combined air handling-occupant combined zones, and then the combined boundary-occupant combined zones.

In another illustrative approach, a method for monitoring indoor air quality may be summarized as receiving data from a plurality of sensor arrays in a space and operating an environmental system. In this illustrative approach, the space includes a plurality of zones and wherein the plurality of sensor arrays were positioned within the space by delineating a plurality of occupant zones in a built structure based on an electronic floor plan; installing at least one of a plurality of sensor arrays in each delineated occupant zone; after delineation of the occupant zones, delineating at least one boundary zone and at least one air handling zone based on the electronic floor plan and an electronic HVAC plan; identifying overlapping zones including at least one combined boundary-occupant zone, combined air handling-occupant zone, or combined boundary-occupant-air handling zone; allocating or installing at least one of the plurality of sensor arrays in the identified overlapping zones; and operating an air handling system according to readings from the sensor arrays in the delineated occupant zones and the identified overlapping zones. If sensor arrays available for the identified occupant zones are less than the delineated occupant zones and the identified overlapping zones, then installation of thermal sensor arrays occurs on the basis of the following order of preference combined boundary-occupant-air handling zone first, then the combined air handling-occupant combined zones, and then the combined boundary-occupant combined zones.

The above installation guidelines for sensor arrays in a system for monitoring indoor air quality may be considered before operating an environmental control system or remediating air in an indoor space. The data obtained from the system for monitoring indoor air quality may also be used to determine whether air within or remediating air in an indoor space needs remediation.

The various embodiments described above can be combined to provide further embodiments. Aspects of the embodiments can be modified, if necessary or desirable to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An apparatus for sheltering occupants comprising:
   a plurality of sensor arrays for a built structure, the plurality of sensor arrays including thermal sensor arrays and air quality sensor arrays;
   a central control circuit communicatively coupled to the plurality of sensor arrays, the central control circuit configured to:
   delineate occupant zones based on a floor plan;
   automatically identify an installation location for at least one of the plurality of sensor arrays in each occupant zone;
   after delineation of the occupant zones, delineating a boundary zone and an air handling zone based on the floor plan and an electronic HVAC plan;
   identify overlapping zones including a combined boundary-occupant zone, a combined air handling-occupant zone, or a combined boundary-occupant-air handling zone;
   automatically identify an installation location for another at least one of the plurality of sensor arrays in the overlapping zones;
   determining that the plurality of sensor arrays available is less than a total of the occupant zones and the overlapping zones;
   providing instructions of installation for the thermal sensor arrays on the basis of the following order of preference: the combined boundary-occupant-air handling zone first, then the combined air handling-occupant zone, and then the combined boundary-occupant zone; and
   providing instructions of installation for the air quality sensor arrays on the basis of the following order of preference: the combined boundary-occupant zone, the combined boundary-occupant-air handling zone, and then the combined air handling-occupant zone;
   wherein, after installation of the thermal sensor arrays, the central control circuit automatically sends a control signal to initiate operation of an air handling system associated with the built structure in response to readings from at least one of the thermal sensor arrays or the air quality sensor arrays.

2. The apparatus of claim 1, wherein the at least one of the plurality of sensor arrays is installed in each of the occupant zones and each of the overlapping zones and the central control circuit is further configured to instruct the air handling system to respond to readings from the at least one of the plurality of sensor arrays.

3. The apparatus of claim 1, wherein the occupant zones having about 2.0 m or less space therebetween and no vertical segmental partition higher than about 1.9 m are merged into a single occupant zone.

4. The apparatus of claim 1 wherein, the central control circuit, upon determining that the sensor arrays are less than a number of occupant zones and the overlapping zones, the central control circuit instructs installation of a remaining number of the plurality of sensor arrays in the overlapping zones having a greatest density.

5. The apparatus of claim 1 further comprising identifying an outdoor zone or non-overlapping boundary zone, wherein the outdoor zone includes areas that are not in direct contact with any of the occupant zones and include stairways, elevators areas, and adjacent outdoor environments.

6. A method for monitoring indoor air quality, the method comprising:
   delineating occupant zones in a built structure based on a floor plan;
   installing at least one of a plurality of sensors in each of the occupant zones the plurality of sensors including thermal sensors;
   after delineation of the occupant zones, delineating a boundary zone and an air handling zone based on the floor plan and an electronic HVAC plan;
   identifying overlapping zones including a combined boundary-occupant zone, a combined air handling-occupant zone, or a combined boundary-occupant-air handling zone;
   installing another at least one of the plurality of sensors in the overlapping zones; and
   instructing installation of the thermal sensors according to the following order of preference: the combined boundary-occupant-air handling zone first, then the combined air handling-occupant zone, and then the combined boundary-occupant zone; and
   after installation, automatically sending a control signal to adjust a parameter of an air handling system associated with the built structure in response to readings from the thermal sensors.

7. The method of claim 6 further comprising installing the at least one of the plurality of sensors in each of the overlapping zones.

8. The method of claim 6, wherein the plurality of sensors further includes air quality sensors, and wherein the method further includes installing the air quality sensors in the following order of preference: the combined boundary-occupant zone, the combined boundary-occupant-air handling zone, and then the combined air handling-occupant zone.

9. The method of claim 6 wherein the method further includes installing a remaining plurality of sensors in the overlapping zones having a greatest density.

10. The method of claim 6 further comprising installing the at least one of the plurality of sensors in an outdoor zone or non-overlapping boundary zone, wherein the outdoor zone includes areas that are not indirect contact with any of the occupant zones and influence occupant comfort including stairways, elevators areas, and adjacent outdoor environments.

11. The method of claim 6 wherein the occupant zones with about 2.0 m or less space therebetween and no vertical segmental partition higher than about 1.9 m are merged into a single occupant zone.

12. The method of claim 6 wherein the boundary zone includes areas with fenestrations, window openings, doors, external walls, kitchen appliances, and indoor pollutant sources.

13. The method of claim 6 wherein the air handling zone includes areas with air outlets, air diffusers, radiators, portable heating or cooling sources, and vents.

14. The method of claim 6 wherein the installation of the at least one of the plurality of sensors in each of the occupant zones is conducted in a workstation-mounted configuration.

15. The method of claim 6 wherein the method further includes at least one of:
    installing the at least one of the plurality of sensors in the occupant zones with a largest number of occupants first; and
    combining adjacent occupants zones having a similar size.

16. The method of claim 6 wherein the plurality of sensors are configured to detect at least one of: a lighting level, an ambient temperature level and an air quality metric.

17. A method for monitoring indoor air quality, the method comprising:
    determining that air within at least one of a plurality of zones should be remediated, wherein a plurality of sensors including thermal sensors is positioned within the plurality of zones in accordance with the following:
    delineating a plurality of occupant zones in a built structure based on an electronic floor plan;
    installing at least one of the plurality of sensors in each occupant zone;
    after delineation of the plurality of occupant zones, delineating a boundary zone and an air handling zone based on the electronic floor plan and an electronic HVAC plan;
    identifying overlapping zones including a combined boundary-occupant zone, a combined air handling-occupant zone, or a combined boundary-occupant-air handling zone;
    installing at least one of the plurality of sensors in the overlapping zones;
    instructing installation of the thermal sensors according to the following order of preference: the combined boundary-occupant-air handling zone first, then the combined air handling-occupant zone, and then the combined boundary-occupant zone; and
    after installation, automatically sending a control signal to operate an environmental system associated with the built structure in response to readings from the thermal sensors.

18. A method of monitoring indoor air quality, the method comprising:
    receiving an indicator that air within at least one of a plurality of zones should be remediated, wherein the indicator is based on at least one reading made by a plurality of sensors including thermal sensors, the plurality of sensors positioned within the plurality of zones in accordance with the following:
    delineating occupant zones in a built structure based on an electronic floor plan; installing at least one of a plurality of sensors in each occupant zone;
    after delineation of the occupant zones, delineating at least one boundary zone and at least one air handling zone based on the electronic floor plan and an electronic HVAC plan;
    identifying overlapping zones including a combined boundary-occupant zone, a combined air handling-occupant zone, or a combined boundary-occupant-air handling zone;
    installing at least one of the plurality of sensors in the overlapping zones;
    instructing installation of the thermal sensors according to the following order of preference: the combined boundary-occupant-air handling zone first, then the combined air handling-occupant zone, and then the combined boundary-occupant zone; and
    after installation, automatically sending a control signal to operate an environmental system associated with the built structure in response to readings from the thermal sensors.

19. A method of monitoring indoor air quality, the method comprising:
    obtaining or monitoring data generated by a plurality of sensors, each of the plurality of sensors being located within at least one of a plurality of zones, the plurality of sensors including thermal sensors, wherein each of the plurality of sensors is located within at least one of the plurality of zones based on the following:
    delineating occupant zones in a built structure based on an electronic floor plan;
    installing at least one of the plurality of sensors in each occupant zone;
    after delineation of the occupant zones, delineating a boundary zone and an air handling zone based on the electronic floor plan and an electronic HVAC plan;
    identifying overlapping zones including a combined boundary-occupant zone, a combined air handling-occupant zone, or a combined boundary-occupant-air handling zone;
    installing at least one of the plurality of sensors in the overlapping zones; and
    instructing installation of the thermal sensors according to the following order of preference: the combined boundary-occupant-air handling zone first, then the combined air handling-occupant zone, and then the combined boundary-occupant zone;
    determining, based on data generated by at least one of the plurality of sensors, that air within at least one of the plurality of zones needs to be remediated; and
    after installation, automatically sending a control signal to operate an environmental control system associated with the built structure in response to readings from the thermal sensors.

20. The method of claim 19, wherein a first of the plurality of zones is located in a first space and a second of the plurality of zones is located in a second space.

21. The method of claim 20, wherein the first space and the second space do not overlap.

22. The method of claim 20, wherein the first space is in a first geographic location and the second space is in a second geographic location different from the first geographic location.

23. A method of monitoring indoor air quality, the method comprising:
    delineating occupant zones in a built structure based on a floor plan;
    installing at least one of a plurality of sensors in each of the occupant zones, the plurality of sensors including air quality sensors;
    after delineation of the occupant zones, delineating a boundary zone and an air handling zone based on the floor plan and an electronic HVAC plan;
    identifying overlapping zones including a combined boundary-occupant zone, a combined air handling-occupant zone, or a combined boundary-occupant-air handling zone;

installing another at least one of the plurality of sensors in the overlapping zones;

instructing installation of the air quality sensors according to the following order of preference: the combined boundary-occupant zone first, then the combined boundary-occupant-air handling zone, and then the combined air handling-occupant zone; and after installation, automatically sending a control signal to adjust a parameter of an air handling system associated with the built structure in response to readings from the air quality sensors.

24. A method of monitoring indoor air quality, the method comprising:

obtaining or monitoring data generated by at least one of a plurality of sensors in a space, the plurality of sensors including air quality sensors, wherein the space includes a plurality of zones and wherein the plurality of sensors were previously positioned within the plurality of zones in accordance with the following:

delineating occupant zones in a built structure based on a floor plan;

installing at least one of the plurality of sensors in each occupant zone;

after delineation of the occupant zones, delineating a boundary zone and an air handling zone based on the floor plan and an electronic HVAC plan;

identifying overlapping zones including a combined boundary-occupant zone, a combined air handling-occupant zone, or a combined boundary-occupant-air handling zone;

installing at least one of the plurality of sensors in the overlapping zones;

instructing installation of the air quality sensors according to the following order of preference: the combined boundary-occupant zone first, then the combined boundary-occupant-air handling zone, and then the combined air handling-occupant zone;

determining, based at least in part on the data, that air within at least one of the plurality of zones is to be remediated; and after installation, automatically sending a control signal to adjust a parameter of an air handling system associated with the built structure in response to readings from the air quality sensors.

25. A method of monitoring indoor air quality, the method comprising:

determining or receiving an indicator that air within at least one of a plurality of zones should be remediated, wherein a plurality of sensors including air quality sensors is positioned within the plurality of zones in accordance with the following:

delineating a plurality of occupant zones in a built structure based on an electronic floor plan;

installing at least one of the plurality of sensors in each occupant zone;

after delineation of the plurality of occupant zones, delineating a boundary zone and an air handling zone based on the electronic floor plan and an electronic HVAC plan; identifying overlapping zones including a combined boundary-occupant zone, a combined air handling-occupant zone, or a combined boundary-occupant-air handling zone;

installing at least one of the plurality of sensors in the overlapping zones; and instructing installation of the air quality sensors according to the following order of preference: the combined boundary-occupant zone first, then the combined boundary-occupant-air handling zone, and then the combined air handling-occupant zone; and after installation, automatically sending a control signal to operate an environmental system associated with the built structure in response to readings from the air quality sensors.

* * * * *